(12) United States Patent
Van Buren et al.

(10) Patent No.: US 8,599,836 B2
(45) Date of Patent: Dec. 3, 2013

(54) WEB-BASED, HOSTED, SELF-SERVICE OUTBOUND CONTACT CENTER UTILIZING SPEAKER-INDEPENDENT INTERACTIVE VOICE RESPONSE AND INCLUDING ENHANCED IP TELEPHONY

(75) Inventors: Terry Lynn Van Buren, San Antonio, TX (US); Vesna Rafaty, Dallas, TX (US)

(73) Assignee: Neobitspeak LLC, Dallas, TX (US)

( * ) Notice: Subject to any disclaimer, the term of this patent is extended or adjusted under 35 U.S.C. 154(b) by 183 days.

(21) Appl. No.: 13/011,611

(22) Filed: Jan. 21, 2011

(65) Prior Publication Data

US 2011/0182283 A1 Jul. 28, 2011

Related U.S. Application Data

(60) Provisional application No. 61/298,574, filed on Jan. 27, 2010.

(51) Int. Cl.
*H04L 12/66* (2006.01)
*G10L 11/00* (2006.01)

(52) U.S. Cl.
USPC ................. 370/352; 704/270.1; 704/E11.001

(58) Field of Classification Search
USPC ........................ 370/352; 704/270.1, E11.001
See application file for complete search history.

(56) References Cited

U.S. PATENT DOCUMENTS

| 8,239,393 | B1* | 8/2012 | Guo et al. ...................... 707/748 |
| 2006/0101098 | A1* | 5/2006 | Morgan et al. ................ 707/204 |
| 2006/0218623 | A1* | 9/2006 | Hodges et al. .................... 726/3 |
| 2008/0098301 | A1* | 4/2008 | Black et al. ..................... 715/246 |
| 2009/0182843 | A1* | 7/2009 | Hluchyj et al. ............... 709/219 |
| 2009/0258634 | A1* | 10/2009 | Amine ........................... 455/413 |

* cited by examiner

*Primary Examiner* — Brian D Nguyen
(74) *Attorney, Agent, or Firm* — Vesna Rafaty IP Law, PLLC

(57) ABSTRACT

Disclosed is an on demand, web-based, outbound contact center utilizing Voice over IP (VoIP) and speaker-independent voice recognition which automatically captures contact responses to question events in a pre-recorded, interactive voice call, the call launched by a user via a broadcast comprising a call sequence created by the user via a call center user interface comprising event add and logic add wizards, the call sequence comprising event prompts based on a user-generated script comprising message events and question events, the event prompts in the group consisting of voice recordings and text-to-speech inputs.

36 Claims, 57 Drawing Sheets

Fig. 32

| Windows Internet Explorer | | |
|---|---|---|
| http://localhost:3525/Members/MemberPortal.aspx | | |

| PROFILE | ADD CREDIT | CHANGE PASSWORD | UPDATE PROFILE |
|---|---|---|---|

CONTACTS
GROUPS
PROMPTS
AUDIOS
ANSWERS
SEQUENCES
BROADCASTS
REPORTS
RECORDINGS

FIRST NAME ____ —1
LAST NAME ____ —2
TITLE ____ —3
COMPANY ____ —4
INDUSTRY ____ —5
ADDRESS1 ____ —6
ADDRESS2 ____ —7
CITY ____ —8
STATE ____ —9
COUNTRY ____ —10
MAIL CODE ____ —11
PHONE NUMBER ____ —12
TIME ZONE ▼ —13
UPDATE —14

Fig. 33

| | | | | | |
|---|---|---|---|---|---|
| PROFILE | SELECT ALL | SELECT NONE | DELETE SELECTED CONTACTS | UPLOAD CONTACTS FILE | VIEW COUNTRY CODES |
| CONTACTS | COMMANDS | SELECT | CONTACT NAME | COUNTRY CODE | PHONE NUMBER |
| GROUPS | | 1↘ | | | |
| PROMPTS | EDIT DELETE | ☐ | Jenny | 1 | 8675309 |
| AUDIOS | | ADD | | | |
| ANSWERS | | | | | |
| SEQUENCES | | | | | |
| BROADCASTS | | | | | |
| REPORTS | | | | | |
| RECORDINGS | | | | | |

Fig. 37

```
Windows Internet Explorer                                    _ □ X
http://localhost:3525/Members/MemberPortal.aspx
┌──────────┐   Answer Group    DTMF # | Answers
│ PROFILE  │  1─┌────────▼┐─2─┌─ 1   │         ─3
├──────────┤    └─────────┘   │  2   │
│ CONTACTS │                  │  3   │
├──────────┤                  │  4   │
│ GROUPS   │                  │  5   │
├──────────┤                  │  6   │
│ PROMPTS  │                  │  7   │
├──────────┤                  │  8   │
│ AUDIOS   │                  │  9   │  DELETE ANSWER ─4
├──────────┤                  └──────┘
│ ANSWERS  │              5─┌─────────┐  ADD ─6
├──────────┤                └─────────┘
│ SEQUENCES│   END ANSWERS GROUP MANAGEMENT ─7
├──────────┤
│BROADCASTS│
├──────────┤
│ REPORTS  │
├──────────┤
│RECORDINGS│
└──────────┘
```

Fig. 39

| Windows Internet Explorer |
|---|
| http://localhost:3525/Members/MemberPortal.aspx |

| PROFILE | SELECT ALL | SELECT NONE | DELETE SELECTED SEQUENCES | MANAGE SEQUENCES |
|---|---|---|---|---|
| CONTACTS | | | | |
| GROUPS | STEPS | Add Sequence Event Questions Wizard | | |
| PROMPTS | START | Question Type: (Required) | | |
| AUDIOS | MORE | ○ Confirmation (Yes/No) | 1 Answers: | |
| ANSWERS | FINISH | ○ Number (0~9) | Colors ▼ — 2 | |
| SEQUENCES | | ● Custom Answers | | |
| BROADCASTS | | Question: (Required) — 3 | | |
| REPORTS | | ● Audio | | |
| RECORDINGS | | ○ Prompt br1alaw ▼ | | |

- Question Type: (Required)
  - ○ Confirmation (Yes/No)
  - ○ Number (0~9)
  - ● Custom Answers — 1 Answers: Colors ▼ — 2

- Question: (Required) — 3
  - ● Audio
  - ○ Prompt br1alaw ▼

- Silence: (Optional) — 4
  - ● Audio
  - ○ Prompt None ▼

- Extended Silence: (Optional) — 5
  - ● Audio
  - ○ Prompt None ▼

- No Recognition: (Optional) — 6
  - ● Audio
  - ○ Prompt None ▼

- Extended No Recognition: (Optional) — 7
  - ● Audio
  - ○ Prompt None ▼

[NEXT] [CANCEL]

Fig. 46

| | SELECT ALL | SELECT NONE | DELETE SELECTED PROMPTS | | |
|---|---|---|---|---|---|
| PROFILE | COMMANDS | SELECT | PROMPT NAME | PROMPT TEXT | |
| CONTACTS | EDIT DELETE | ☐ | Hello | Hello | |
| GROUPS | EDIT DELETE | ☐ | Q1 | Will you be at meeting May first? | |
| PROMPTS | EDIT DELETE | ☐ | A1 | Good. See you then. | |
| AUDIOS | EDIT DELETE | ☐ | A2 | Ok. Hope to see you again. | |
| ANSWERS | EDIT DELETE | ☐ | Goodbye | Goodbye | |
| SEQUENCES | EDIT DELETE | ☐ | S1 | I can not hear you.<br>Will you be at meeting May first? | |
| BROADCASTS | EDIT DELETE | ☐ | S2 | I still can not hear you.<br>Will you be at meeting May first?<br>Press one for yes or two for no. | |
| REPORTS | EDIT DELETE | ☐ | NR1 | I can not understand you.<br>Will you be at meeting May first? | |
| RECORDINGS | EDIT DELETE | ☐ | NR2 | I still can not understand you.<br>Will you be at meeting May first?<br>Press one for yes or two for no. | |
| | | ADD | | | |

Fig. 47

```
Windows Internet Explorer                                    _ □ ×
http://localhost:3525/Members/MemberPortal.aspx
┌──────────────┬──────────────────────────────────────────────┐
│ PROFILE      │ Sequence:                                    │
│              │ [Meeting ▼]                                  │
│ CONTACTS     │ Events                                       │
│ GROUPS       │   0 Message Say: Hello                       │
│              │   1 Ask Question: Confirm Say: Q1            │
│ PROMPTS      │     Sil.: S1  Extd. Sil.: S2  No Rec.: NR1  Extd. No Rec.: NR2 │
│              │   2 Message Say: A1                          │
│ AUDIOS       │   3 Message Say: A2                          │
│ ANSWERS      │   4 Message Say: Goodbye                     │
│              │                                              │
│ SEQUENCES    │ [DELETE] [UP] [DOWN]                         │
│              │ [ADD       ][ADD        ][ADD         ]      │
│ BROADCASTS   │ [MESSAGE   ][QUESTION   ][RECORDING   ]      │
│              │ [EVENTS    ][EVENTS     ][EVENTS      ]      │
│ REPORTS      │ Logics                                       │
│ RECORDINGS   │ If Question: 1 Not Equals: Yes Branch To Event: 3 │
│              │ After Event: 2 Skip To Event: 4              │
│              │                                              │
│              │ [DELETE] [ADD        ][ADD       ]           │
│              │          [QUESTION   ][SKIP      ]           │
│              │          [BRANCHES   ][LOGICS    ]           │
│              │ [END SEQUENCES MANAGEMENT]                   │
└──────────────┴──────────────────────────────────────────────┘
```

Fig. 48

| | SELECT ALL | SELECT NONE | DELETE SELECTED PROMPTS | | |
|---|---|---|---|---|---|
| PROFILE | | | | | |
| CONTACTS | | | | | |
| GROUPS | COMMANDS | SELECT | PROMPT NAME | PROMPT TEXT | |
| PROMPTS | EDIT DELETE | ☐ | ApHello | Hello. Apple Store calling. | |
| AUDIOS | EDIT DELETE | ☐ | AskLike | Do you like the Mac you purchased? | |
| ANSWERS | EDIT DELETE | ☐ | AskRate | From one being the best to five being the worst please rate your service at the Apple Store. | |
| SEQUENCES | EDIT DELETE | ☐ | RecNot | Please explain why you do not like the Mac. | |
| BROADCASTS | EDIT DELETE | ☐ | RecSvc | Please explain how we can improve our service. | |
| REPORTS | EDIT DELETE | ☐ | ApBye | Thank you for your time. Goodbye. | |
| RECORDINGS | EDIT DELETE | ☐ | S1Like | I can not hear you. Do you like the Mac you purchased? | |
| | EDIT DELETE | ☐ | S2Like | I still can not hear you. Do you like the Mac you purchased? Press one for yes or two for no. | |
| | EDIT DELETE | ☐ | NR1Like | I can not understand you. Do you like the Mac you purchased? | |
| | EDIT DELETE | ☐ | NR2Like | I still can not understand you. Do you like the Mac you purchased? Press one for yes or two for no. | |
| | EDIT DELETE | ☐ | S1Rate | I can not hear you. From one to five how would you rate our service. | |
| | EDIT DELETE | ☐ | S2Rate | I still can not hear you. Press a number from one to five to rate our service. | |
| | EDIT DELETE | ☐ | NR1Rate | I can not understand you. From one to five how would you rate our service. | |
| | EDIT DELETE | ☐ | NR2Rate | I still can not understand you. Press a number from one to five to rate our service. | |

Fig. 50

| | SELECT ALL | SELECT NONE | DELETE SELECTED PROMPTS | | |
|---|---|---|---|---|---|
| PROFILE | | | | | |
| CONTACTS | COMMANDS | SELECT | PROMPT NAME | PROMPT TEXT | |
| GROUPS | EDIT DELETE | ☐ | Hello | Hello. This is the Acme Company calling. | |
| PROMPTS | EDIT DELETE | ☐ | AskPIN | Please enter your four digit pin. |
| AUDIOS | EDIT DELETE | ☐ | Blank | . |
| ANSWERS | EDIT DELETE | ☐ | Goodbye | Thank you. Goodbye. |
| SEQUENCES | | ADD | | |
| BROADCASTS | | | | |
| REPORTS | | | | |
| RECORDINGS | | | | |

Fig. 53

| | | | | |
|---|---|---|---|---|
| PROFILE | SELECT ALL | SELECT NONE | DELETE SELECTED PROMPTS | |
| CONTACTS | | | | |
| GROUPS | COMMANDS | SELECT | PROMPT NAME | PROMPT TEXT |
| PROMPTS | EDIT DELETE | ☐ | Hello | Hello. What you need entertainment calling. |
| AUDIOS | EDIT DELETE | ☐ | Ask1 | Would you like to listen to thirty seconds of the new song by Michael Harris? |
| ANSWERS | EDIT DELETE | ☐ | Ask2 | Do you like the song? |
| SEQUENCES | EDIT DELETE | ☐ | Ask3 | Would you like to listen to the entire song? |
| BROADCASTS | EDIT DELETE | ☐ | Ask4 | Could the song be useful in a current project? |
| REPORTS | EDIT DELETE | ☐ | Ask5 | May our music supervisor contact you regarding possible licensing? |
| RECORDINGS | EDIT DELETE | ☐ | SayOk | Very good. What you need entertainment will be contacting you soon. |
| | EDIT DELETE | ☐ | SayGood | Thank you very much for your interest. You have an excellent ear for good music. |
| | EDIT DELETE | ☐ | SayBad | Thank you for your time. |
| | EDIT DELETE | ☐ | Goodbye | Goodbye. |
| | EDIT DELETE | ☐ | S1Lstn | I can not hear you. Would you like to listen to the new song by Michael Harris? |
| | EDIT DELETE | ☐ | S2Lstn | I still can not hear you. Would you like to listen to the new song by Michael Harris? Press one for yes or two for no. |
| | EDIT DELETE | ☐ | NR1Lstn | I can not understand you. Would you like to listen to the new song by Michael Harris? |
| | | ADD | | |

Fig. 54

| | | | | |
|---|---|---|---|---|
| PROFILE | SELECT ALL | SELECT NONE | DELETE SELECTED PROMPTS | |
| CONTACTS | COMMANDS | SELECT | PROMPT NAME | PROMPT TEXT |
| GROUPS | EDIT DELETE | ☐ | NR2Lstn | I still can not understand you. Would you like to listen to the new song by Michael Harris? Press one for yes or two for no. |
| PROMPTS | EDIT DELETE | ☐ | S1Like | I can not hear you. Do you like the song? |
| AUDIOS | EDIT DELETE | ☐ | S2Like | I still can not hear you. Do you like the song? Press one for yes or two for no. |
| ANSWERS | EDIT DELETE | ☐ | NR1Like | I can not understand you. Do you like the song? |
| SEQUENCES | EDIT DELETE | ☐ | NR2Like | I still can not understand you. Do you like the song? Press one for yes or two for no. |
| BROADCASTS | EDIT DELETE | ☐ | S1Ent | I can not hear you. Would you like to listen to the entire song? |
| REPORTS | EDIT DELETE | ☐ | S2Ent | I still can not hear you. Would you like to listen to the entire song? Press one for yes or two for no. |
| RECORDINGS | EDIT DELETE | ☐ | NR1Ent | I can not understand you. Would you like to listen to the entire song? |
| | EDIT DELETE | ☐ | NR2Ent | I still can not understand you. Would you like to listen to the entire song? Press one for yes or two for no. |
| | | ADD | | |

Fig. 55

| | SELECT ALL | SELECT NONE | DELETE SELECTED PROMPTS | | |
|---|---|---|---|---|---|
| PROFILE | | | | | |
| CONTACTS | COMMANDS | SELECT | PROMPT NAME | PROMPT TEXT | |
| GROUPS | EDIT DELETE | ☐ | S1Use | I can not hear you. Could the song be useful in a current project? | |
| PROMPTS | EDIT DELETE | ☐ | S2Use | I can not hear you. Could the song be useful in a current project? Press one for yes or two for no. | |
| AUDIOS | | | | | |
| ANSWERS | | | | | |
| SEQUENCES | | | | | |
| BROADCASTS | EDIT DELETE | ☐ | NR1Use | I can not understand you. Could the song be useful in a current project? | |
| REPORTS | EDIT DELETE | ☐ | NR2Use | I still can not understand you. Could the song be useful in a current project? Press one for yes or two for no. | |
| RECORDINGS | EDIT DELETE | ☐ | S1Call | I can not hear you. May our music supervisor contact you regarding possible licensing? | |
| | EDIT DELETE | ☐ | S2Call | I still can not hear you. May our music supervisor contact you regarding possible licensing? Press one for yes or two for no. | |
| | EDIT DELETE | ☐ | NR1Call | I can not understand you. May our music supervisor contact you regarding possible licensing? | |
| | EDIT DELETE | ☐ | NR2Call | I still can not understand you. May our music supervisor contact you regarding possible licensing? Press one for yes or two for no. | |
| | | ADD | | | |

Fig. 56

```
Windows Internet Explorer                                    _ □ ×
http://localhost:3525/Members/MemberPortal.aspx
```

| PROFILE | Sequence: |
|---------|-----------|
| CONTACTS | WYN1 ▼ |
| GROUPS | Events |
| PROMPTS | |
| AUDIOS | |
| ANSWERS | |
| SEQUENCES | |
| BROADCASTS | |
| REPORTS | |
| RECORDINGS | |

Events:

0  Message Say: Hello
1  Ask Question: Confirm  Say: Ask1
   Sil.: S1Lstn  Extd. Sil.: S2Lstn  No Rec.: NR1Lstn
   Extd. No Rec.: NR2Lstn
2  Message Play: MHarrisFrag
3  Ask Question: Confirm  Say: Ask2
   Sil.: S1Like  Extd. Sil.: S2Like  No Rec.: NR1Like
   Extd. No Rec.: NR2Like
4  Ask Question: Confirm  Say: Ask3
   Sil.: S1Ent  Extd. Sil.: S2Ent  No Rec.: NR1Ent
   Extd. No Rec.: NR2Ent
5  Message Play: MHarrisFull
6  Ask Question: Confirm  Say: Ask4
   Sil.: S1Use  Extd. Sil.: S2Use  No Rec.: NR1Use
   Extd. No Rec.: NR2Use
7  Ask Question: Confirm  Say: Ask5
   Sil.: S1Call  Extd. Sil.: S2Call  No Rec.: NR1Call
   Extd. No Rec.: NR2call 8  Message Say: SayOk
9  Message Say: SayGood
10 Message Say: SayBad
11 Message Say: GoodBye

[DELETE] [UP] [DOWN] [ADD MESSAGE EVENTS] [ADD QUESTION EVENTS] [ADD RECORDING EVENTS]

Logics

If Question: 1 Not Equals: Yes  Branch To Event: 10
If Question: 3 Not Equals: Yes  Branch To Event: 9
If Question: 4 Not Equals: Yes  Branch To Event: 6
If Question: 6 Not Equals: Yes  Branch To Event: 9
If Question: 7 Not Equals: Yes  Branch To Event: 9
After Event: 9 Skip To Event: 11

[DELETE] [ADD QUESTION BRANCHES] [ADD SKIP LOGICS] [END SEQUENCES MANAGEMENT]

WEB-BASED, HOSTED, SELF-SERVICE OUTBOUND CONTACT CENTER UTILIZING SPEAKER-INDEPENDENT INTERACTIVE VOICE RESPONSE AND INCLUDING ENHANCED IP TELEPHONY

PRIORITY INFORMATION

IMPORTANT: This non-provisional patent application claims priority to and incorporates in full herewith and also incorporates in full by reference a related provisional patent application No. 61/298,574 e-filed on Jan. 27, 2010 by inventor Terry Lynn Van Buren, entitled: "Web-based, automated outbound call messaging and response capture system, method, and apparatus comprising speaker-independent voice recognition and IP telephony and UI enabling a robust user-programmable logic for do-it-yourself personal surveys and market research."

TRADEMARK NOTICES

SoFi™ is a trademark of NeoBitSpeak™ LLC (Company) and Company reserves rights therein.

NEO™ is a trademark of NeoBitSpeak™ LLC (Company) and Company reserves rights therein.

NeoFanNetwork.com™ is a trademark of NeoBitSpeak™ LLC and Company reserves rights therein.

I. Title

Web-based, hosted, self-service outbound contact center utilizing speaker-independent interactive voice response and including enhanced IP telephony

II. BACKGROUND OF THE INVENTION

This invention is directed to the field of cloud communications and more specifically to web-based applications that provide a self-service (i.e., do-it-yourself (DIY)), on demand, automated, web-based, speech-enabled (i.e., incorporating an interactive voice response (IVR)) contact center using Voice over IP and including enhanced IP telephony. While IVR's are known, and while services that enable the blasting of messages (whether voice messages or SMS's) are also known, the applicant is not aware of an outbound, on demand IVR application that is software only-based and which comprises the do-it-yourself (DIY) features and other features and functionalities as explained herewith and which is capable of supporting the diverse business applications disclosed herein. The disclosed web-based contact center is a game changer because it gives an enterprise grade cloud communication ability to businesses of all sizes enabling business to interact flexibly, frequently, and affordably with customers and other contacts.

Disclosed in this specification, the drawings, and the claims is a non-limiting number of business applications of the disclosed web-based, speech-enabled outbound contact center. It will be apparent to one of ordinary skill in the relevant art that the disclosed cloud communication system may be adapted to incorporate an inbound IVR.

A web-based, hosted, speech-enabled contact center solution was described in detail in the incorporated provisional patent application. Disclosed herein is a web-based contact center for use by the music industry as a non-limiting embodiment of the contact center. Significantly, the disclosed business model could readily be adapted to other industries by one of ordinary skill in the art and the targeted industry and the disclosure is deemed to encompass embodiments in such other industries.

The user merely pays a periodic subscription fee (which may include a minutes usage charge and may include a per SMS charge and other charges) to access and use the contact center. Businesses are in various industry sectors such as but not limited to arts & entertainment, sports, financial/insurance industry, mobile marketers, professional and trade associations, government agencies, political research/polling organizations, market research organizations, and business of all sizes in various other sectors of the economy.

III. SUMMARY OF THE INVENTION

The disclosed web-based, DIY contact center may be utilized by businesses who desire to cost effectively, frequently, and flexibly interact with contacts via pre-recorded voice calls while simultaneously capturing information from contact responses within the interactive calls and without the need to outsource development costs for each IVR.

Artists and other celebrities have built sizable fanbases thanks to the emergence of social networking sites such as Facebook, MySpace and others. Fans generally love to hear directly from artists in what is termed Artist Direct or Artist Direct-to-Fan communications. Tools for facilitating such communications are limited. E-mail blasts are known and text messaging to a fan's mobile device are both known but are inefficient and have limited effectiveness. And, due to a lack of organized information about the fan, targeting of marketing messages is not achieved with known communication methods. Artists and their representatives would like to be able to effectively target messaging to the fans in a meaningful way to help increase sales revenues and they would also like to target INTERACTIONS with fans in order to help increase product (tickets to shows, song/album downloads and purchases) sales. And, capturing metrics from known methods (e-mail blasts and SMS messaging) is difficult. Described is a pioneering system, method, and software product for Artist-D2F interaction using a self-service, on demand, web-based, speech-enabled contact center utilizing speaker-independent voice recognition and VoIP. The disclosed business method has the potential also to increase an artist's fan base and the artist's ability to target within his/her fan base, while also helping to convert fans to customers, i.e., purchaser of Artist's products/services. Per the disclosed invention, the artist has the power to initiate, on demand, an automated speech-enabled interaction with fans and the power to control the message, the artist's brand, while capturing market and business intelligence (via exportable reports) at the same time in near real-time interactions with his/her contacts.

Contacts as the term is used herein is construed broadly and includes but is not limited fans, customers, street team members/volunteers, venue owner/operators, booking agents, and other individuals who expressly opt into receiving the automated, pre-recorded interactive calls launched by the artist/artist representative using the disclosed web-based contact center. In this disclosure, contact and fan may also be used interchangeably. The term 'artist' as used herein is used broadly and refers to any individual, included those who have attained a celebrity status, and including that individual's authorized representative (e.g., manager, producer, record label representative), who pursues a career in the arts & entertainment (e.g., music, film, TV, visual arts, choreography, spoken word, authors) and sports sectors of the economy.). It is noted that the term artist may include the frontman (lead singer for example) of a band and a band's members. The term 'fan' is used very broadly and includes any individual who enjoys or consumes products and services of the artist in any format and any media known and/or one who has a general interest in learning more about the artist or the artist's work.

What is needed is an affordable solution for enabling artists to independently, directly interact with fans in dynamic, adaptable speech-based interactions while capturing metrics and other data from the interactions. Fans love to hear from artists directly and artists now have a web-based DIY tool to efficiently interact with all of their fans as further described herein.

The disclosed contact center could be deployed as an SaaS (software-as-service) hosted on a public cloud such as the public cloud of an Apartment/Tenanted Architected system such as Microsoft Windows Azure and including true cloud-based computing in addition to cloud hosting. Alternatively, the contact center could be deployed in a private cloud (on servers located on premises of a user of the contact center, or on servers owned by the host of the contact center), or a hybrid deployment may be used.

The On-Premise Service resides on the Media Server and is a Windows Service DLL executed at start-up that is running in a continuous loop waiting for a command from the Windows Azure website. The service currently supports four (4) functions: NbsDownloadWaveFile, NbsGetWave, NbsDeleteWave, and NbsPopQueue. The NbsDownloadWaveFile copies a wave audio file from Windows Azure Hosted Storage Services block Blob container "audiostorage" to file path "c:\audios" located at the On-Premise Media Server; this is used when customers have uploaded audio files to the Windows Azure website, NbsGetWave copy a wave audio file from the file path "c:\audios" located on the On-Premise Media Server to the Windows Azure Hosted Storage Services block Blob container "audiostorage"; this is used to copy audio recordings of contact responses to open-ended questions as captured during the interactive call to Hosted Storage for playback access and download from the Windows Azure website. NbsDeleteWave will remove wave audio files from file path "c:\audios" located at the On-Premise Media Server; this is used when a customer deletes an audio from the Gridview in from the Windows Azure website. NbsPopQueue adds messages to the Message Queue located on the On-Premise Media Server to initiate a Neo™ call to a contact.

The Scheduler resides at the On-Premise Media Server and is a Windows Service DLL executed at start-up that is running in a continuous loop. The Scheduler periodically polls the database deployed in SQL Azure to check if the time is right for launching a scheduled broadcast call and if so, the Scheduler creates a message and sends it to the local Message Queue which triggers the Speech Application to begin the interactive call.

NeoBitSpeak Azure Summary

The applicant has deployed a single robust website into a Windows Azure Hosted Services Web Role and has created a Storage Services account which makes use of Block Blobs for audio/video files, ASP Provider Membership and Roles Tables, and created one Cloud Drive used for Contact and audio file uploads and audio file format conversions. Within the Web Role a 32-bit Exe is deployed and used for audio file format conversions. The website contains a Silverlight 4.0 Client-side audio recorder and several Silverlight media players complete with Skins. The website also makes use of ASP Report Viewer 10. A single database is deployed within SQL Azure and is accessed by both the website and several On-Premise applications and services. One Azure AppFabric Service Bus connection is used to connect the Web Role with the On-Premise applications and services.

The model is a one-stop, cloud-based, multi-channel, complete communication platform for enabling communications and interactions, including voice interactions, between fans and artists, and fans and venues, and artists and venues as described below. Also, the disclosed model collects and captures actionable information (via stored account profiles) about fans and venues, enabling targeted communications for achieving business purposes of participating artists and venues.

It is envisaged that the disclosed system could be used (by labels for example) strategically at that point in time in the development of a signed artist's career when the artist is just ready to break and is embarking on a tour to promote a new album release. Sending smartly scripted interactive calls (in campaigns which potentially also integrate the calls with SMS's, and optionally e-mail too) via the disclosed contact center at just the appropriate time and to a targeted fan base could create a lot of buzz for and interest in an artist at a critical time thereby maximizing the potential benefits from the label's investment in developing the artist. Additionally, in the music industry of today, indie artists are expected to have built a sizable fan base before they can get the attention of a label for a recording contract. Thus, the disclosed contact center and unified communication platform (voice calls, SMS's, and e-mail) that it provides helps to level the playing field by making a DIY technology accessible to indie artist to help them to open up new interactive communication channels with fans to meaningfully engage an ever-increasing fan base of fans who opt into these communication channels. And, given the social networking craze, a fan who opts into a channel has the power to influence other would-be fans to do the same. This is in part due to the fact that a Fan's Profile, or certain fan attributes per the Fan's Profile are made public, at the election of the fan, such that other visitors to the platform see a listing of artists and venues to whom the fan has subscribed or opted into for interactive communications.

The disclosed business model will tend to create loyal visitors to participating venues, thus exposing fans to more and more artists, boosting ticket sales, and physical product sales at the venue. The term 'venue' as used herein is to be interpreted broadly and includes any place/event (club, bar, restaurant, concert hall, festival) where artists perform music live.

A depiction of the disclosed inventive business model and system are depicted in FIG. 57 attached. A fan opts in by visiting the URL of the disclosed music platform, registers as a Fan, creating a Fan Account and Profile and opting into receiving communications via selected channels from fan-selected artists and (optionally) venues. The fan in effect enters into a contract with the Service Provider (i.e., the provider or host of the web-based contact center), and the artist and venue to whom the fan has authorized communication channels. Thus EXPRESS CONSENT is at the core of the disclosed business model. The relevant federal laws such as the Telephone Communication Privacy Act require express consent if one sends calls using automated telephone equipment or pre-recorded voice calls to mobile device and residential lines. Fan profiles may for example contain information such as the fan's name, direct phone number (no phone extension), type of phone (whether mobile device or landline), city of residence, zip code, e-mail address, age, favorite live music venue, profession, and indicators whether the fan has opted artist into e-mail, SMS, and NEO channels The disclosed system requires that fans provide their direct numbers where they can be reached directly (no extensions). The supported communication channels are interactive, pre-recorded voice calls, SMS (text messages to the fan's mobile device), and e-mail. Another supported channel optionally is the online collaboration in real time channel which includes teleconferencing, chat, and/or collaboration using audiovisuals (musicians collaborating in real-time over the cloud in recording a song). Importantly, a fan may opt out of any those channels at any time via direct communication (opt out online with the service provider) or saying NO to a confirming opt-in question within a voice interaction call. The fan's contact information automatically populates the contact database of each artist to whom the fan has subscribed or opted in. The artist then can use the disclosed web-based contact center to send automated, interactive, pre-recorded calls, SMS's and e-mail as per the fan's authorization. The Artist must subscribe to the Service and also executes a binding contract that he/she will use the communication channels strictly for communication with fans who opted into such channels and for purposes related to promoting the artist's career in the entertainment sector. The contact center thus is a new, accessible, DIY, web-based customer-relationship-management (CRM) tool.

Mobile marketers send SMS or text messages to customers' mobile devices in order to promote their products and services. Best practices guidelines promulgated by the Mobile Marketing Association in collaboration with marketers and mobile service carriers/providers, provide for a double opt in for such SMS's (especially when the SMS is an authorization for a purchase or other financial transaction). The pre-recorded, interactive, voice call launched using the disclosed contact center may be used to effect such a double opt in. So for example, a customer opts into receiving SMS from a merchant via consent given either at the point of purchase (a form is filled out) or online at the merchant's website. Then, the mobile marketer who subscribes to the disclosed web-based contact center may send an interactive call to confirm such opt-in by the customer and has a record of such opt in via the exportable report feature of the contact center.

The third key entity in the disclosed business model is the venue where artists perform live. In creating his/her profile on the music platform, a fan is prompted to optionally specify his/her preferred venues and the fan may subscribe or opt into receiving direct communications from that venue using the channels of voice and/or SMS and e-mail channel. The fan's public profile in turn prompts venues to subscribe to the music platform in order to be able to directly interact with fans who opted into interactions with that venue and/or who named that venue their preferred venue. A venue may incentivize a fan to opt into communication channels with the venue by offering special discounts (on ticket prices, VIP packages) and exclusive invitations to events, pre-events, and other gatherings. The vision is a frequenter of a venue looks at a visit as he/she looks at a visit to a favorite coffee shop—warm, accessible, friendly, familiar, full of opportunity for discovering new artists and enjoying music.

The disclosed model also enables a direct collaboration between artist and venue in the scripting and launching of interactive call campaigns for helping to maximize ticket sales at the venues and sales for example of VIP Packages. Because fans today tend to visit a venue to see a particular artist, artists are the ones who most effectively could promote VIP Packages offered by venues via the Artist D2F voice interactions enabled by the disclosed contact center. Market research also has shown that sales of artist's deluxe products (e.g., value-added products such as CD+DVD, CD plus merchandise, vinyl record format) does best with artist-direct-to-fan selling campaigns. The disclosed model supports this type of selling/promotional campaign and the artist need only script a NEO whose purpose is to introduce the deluxe product to the fan, ask for the purchase, then automatically initiate steps (such as the SMS with link) so the fan can immediately complete the purchase transaction.

Venues may be prompted to provide information about the venue in creating the venue account profile which may include a link to URL for venue's website, its Twitter account, its Facebook page, its MySpace page. Also, a venue may be optionally be prompted to input into its profile a number that represents the largest or average linear distance from the center of the performance stage and a seat for which a ticket may be purchased. This is an artist 'closeness' metric. It is also a way that smaller venues can differentiate themselves from other venues and can use that metric to promote the venue. Some fans prefer the more intimate setting of a smaller venue.

Per another feature, the disclosed contact center comprises a call scripting tool or wizard. Per such a tool, a script may be translated with point and clicks into a visual diagram or flowchart showing what happens during a phone call based on the script. The user interface may be such that a user inputs the events, specifying the type of event (message, questions (type of questions) and the logic (as per the table of the script) and the Scripting Wizard builds the diagram automatically. The visual of the call sequence helps in reviewing the reports and fan's responses. The block diagram may additionally contain the textual content of the event.

Per an optional feature, when an artist has launched a broadcast using the disclosed contact center a message might automatically be generated (optionally triggered by artist clicking FINISH in the broadcast building UI) to social networking site such as Twitter or Facebook that "Artist just sent a broadcast to Dallas Fans" pops up on Twitter. Of course, the artist may also 'tweet' about it or post something on his/her Facebook or MySpace page. This might potentially promote call completions.

A powerful feature of the disclosed contact center is its ability to trigger or complete financial transactions using the interactive voice call launched via the contact center. One implementation of the above feature is via a mobile application developed for an Operating System such as that for iPhone, Android, or Windows 7 Mobile. Per one optional implementation of the disclosed feature, the host of the contact center provides its subscribers a Unified Communications platform with Microsoft Exchange Email Server (host Email/SIP accounts) coupled with the Lync (OCS) Communication Server (or the host of the contact center provides the SIP accounts to contact center subscribers directly). Subscribers then download a web app client developed especially for the contact center. With that client running in the background, the contact center-subscribing artist may launch a broadcast wherein the call sequence comprises a Download Product Event which triggers a message asking the fan to accept the product (e.g., a song download) on the mobile device UI via the mobile web app. This is a quick and direct way to effect a product purchase/download. Using the mobile app for effecting song download or other purchase transaction also means the interactive voice call is free to the fan because it is SIP-based and not routed through the Mobile PSTN (the mobile telephone network).

Per an alternative embodiment of the disclosed transactional interactive voice call, the Download Product Event could be an SMS Event that when created by the artist in building a call sequence triggers the sending of a URL link to the fan's mobile device (or alternatively sending of an e-mail containing the link to a purchase site) when the fan responds YES to a question such as the following: "Do you want to purchase my product now?" If the fan opens the link, the product (song or other product) download is automatically authorized and initiated. Then, the artist may follow-up with that fan by sending an interactive voice call that is in effect a "THANK YOU FOR YOUR PURCHASE."

Because artist pays for minutes usage of interactive calls launched using the contact center, one useful feature is a contacts filter which aids the artist in better targeting of the calls (to maximize minutes usage efficiency). So, for example, contact filters are provided for enabling the artist to readily create a contact group that is subset of all of the fans in his/her contacts registry. Possible filters include a fan age filter (fans who are 21 or older, fans under 21 (great for inviting/targeting fans for an artist's all age shows)) or geography filter (e.g., fans whose address is within a specified mileage radius of a venue or other place), or fan's profession filter (latter enabling the artist to target special interactions with fans employed in a special profession (e.g., film, radio, etc.).

The disclosed model also will help to maximize the power of influence that a fan has and can even measure (when for example an artist asks within the interactive voice call: "How did you hear about me. Become my fan?") that Fan-to-Fan power of influence. For example, a fan visiting the service site and seeing the public profile of another fan (someone who may be a 'friend') is also able to see what artists that fan has opted into for receiving interactive voice calls. Thus, the fan might be at least curious to learn more about those artists, that is if he/she knows and trusts that fan and his credibility.

The disclosed music platform could receive buzz from fans who comment on their experience interacting with their artists in the voice calls, an artist could stream a sample interactive call on his/her artist page on any site, and fans could tweet suggestions for content of calls thus feeding ideas for call scripts.

The possible uses of interactive voice calls launched using the disclosed cloud-based contact center are virtually limitless and left to the imagination, business knowledge, and scripting ability of the artist, artist rep, or venue. The adaptive contact center can help to automate transactions with fans. For example, a fan may be asked within the call do you want to buy a song or album download now, and if the fan says yes, the yes response triggers an SMS in real time to be sent to the fan's mobile device (fan calls sent to the fan's mobile device). This is also a way to effect a double opt in for a financial transaction (a fan says YES to a 'Do you want to buy? question, and then fan also clicks on link in SMS and completes the purchase by providing credit card, PIN, or other authorization for the purchase). Alternatively, the 'transactional voice call' could conclude a purchase transaction within the call. Such callas implement a contact identity verification step where the fan's identity is verified through any of a number of available and known means, and once verified, the fan authorizes a charge in a specified amount to his account (Paypal or credit card). The disclosed feature for facilitating and automating purchase transactions within the interactive call actually uses human psychology because of the direct voice interaction. While it is easy to delete an e-mail or an SMS, once a contact takes a call, and responds with a yes (via spoken response or pressing DTMF) to an invitation to purchase, he/she is more likely to feel invested and to follow through with the purchase.

One method of verification (for both contact center subscribers and their contacts) is voice biometrics via the Fourier transformation logarithm in the speech recognition engine of the contact center. The User or a Contact is asked to speak/voice a sentence and the response is analyzed and stored on the service servers in a secure SQL account.

Pre-recorded interactive voice calls are best used when they are scripted to be short, relevant, urgent, fun, timely, and focused. And, they can be created using the Artist's voice (fans probably prefer that) or Artist's rep voice. A non-limiting list of uses for interactive calls is the following: Ask fan what causes he/she cares about, timely show reminders, product release announcement and invitation for purchase pre-release or presale, ask for feedback on a song, an album, ask which of 2 or 3 songs is best placed as first song on an album about to be released, run contest (ask questions about Artist, winner wins something that may be delivered via new NEO, transfer to live conversation with the Artist, special invitation to an event, SMS with free download of music, . . . , ask fan for suggestions for subject matter/theme for songs, organize street team, manage street team communications, screen candidates for collaboration with the artist in a future recording, conduct ad hoc market research/poll about anything lawful, interview a fan or other contact, . . . .

Optionally, a metric is provided which sends alerts to the artist of the number of interactive voice calls the artist has sent to any given fan within a defined period of time. This helps to prevent harassment or perceived harassment. Alternatively, such information may be provided per a report accessible to the artist per the reports feature of the contact center.

The NEO's preferably contain information that is compliant with best practices of mobile marketing association. So, for example, delivered within the automated call are clear opt out information, a question asking the contact/call recipient to confirm his/her age is 18 or older, and the caller's phone number and/or website information.

Per another feature (i.e., 'Transfer to Live Attendant") of the web-based contact center, a fan optionally may be asked within the call if he/she would prefer to speak with the artist live. Per such a feature, the Artist schedules the broadcast to take place on a date and time when he/she plans to be accessible to interact with fans who take the call. This type of broadcast can be pre-announced and promoted and will help also to increase the number of call completions because a fan may look forward to taking the call if he/she is able to interact with the artist live and in real time.

Per another feature of the disclosed contact center, if a contact's device is Caller ID-enabled, when the phone rings, the Artist's name is displayed as a Caller ID thus creating some excitement and helping to encourage the fan to accept and complete the call. Alternatively, the contact center service provider's name can show up as Caller ID, thereby also signaling to the fan that the call coming is a NEO.

Per another feature, an artist may create his/her fan account when the artist desires to opt into receiving interactive communications from the artist's selected artist(s). In that case, the artist account and the fan account shall each have unique e-mails.

For a live music venue the disclosed business model fosters fans of the venue and helps venue more effectively target its advertising and marketing dollars to fans of the venue. This can be done with our without collaboration with the Artist/Artist's team for artists who will perform at the venue. One possible use of an interactive voice call for a venue is to ask the fan which artists the fan wants to see at the venue (i.e, a fan can demand an artist at a venue, potentially influencing bookings at the venue).

The contact center metrics include number (or percentage) of calls completed in each broadcast, the percentage of calls in the broadcast that are hits (contact answered the call), percentage of calls where one or more question escalations played (a metric of speech recognition quality level), number of calls which included completed transactions (credit card/PayPal purchase authorizations). As such, an Artist may evaluate the return on investment of the contact center subscription.

For added value, the contact center further comprises a feature whereby an artist may optionally record an audiovisual file of the artist during the artist's recording of events of the call. When the call is sent to a mobile device that is a smartphone that audiovisual file could be 'appended' to the call, meaning it is downloaded (at the fan's option) to the fan's mobile device when the fan accepts the call. The audiovisual file may be also be streamed online on the artist's page on the disclosed music site or the artist's page on any other website.

An optional UI feature allows a user to view the events of the script on the computer screen while recording the audio of each event of the script.

Voice biometrics Fourier transformation within speech engine for fan authentication for purchase authorizations within NEO . . . automating purchase within the NEO, alternative Yes to purchase questions triggers SMS with link for fan to finish purchase authorization.

Per one feature, the Artist is able to create a Contact Group that is subset of all of the contacts in the artist's contact file. For example, the Artist can select a fan base that is within a specified radius of a zip code. This is useful for sending NEO's that are concert reminders/invitations to a targeted group of the artist's fans. This targeting is efficient too as far as call minutes usage.

Disclosed also is a global/universal opt in, opt out feature and accompanying service provider hosted database whereby individual (consumers, voters) can take an express action to either opt in or opt out of receiving, to the individual's mobile device or landline device, or both, interactive voice calls launched using the disclosed contact center. The feature could be deployed as a mobile phone application (as described above) offered by the contact center service provider where the phone app is compatible with the operating systems of known mobile phone devices to facilitate the opt in or opt out. Per the opt in feature, an individual opting in receives a confirmation SMS to his/her mobile device as well as confirmation interactive voice call for effecting a double opt in. Optionally there is provided within the UI of the mobile phone app (or online at the service site of the contact center-provider/hosting entity) a dropdown box enabling individuals to select companies, (private or governmental) research organizations, whom the individual authorizes to be contacted via the interactive voice channel. Thus, optionally there may be provided a Universal Opt In (anyone can contact the individual via the prerecorded voice channel) or Specific Opt In, where the opt in is effective only for consenting to being contacted by the named entities. The Global Opt In Contacts Registry Database may be maintained and managed by the contact center-provider/hosting entity or independently or with or without contract with a governmental agency. Optionally, the opt in transaction may prompt the individual to provide certain information about himself/herself, such as profession, birth year, zip code, sex. Such a database thus facilitates the building of regional market research panels for various research projects that serve a social policy purpose of the governmental agency conducting the research or it serves the purposes of a private company or organization. The disclosed database is likened to the 'opt-in' for organ donation a licensed driver indicates on his/her driver's license, thus serving some social purpose.

The Universal Opt In may potentially be overridden (trumped) when the individual opts into receiving interactive pre-recorded calls from a specified merchant, company, organization. However, in that case, the opt in is effective only for that company and is ineffective for opting into any other company or entity.

Express Opt In is a built-in feature of the disclosed contact center whereby any individual (whether a current contact/customer) may expressly opt into NEO's from the owner of the account launching the Express Opt In Event.

Per a Global Mobile Marketing Registry feature, a there is an opportunity to develop a focused speech-enabled solution for both telemarketers (product/service marketers) and consumers for effecting automated, painless opt-in and opt-out and double opt-in for SMS, e-mails, and NEO's . . . and then maintaining such a database so it's always up-to-date. This Global Registry normally would require a mainstream commercial or advertising campaign to build awareness. The Global Mobile Marketing Registry could optionally provide a solution whereby all consumers could express their intent in this area by selecting (point, click) companies from whom they expressly consent to receiving pre-recorded interactive voice calls and SMS.

Maximizing the number (poll sample size) of citizens who are polled, where the citizenry is increasingly only accessible via cell phones, is a challenge in the US for example where laws require express consent to calls which use automated telephone systems (automated dialers for example, random digit dialers) or pre-recorded voice. Under one possible embodiment of the disclosed inventive feature of the disclosed contact center, a voter seeking registration as a registered voter is prompted in the registered voter application to either opt in or opt out of receiving calls which utilize automated telephone systems or pre-recorded voice. This system can greatly enhance a pollster's ability to interact with citizens.

Per an optional feature of the disclosed contact center, there is a "Transfer to Live Attendant" implemented via FreeSwitch back-to-back user agent. The original endpoints are the Speech server connected to a Contact, the transfer occurs, and the Contact leaves the Speech server and is connected with whomever the contact center user directs the transfer.

Disclosed also is an application of the disclosed contact center in the financial services advising industry. A hedge fund analyst or any another advisor/analyst in the financial services industry needs to communicate with investor/clients in a timely manner in order to share dynamic information about market conditions so that a client can make an informed investment transaction decision. Timely communication, each communication flexibly adapted for its intended purpose, sent in real time or near-real time, maximizes the volume of possible transactions with the client. The investor/clients vary in sophistication and thus the advisor will fashion the advice/information for each category of client. Calling each client, sometimes with repetitive information and advice, is inefficient. Thus, the ability to create and launch pre-recorded interactive calls, each based on a script readily customized for each category of investor (i.e, targeted for each category of investor), with a few points and clicks, the calls launched in a broadcast to each contact group (i.e., investor sophistication category) maximizes the level of the advisor's service to his/her clients and maximizes potential lucrative transactions with clients. The advisor gets a report in real-time showing client responses to questions in the interactive call and the advisor is able to timely act on the information gleaned in client responses in the interactive calls. The call may include the Transfer to Live Attendant Event if the client accepts the call and answers you when prompted with a question if the client wishes to initiate an investment transaction. Per this application, of course the investor/client has granted his/her advisor express consent for the pre-recorded interactive voice calls. The calls are more compelling and urgent and credible than an e-mail or SMS from the advisor because of the added element of a trusted voice. The disclosed application translates well into any other industry where there is a need for a trusted expert to interact with a client who has authorized the expert to contact the client with pre-recorded interactive calls launched using the innovative DIY contact center.

How to Launch an Interactive Voice Broadcast Using the Disclosed Diy Contact Center Here are the steps for teaching a contact center subscriber (here, the user is an artist, for illustration purposes only) to build and launch an interactive voice call campaign using the disclosed web-based DIY contact center:

You will need:
(1) Computer with an Internet connection and a web browser;
(2) Computer microphone (USB connection, mono);
(3) Web-based recording software or download the Silverlight™ plug-in—When you first access the contact center you will be prompted to download the Silverlight plug-in which allows you to use to do web-based audio recording from your desktop and within the contact center user interface, and
(4) An active, validated Artist Account 1. YOUR CONTACTS (FANS)—The contacts file in your Artist Account is automatically populated with phone numbers of your fans who have opted into receiving NEO's™ from you on www.NeoFanNetwork.com and who have accepted the site's Terms of Use Agreement. Remember, NeoFanNetwork is all about having PRIOR EXPRESS CONSENT FOR NEO's™ FROM YOUR FANS. This business model is in compliance with the federal statute, the Telephone Communication Privacy Act (TCPA). Also, note that currently, SoFi™ is designed for launching calls within the United States. NeoFanNetwork.com plans to soon support users abroad.

REGARDING OPT OUT'S—Your fan may opt out of receiving NEO's at any time by visiting www.NeoFanNetwork.com and opting out. When a fan opts out, that fan's contact information will be automatically deleted from your Contacts file and you will be unable to send NEO's to that fan. A fan may opt in after opting out.

2. YOUR CONTACT GROUPS—You are able to designate and name a contact group that is a subset of all of the contacts in your contacts file. Creating contact groups supports better targeting of interactions with fans and helps control your NEO™ minutes usage too. Thus, for example, you can create a contact group that comprises your fans who are Dallas-area fans and name that contact group something like 'Dallas Fans.' Additionally, you can create contact groups based on two built-in contact filters that are provided, namely an age filter (fans aged under 21, fans 21 and older), and a geography filter (fans who are located within a specified mileage radius of a NeoFanNetwork-participating venue).

3. SCRIPTING THE CALL—Before you start using the SoFi™ contact center, you need to write a script for the call. Think about what you want to accomplish in the call. Make your script as relevant, short, timely, and as personalized as possible so your fans feel they are having a conversation with you. This is possible with SoFi™ provided you use smart scripting. You'll get better at this with each campaign that you launch. And, you might even treat the NEO™ as an opportunity to reveal your charisma (your personality, your voice), so your fans, with each successive NEO™, get more insight into you as a person and an artist. That increases a sense of connection a fan has to you as an artist and may potentially help drive sales of tickets to your shows and sales of your products.

Recommended/Best Practices Format for Creating the Call Script

We recommend that you draft the script by building a 4-column table in a word processor software like Microsoft Word. The first column is for numbering each of the events of the script starting with zero. The second column is for categorizing each event of the script as a message, question, or (your contact's/fan's) response recording event. The third column is for inputting the branching and skipping logic for the scripted call (e.g., 'If YES Branch to (Event) 3.') The fourth column is for inputting the textual content of the call—what you will say/record. Once you are happy with the script, you should print out the script have it at hand when you are ready to make the audio recordings of the script.

For simple scripts (e.g., a message and one question), we have provided a Notepad within the UI for Audios. You can freeform input text into the Notepad. The Notepad is convenient because you can type the script into the Notepad, then read the text by looking at the UI while recording. However, the Notepad is limited (in space) is not suited for drafting complicated scripts comprising a large number of events and logics branches.

Break the script into discrete events. An event is either a statement (message) or a question. Questions can be open ended (we call them Recording Event type), confirmation (meaning they anticipate a YES or NO answer), numeric (meaning they anticipate an answer that is a digit from 0 to 9), or Customer Answer (meaning any single word answer).

NOTE REGARDING ESCALATIONS FOR QUESTIONS IN YOUR SCRIPT—The speech recognition engine will attempt to recognize your contact's response (for matching it with the anticipated responses you have specified in your script). If the engine does not recognize the response, by default, the question will be replayed (hoping the fan understands the question and then, that time, responds in a way the engine recognizes). In speech technology jargon, the effort to help the speech engine to recognize a response is called 'escalation.' If the engine cannot recognize the contact's response after three (3) attempts, the call will abruptly terminate and an automated attendant will say 'Goodbye.' If you don't want to simply repeat the question in an effort to get the fan to respond in a way the engine recognizes, you could record customized, scripted escalations. In an escalation, you are merely rephrasing the question and might, for example, ask your contact to respond by pressing DTMF keys on their device (i.e., 'Press 1 if your answer is Yes, and Press 2 if your answer is NO.') instead of responding with speech. SoFi™ accepts voice and DTMF responses for this reason.

4. CUSTOM ANSWERS. If your script contains a Custom Answer-type question, then you'll need to input the custom answers anticipated by each custom answer type question of your script. The custom answer must be a single word. You will give a name the customer answer group for each custom answer question in your script.

5. SPECIAL NOTE ABOUT TEXT-TO-SPEECH PROMPTS. If you are in a hurry and don't want to record audios for any given call, you may build your script using text-to-speech prompts (i.e., simply Prompts) which will be spoken by an automated (male or female, you specify) attendant. In creating a prompt, you first name it and then type the textual content for it. Then, utilizing the wizards (see the Sequence Building Step below), you add the saved, named prompts as (message, questions, or recording) events in the sequence-building step just as you use the wizards to add the audios for each event of the call.

6. RECORDING/UPLOADING VOICE RECORDINGS OF EACH EVENT OF THE SCRIPT. Plug the computer microphone into a USB drive of your computer and make sure the mike is turned on and the volume is adjusted. Be sure your computer recognizes the microphone. When you first access SoFi™ you will be prompted to download the Silverlight plug-in to your computer. Be sure that you have successfully downloaded that plug-in. Have the script handy so you can read from it while recording. Voice each event of the script. We recommend that you pause for a 1-2 seconds after you click RECORD in the Silverlight recorder before you begin speaking. Speak loudly. Stop recording, and IMPORTANT NOTE REGARDING THE AUDIO UPLOAD FEATURE: This feature is for uploading audios which contain your original and non-infringing content and you will so warrant when you accept the Terms of Use Agreement.

7. CREATING A CALL SEQUENCE—In this step you program the call, i.e., the call sequence, and you don't have to be a programmer. The smart UI of SoFi™, comprising Add Event, Add Branching Logic, and Add Skip Logic Wizards, has done the coding for you. Start with the first event of your script and add each successive event of your script as either a Message Event Question Event, or Recording Event. For each question event, you will be prompted to specify the type of question event (whether audio file or TTS prompt).

After you have added all of the events of the script, it is time to input the branching logic and the skip logic. Branching logic applies whenever you have question events (i.e., the call sequence goes to a particular event depending upon the fan's response to the question). Skip logic applies when call flow requires that the next event be bypassed.

SPECIAL NOTE ABOUT THE ADD SMS EVENT in the SEQUENCE BUILDING WIZARD: If you want to facilitate/trigger a purchase transaction with your fan from within any given NEO™, you can do it by incorporating the Add SMS Event into your sequence. So, for example, if your script includes the question: "Do you want to purchase my album before it is released at a special price of $8 per album, just for NeoFanNetwork members like you?" Then, if the fan responds with a "yes," your call sequence should include a branch to the SMS event you create which is merely a textual prompt which contains the URL of the site where the fan could click to effect the album purchase transaction.

8. BUILDING THE BROADCAST—To build a broadcast you first give it a unique name, assign to it one saved call sequence, and assign to it one or more contacts or contact groups. You will also be able to specify male or female voice (just in case the assigned sequence comprises TTS prompts).

9. LAUNCHING THE BROADCAST—You can launch the broadcast NOW (immediately) or you can schedule it to take place at a later date. If you launch the broadcast immediately ('Broadcast NOW'), the calls will be queued up immediately for each of the contacts you specified for the broadcast, but if contacts do not respond (are busy or unavailable), there are no retries. If you schedule the broadcast, you will specify a start date, whether the calls can be attempted weekdays or weekends, number of retries, and a start time and finish time. Note: The caller ID on your fan's devices (where Caller ID is enabled) will, as a default, show NeoBitSpeak and the NeoBitSpeak number reserved for the NEO's™ is 214.575.4807. If your fan returns the call (after having missed your NEO™ call), NO ONE WILL ANSWER at that number and the fan is so advised in the Terms of Use Agreement. If you want to provide your unique number or code as the default Caller ID, you are able to do that.

10. TEST THE SEQUENCE—We VERY STRONGLY recommend that before you launch your broadcast you first test the sequence by sending a broadcast to yourself only, and we recommend you do this 2-3 times. If you don't do this, it is more likely than not that the first calls delivered to your fans will be incomplete and will not play your entire sequence and will be a disappointing experience for your fans who accept the call. By launching the broadcast to yourself first you are able to check to make sure the branching logic (if any) and skip logic (if any) work as you intended it, and we recommend you answer the test call in different ways to more fully test the sequence and its logic. We also have found that launching the broadcast to yourself first 2 or 3 times helps to ensure a proper playback of all of the events of the script (i.e., without skips at the beginning of the call at Event 0 of the script).

11. REVIEWING REPORTS—Within the REPORTS function of SoFi™, you are able to review exportable reports that contain information about what happened during each call of your broadcast. In the Broadcast Detail Report you are able to review what transpired during the entire broadcast (detail for each call to each contact of the broadcast). Each broadcast is automatically assigned a unique Broadcast ID. We plan to continually refine and enhance the reporting capability within SoFi™ so you can expect to see enhancements in the near future. In the Calls Detail Report, you can view a detail of what transpired during each NEO™ to your fans. The Completed Calls Report gives information about calls that completed, meaning calls where your fan answered and each event of the call sequence executed/played and your fan responded. You will be able to see your fan's responses to each question of the call. Note we have implemented filters so you can select which fields to view in the report. The reports are exportable as a .pdf or Excel spreadsheet to your computer for review and analysis (as appropriate) using third party software (e.g., market research data analysis software).

12. FANS' RESPONSE RECORDINGS—You are able to access and listen to captured recordings of fans' responses to the open-ended questions (if any) in your call sequence for the broadcast. Please note that per the Terms of Use Agreement that your fan has accepted, you are authorized to stream the response recording online, however, you must first get your fan's express consent if you want to play the response recording audio within a future NEO™ that you launch, or for any other use. Thus, DO NOT USE THE RESPONSE RECORDING IN A NEO™ without asking the fan's permission to do so . . . and of course you can ask for that consent within the NEO™.

The following is a sample script table:

| EVENT # | EVENT TYPE | LOGIC | TEXT FOR RECORDING AUDIOS |
|---|---|---|---|
| 0 | Msg | | Hi. This is ARTIST. Hey, I'm calling to welcome you to NeoFanNetwork! I am excited you opted in. |
| 1 | Q-Custom Answer | If other-2; otherwise 3 | How did you discover me? Please say MySpace, Facebook, iTunes, or other. |
| 2 | Recording | | OK . . . How DID you learn about me? Please explain in your own words as I'd love to know. |
| 3 | Q-Confirmation | Yes-Go to 4; No-Go to 9 | Good to know! Have you been to one of my live performances yet? |
| 3Escalation | | | Sorry I did not get that. Have you seen one of my live shows yet? Please say YES or NO. |
| 4 | Recording | | Wow! I am happy to know that! Where was the show? Please tell me the name of the venue and the city. And if you don't remember where the show was, just say you don't remember it. |
| 5 | Q-Confirmation | Yes-Go to 6; No - Go to 7 | Did I perform my song that is your favorite? Please say Yes or No. |
| 6 | Recording | | Which one? Please say the song title if you remember it, or sing a line or verse. If you don't remember, just say I don't remember. |
| 7 | Recording | Skip to 10 | I will next time. And, by the way which of my songs is your favorite? If you don't remember the song title, just tell me you don't remember. |
| 8 | Msg | Skip to 10 | I write songs for fans like you. I mean it. |
| 9 | Msg | | I hope to meet you at one of my future shows. I'll call you with an invitation when I'm performing in your area. |
| 10 | Q-Confirmation | | I want you to have an excellent experience with the NEO's that I send you. Please tell me if the sound quality of this call is OK. Just say YES or NO. |
| 10Escalation | | | Sorry I did not get that. Was the sound quality of this call OK . . . please tell me yes or no? |
| 11 | Msg | | Thanks for interacting! Later my friend! |

This invention relates generally to automated telephone calling systems/services and more specifically to web-based outbound telephone calling systems/services using VoIP communication that are adapted to be cost-accessible to individual users. Specifically, this invention relates to web-based automated outbound telephone calling systems/services with VoIP and speaker-independent voice recognition and IP telephony which provide a user with a means for do-it-yourself programming of call logic.

Inbound automated telephone calling systems using IVR are known. A quick enumeration of known prior art systems for automated outbound telephone calling is helpful. An Automated Voice Messaging (herein AVM) service provides a method whereby a single message is digitally recorded then sent to a list of specified phone numbers via telephone and where no responses from call recipients are solicited or captured. The computer automatically dials the phone numbers and delivers the pre-recorded message. Automated Telephone Surveying (herein ATS) is used to collect information and gain feedback via the telephone and the Internet. Automated surveys are typically used by prior art call centers for customer relationship management, call center performance management, market research (products, services), polling, and satisfaction surveys. The process of setting up an ATS system comprises the following steps: (1) The service provider, hired by a client, designs a survey questionnaire meeting the client's instructions, (2) The service provider designs voice prompts and tests the survey, (3) When the survey goes live, customers who contact the call center will be asked, either by the agent or by a voice recording, if they would like to give feedback on the quality of the service they received. Customers who agree to take part are transferred to the survey at the end of their call. Transferring calls to the ATS system may be done manually by the person talking to the customer, or automatically using a Voice Response Unit (herein VRU). The customer is then presented with the survey which comprises a set of pre-recorded questions which prompt the customer to respond using the telephone keypad. The customer may also utter verbal responses, and (4) Data recordings of a customer's responses are saved and compiled on a secure server. Significantly, recordings of responses are captured but are not recognized via a speaker-independent voice recognition engine. The information may be accessed online.

An auto dialer is an electronic device that automatically dials telephone numbers to communicate between any two points in the telephone, mobile phone and pager networks. Once the call has been established (through the telephone exchange) the autodialer will announce verbal messages (often referred to as 'robocalls') or transmit digital data (like SMS messages) to the called party.

Interactive Voice Response (IVR) refers to interactive technology that allows a computer to detect voice and keypad inputs from a user. IVR technology is used extensively in telecommunications and is also being introduced into automobile systems for hands-free operation. In telecommunications, for example, IVR allows customers to access a company's database via a telephone touchtone keypad or via speech recognition and then service the customer's particular inquiry by following the instructions delivered by the IVR. IVR systems may be used to control a type of function (such as making a train ticket purchase) where the user interface can be broken down into a series of simple menu choices (e.g., where user is prompted to provide a destination, number of passengers, day of travel, preferred time of departure, desired class of travel). It has become common in industries that have recently embraced telecommunications applications to refer to an automated attendant as an IVR. So while the terms automated attendant and IVR are distinct and mean different things to traditional telecom professionals, professionals in emerging telephony and VoIP applications use the term IVR as a catch-all term to signify any kind of telephony menu, including a basic automated attendant.

Automated calling systems generally are known such as for example U.S. Pat. No. 7,386,102 entitled "System for remote control of an automated call system" and U.S. Pat. No. 6,169, 798 entitled "System and method for automatic call." Also known are web-based services such as Phonevite.com and Call-em-all.com.

The disclosed invention provides more functionality and improved and more versatile functionality than any of the above-named prior art systems for outbound telephone messaging and response because the disclosed invention can automatically play a plurality of say-messages, ask questions, record a call recipient's voice responses, and with user-defined logic programmed with the help of a user-friendly user interface (UI), branch to other messages or questions depending upon the received response from the call recipient thanks to a speaker-independent voice recognition engine. The disclosed system comprises some features of an autodialer, IVR, and automated telephone surveying/computer-assisted telephone interviewing, however the most accurate description is that of Automated Computer Telephone Interviewing (ACTI). ACTI is a telephone surveying technique by which a computer with speaker-independent voice recognition capabilities asks respondents a series of questions, recognizes then stores the answers, and is able to follow scripted logic and branch intelligently according to the flow of the questionnaire based on the answers provided, as well as information known about the participant. The disclosed apparatus provides the voice recognition capabilities which current automated telephone surveys lack. And, unlike prior art systems, the disclosed system is adapted to enable individual users (individuals, businesses of all types, market research companies) to conduct cost-efficient market research campaigns (including both quantitative, screening research as well as qualitative research as appropriate) using the telephone. There is no need to invest in expensive hardware to run the service, there is no need to employ a call center or a market research company, because the user programs a survey questionnaire from his/her computer connected to the Internet and (preferably) having voice recording capability, specifies a broadcast comprising contacts phone numbers and broadcast schedule, and in real-time the system automatically captures broadcast call detail and generates a report accessible online. There is no need to invest in costs associated with live focus groups, unless and until the screening research using the disclosed service indicates this is needed. There is no need to invest in live telephone attendants. And, in the case of qualitative research typically conducted with live focus groups, because many targeted respondents for focus groups are busy professionals (such as doctors and lawyers), the disclosed service may potentially be more attractive to such respondents because the respondents don't need to travel to a focus group site. The disclosed system provides a service to users so that users do not have to make an expensive investment in architecture of known prior art systems for automated messaging and so that users do not need to outsource automated messaging to third parties such as call centers. Disclosed is a web-based service that enables DIY for users seeking to communicate with contacts via automated telephone messaging and response.

Significantly, the disclosed invention is adapted to enable individual users to program then broadcast a do-it-yourself survey and market research campaign via a telephone. The disclosed system enables efficient broadcasting of a large number of market research screening (recruitment) calls without the need for a live attendant and even if some call recipients do not participate/are non-responsive to the broadcast call the number of potential completes can be efficiently maximized over time.

The applicant has invented an AVM system capable of supporting ACTI, a telephone surveying technique by which a computer with speaker-independent voice recognition capabilities makes statements, asks respondents a series of questions, recognizes then stores the answers, and is able to follow scripted logic and branch intelligently according to the flow of the survey questionnaire based on the call recipient's responses, as well as information known about the participant. Respondent answers to open-ended questions can be recorded, stored, downloaded by the client to a client computer, and reviewed upon broadcast call completion. Individuals or businesses now have a cost-effective, robust online tool to conduct their own, customizable market surveys in minutes of programming time by a user from a user computer having a browser to access the disclosed service. Prior art methods for market research utilize human respondents who are invited to participate in market research focus groups where focus group sessions are conducted by a human moderator and recorded, and later transcribed and reviewed by a moderator hired by the client who delivers a report to the client. With the disclosed system/service, a user desiring to conduct market research can avoid the preceding steps and associated costs. The user identifies a target group of respondents (contacts) for any particular market research project, programs a sequence for a broadcast to the contacts/contact group(s), launches the scheduled broadcast, and reviews reports captured by the disclosed system.

Automated outbound call messaging and response capture systems accessible to individuals for a broad spectrum of uses independent of the need for outside service providers (such as but not limited to programmers, consultants, market research companies, or call centers) are not known to the applicant. The power of efficiently and cost-effectively sending automated voice calls to a plurality of contacts for various communication and response capture/recognition purposes, including for purposes of conducting market research, via a user-modifiable specification for controlling call logic based on a call recipient's responses is now in the hands of the individual (consumer) user, the small business-entity user, and the large business entity-user.

III. Summary of the Invention

Disclosed is a web-based automated outbound call messaging and response capture system, method, and apparatus comprising speaker-independent voice recognition and IP telephony and UI enabling a robust user-programmable logic for do-it-yourself personal surveys and market research. The UI wizards make the disclosed application a user-friendly, robust online tool for enabling various types of telephonic communication sessions with a target call recipient, and including fully automated telephonic sessions for conducting market research. The disclosed web-hosted invention puts the power of programming customized interactive call 'sequences' (as further described below) in the hands of the individual user. The invention is affordable for individuals and small businesses as well as large business entities because there is no need to invest in expensive hardware (as per prior art systems) to deploy the required system architecture. The user does not need to outsource the capability to third parties resulting in a cost savings to the user.

The system architecture for practicing the disclosed invention is detailed below in the section on detailed description of the drawings.

Per the web-based model, the user accesses the disclosed invention (system, tool) using a user computer and browser and pays for usage based on information relating to the quantity or duration of calls broadcast using the system. Other payment systems are also possible such as a periodic (e.g. monthly subscription fee (like a license fee)) or a hybrid fee (e.g., periodic subscription fee plus a call duration/call usage-based fee, and/or a bundled-minutes package fee).

The disclosed web-based system may be hosted by one or more user-entities (e.g., the applicant as the licensor entity and multiple licensee-entities) whereby each user-entity set ups the disclosed system architecture and makes the tool available to a selected group of internal users or external users in a defined market. So, for example and not by way of limitation, a user-entity may be a market research company/licensee that brings the disclosed functionality in-house making it available to its internal staff.

Another advantage to the business entity-user is that the disclosed system frees up user's staff time in that the staff are not needed to service the swell of inbound calls that typically follow an automated outbound broadcast per prior art systems which do not have speaker-independent voice recognition and capture of audio recordings of call recipient responses. The disclosed system/apparatus does all of the work: makes the calls, captures recordings of responses (as programmed by the user) and other attributes of the call, prepares call detail reports, saves the reports, and may deliver call detail data to the user in real-time. There is no swell of inbound calls to the user after the broadcast because contacts' responses are recognized and captured. The user/user's staff may access, review, and act upon the information per the saved transaction/call detail reports in real-time or at such time that the user/user's staff is available to do such follow-up work.

Another advantage of the disclosed invention is that the application is readily programmable by the user for various desired calls with the help of a user interface comprising a series of pre-programmed wizards prompting the user to create sequence to accomplish what the user seeks from the call. A sequence, as further described below, is a set of user-programmable instructions comprising message events and call loop logic tied to a call recipient's responses to the message events.

For illustration only and not by way of limitation, possible uses of the disclosed tool include customer/purchaser surveys, market research (quantitative, screening, qualitative), soliciting feedback from a group of (social, business) contacts, polling (of constituents for example), service request customer intake (technical repair service, automobile repair service, repair services in the home), communicating patient lab test results (customer pre-registration (e.g., medical office patient registration), post-market surveillance, patient follow-up care/monitoring, meeting/appointment reminders/confirmation, collection of past due payments on customer accounts, emergency messaging (e.g., product recalls, security breaches), advertising, any use where a user desires to stay in contact with a number of contacts (organizational groups, social networking groups) for specific communication/response purposes. The disclosed tool can meet a broad spectrum of communication needs and can be used by individual consumers, market research companies, government, professional associations, trade associations, industry (e.g. for remote provisioning applications), small and large businesses alike who want to communicate with a group of contacts and obtain information from the group of contacts.

The disclosed tool is especially helpful and promotes efficiency in the context of screening (e.g., quantitative, recruitment for a focus group, and including qualitative) market research via a telephone. In that context the automatically delivered, pre-programmed sequence helps to eliminate bias that may exist in prior art systems where a live human attendant asks the survey questions. Additionally, because the disclosed tool captures audio recordings of a call recipient's voice responses it is possible to capture more information from a call recipient. Voice capture can help promote more accurate analysis of market research data because it provides the ability to analyze data contained in a call respondent's voice intonations.

Per one embodiment of the disclosed system a means for both user and call recipient (contact) authentication is included to promote security in the disclosed system. As a result, biometrics may be optionally incorporated as a way to add security to an application. A user's voice biometrics is generally tied to the device on which the user is enrolled because audio can sound radically different on different phones. Voice biometrics could be combined with requiring the user to enter a secret PIN number using DTMF or voice. So, for example in a market research application, the user may initially communicate with a contact/target respondent by capturing an audio signature for that contact/target respondent and later verifying that audio signature via a Fourier Transformation. This latter approach is speaker recognition which in essence is speaker verification (as contrasted with voice recognition, recognizing what is being said).

The invention may be understood based on this description, the drawings below, and the sample screen shots which comprise the user interface of one embodiment of the disclosed apparatus.

The basic steps in the method of using the preferred embodiment for the disclosed apparatus for automated outbound call messaging and response capture are as follows:

(1) SIGNING UP FOR THE SERVICE—Via a user computer having Internet access (and preferably a means for voice recording at the user computer, which may include a means for web-based audio recording), a user accesses (e.g., via the URL of the website home of) the disclosed system/apparatus/service (herein the term 'tool' may also be used for convenience) and becomes a registered user/subscriber by creating an account profile (which comprises a user e-mail address). In the account setup, the user typically also specifies a type of payment account/method the user chooses for payment for use of the tool. Minutes of call usage-type payment systems and hybrid payment systems which combine a periodic (e.g. monthly subscription fee, like a license fee)) fee and a call attribute-related pricing (e.g., call duration, type of call) are possible.

(2) INPUTTING of CONTACTS—For any given type of desired outbound call session/desired end use, whether for example and not by, way of limitation a market research call session to a target group of respondents or a call to remind customers/patients of an appointment, via the disclosed UI, the user inputs contact information (attributes including but not limited to a phone (fixed line, mobile) number) and may organize contacts into contact groups. Contacts (assigned to any given broadcast (see below) are the call recipients for a broadcast call. Saved contacts, contact groups are stored in a searchable SQL database. Optionally, the inputting of contacts may incorporate contact attributes such as not limited to a user-assigned PIN to provide for a type authentication (which is desired for certain uses such as for example for a contact who is a patient receiving personal medical lab test results from a medical services provider-user).

(3) CREATING MESSAGE (say-type and question-type) EVENTS—The user is prompted via the UI to program (create, name) one or more message events which are automated messages that will be automatically delivered/played (in accordance with a user-programmed sequence (see below)) when a broadcast call is answered by a contact. The type (content) of message and the number of messages depends upon the type of call to be broadcast (i.e., the purpose of the call, the type of information to be collected). In this step, the user anticipates how the desired call session should progress and thus creates messages appropriate for that call. The messages are stored in a relational database. A message may be an audio file (comprising pre-recorded and saved audio files stored on the user's computer and uploaded to the disclosed tool, and/or newly-created audio recordings which the user may record using a web-based audio recording wizard) or a text that the disclosed system will automatically treat as text-to-speech (TTS), depending upon user preference. Message events could be a Say Message-type (a statement) or Ask a Question-type. So, by way of illustration in the case of a market research-type call, the message events may include (1) Say Message-type event whereby the message event informs the call recipient about the purpose/nature of the call and expected call duration, (2) an Ask a Question Message-type event whereby the message invites the call recipient to authenticate his/her identity (via for example a yes/no confirmation-type Ask a Question message. The decision between using an audio file vs. a TTS-type message prompt input is a decision the user will make based on time expediency and the quality (naturalness) of call session experience desired to be achieved. For example, to the extent the user wants a call respondent to have a high quality experience the user may opt to use more audio files. Messages that are Ask a Question-type messages events are one of the following types: confirmation (yes or no answer is anticipated), numeric (a numeric answer is anticipated), or Custom Answer (i.e., open-ended question which anticipates a 'custom' or unique answer that is a single word or phrase). As an optional time-saving and keystroke-saving feature, the disclosed service may give users access to an already populated database of saved Messages which the user may utilize in programming the user's unique call sequences (see below).

(4) CREATING ANSWERS AND ANSWER GROUPS— In this step, the user anticipates the possible responses from a call recipient to the Ask a Question Message-type events created per Step 3 above. For each of these responses, the user creates an Answer or Answer Group and the Answer and Answer Group are automatically saved in the searchable SQL database. The Answer or Answer Group may be a single word (e.g., yes, no, two, three) or short phrase (not now, I liked it very much). Custom Answer Groups are a collection of up to nine (9) single word answers associated with an Answer Group Name. Custom Answers provide the user with the ability to create his/her own dynamically generated speaker-independent voice recognition grammar collections. The voice recognition engine of the disclosed service can usually recognize words stored and retrieved from the database during a call and provide a response match if the word spoken after a question during the call is recognized. The applicant is not aware that this feature is available with other web-based services for automated messaging systems. The number of Answers and Answer Groups is limitless and will depend upon what the user identifies as appropriate for any given call or type of call session. The Answers and Answer Groups are created and saved so that when a call recipient responds to a broadcast call, the disclosed apparatus uses dynamic voice recognition during runtime to recognize or match the answer (with saved Answers or Answer Groups in the database) so to be able to process the user-programmed logic as per the next step, the sequence-building step.). As an optional time-saving and keystroke-saving feature, the disclosed service may give users access to an already populated database of saved Answers/Answer Groups which the user may utilize in programming the user's unique call sequences (see below). Per an optional feature, a means is provided to the user to elect to randomize the order of the Ask a Question-type message events. This feature may be important in a market research-type application.

(5) BUILDING (PROGRAMMING) A SEQUENCE FOR A BROACAST—With the aid of the sequence management wizards of the disclosed UI, the user creates and names a sequence which is the heart of the broadcast that controls what happens in the call session, i.e., how the call is managed in response to and based upon call recipient responses. The named sequence is automatically saved in a relational database. Sequences comprise are a group of events including Say Messages-types, Ask a Question Message-types, Record a Response Recordings, and Logic which the use programs to occur during each broadcasted call. Sequence event management allows the user to control the "flow" of events which occur during a call. Messages played during a call can either be Audios or Text-To-Speech (TTS) Prompts. Per the preferred embodiment two types of event Logic exist: Question Branching and Event Skipping. An elaborate Sequence Management panel is available for the user to add, remove, and manipulate Sequence Events. The Sequence Management panel also provides five wizards to assist the user with adding sequence events and sequence logics. The user creates a program, namely a set of instructions, comprising selected events which are of the Say Message-type, Ask a Question-type, and Record Response-type (the latter being whereby the system automatically records the call recipient's response and saves the audio file in a relational database; per optional features, the recording per the Record Response-event may be e-mailed as a .wav file to the user or the audio file may be converted to text and included on the call detail report per below) and the logic linking the events. The logic comprises event branching and skipping. Branching operands include if/then, equal to, not equal to, less than, and greater than. Other logic operands are possible and are known to those of ordinary skill in the programming arts.

(6) SPECIFYING A BROADCAST—In this step, the user assigns contacts/contact groups and a sequence to a broadcast, and specifies the schedule for the broadcast Broadcasts may be broadcast immediately (Broadcast Now) are broadcasts may be scheduled for a specific day and time in the future.

(7) LAUNCHING OF A BROADCAST—The service automatically launches a broadcast when the scheduled day and time for that broadcast are reached in real-time. The call is made to each contact and call recipient responses are recorded (whenever the sequence comprises a Record Response-type message event). The speech recognition engine of the disclosed apparatus matches call recipient responses with user-saved answers/answer groups as the system runs the sequence and its associated call logic.

(8) EVALUATION OF CALL DATA VIA AUTOMATICALLY-GENERATED REPORTS—The user may view a summary report updated in real-time (available as a .wav file when the call is disconnected) during a broadcast or alternatively view the call results at a later time. The automatically generated report captures key attributes (or transaction detail) of the call. The report is displayed in real-time with the report data updated every sixty (60) seconds.

(9) NEW PROGRAMMING BASED ON INFORMATION GLEANED FROM A BROADCAST CALL— Based on information gathered in the broadcast call and captured in the automatically-generated call detail report, the user may re-program (edit) a saved broadcast or create a new broadcast (with a new sequence comprising new events, event logic) as appropriate. Optionally, for market research-type broadcast calls, the captured responses per the call detail report may alternatively be 'dumped' into a linked market research analysis application for market research quantitative data analysis. For market research applications where the user desires to gather additional (qualitative) information that is made possible best when focus group respondents interact in a live focus group moderated by a live moderator in a focus group suite, that user may, as a follow-up to the screening broadcast, schedule a live session inviting a specially selected subset of contacts. Thus, the disclosed service is an additional efficiency-promoting tool in the tool box available to users desiring to conduct market research studies, including qualitative market research.

Convert Audio Feature

A feature of the preferred embodiment of the disclosed system is the Convert Audio feature whereby a user may program a sequence to broadcast to himself/herself as a contact, where the sequence includes at least one Record Response (recording) event, accept the call and respond to the call. The user then may access the recording per the Record Response event and save it in the SQL database of saved Audios for use in programming sequences. The Convert Audio Feature offers an alternative, convenient and effective way to capture user-voice audio recordings of messages. Thus, the Covert Audio Feature is offered in addition to other means the user may have for voice recording, such as web-based recording wizards.

Selected features of the disclosed system include the following:

Contacts upload—.CSV (comma delimited files)
Audio upload—.WAV, .WMA, .MP3
Audio download—zipped .WAV files
Report exports Excel, .PDF Broadcast types—Immediate with no retries or Scheduled with a specified number of retries, GMT time zone selection, days to call, start and end time selections based on selected time zone Three Questions types: Confirmation (Yes/No), Single Numeric—0 through 9, and groups of single word Custom Answers Text-To-Speech prompts Sequence logic—branch to different messages based on question response or skip from one message to another; For example: If call recipient response=Answer Group A then Say Message "Thank you for your input."

Custom Voice Recognition/DTMF Answers—nine custom answers per answer group are supported. Answers are stored in alphabetical order and DTMF numbers one up to nine is assigned to each answer. The number zero is reserved for future use (e.g., unsupervised transfer to live operator).

Optional market research data analysis application—recorded responses are captured then analyzed via a data dump to a market research data analysis program/application that may be integrated with the disclosed service or linked in some way to the disclosed service.

The disclosed invention, a web-based outbound messaging/response tool using VoIP communication, can deliver more than one message, ask a plurality of questions/query the call recipient, and with user-defined logic branch to other messages or questions depending upon the response received from the call recipient. The call recipient interacts with the tool via normal speech which is interpreted using the voice recognition or with DTMF responses. This can be done in real time or per a user-programmed broadcast schedule. The messages may be pre-recorded audio files which are uploaded or user input text messages which the tool converts to speech using TTS program. The questions may yes/no-type, numeric answer-type, or open-ended/complex-type (herein referred to as Custom Answer). The user anticipates possible answers to the Customer Answer questions and programs one or more possible answers. A call recipient's answers to open ended questions are recorded and stored in real-time and may be accessed and downloaded by the client upon broadcast call completion.

The speaker-independent voice recognition engine used in the disclosed system currently supports two forms of grammar recognition: keyword and concept answers (conversational grammar where the user uses natural language to answer open-ended questions). Keyword grammars are single words or short phrases which the speech engine will recognize. Custom pronunciation support is also possible with the disclosed system and is deemed to be within the scope of the disclosure. Additionally, the disclosed invention may be adapted for languages other than the English language.

Per an optional feature, immediately when a call recipient answers a call, (1) a Say Message is played which informs the call recipient of the nature of the call and the expected call duration/anticipated demand on the call recipient's time and (2) is followed by a Confirmation question asking the call recipient to respond with a yes/no whether the call recipient wants to take the call at that time or alternatively whether the user wishes to postpone the call and optionally (3) asks a Custom Answer-type question prompting the call recipient to suggest a callback date and time. This optional feature when programmed into a sequence helps to promote satisfaction in the experience a call recipient has with the system.

Additionally, probing events could be incorporated into the sequences as desired by the user.

The disclosed system optionally may incorporate a user interface whereby the system accepts a user's verbal commands via a Bluetooth wireless headset with voice interface.

Per an optional feature of the disclosed system, users are provided searchable access to a database of sequences created and saved by other users of the service. The creators of the sequences authorize the inclusion of their selected sequences in the above-referenced database for access by other users.

Partial features list:
- Contact upload—.CSV (comma delimited files), 4 MB file size limit
- Audio upload—.WAV, .WMA, .MP3; 4 MB file size limit
- Audio download—zipped .WAV files
- Recorded Audios can be converted for use in later broadcasts
- Report exports—Excel, .PDF
- Broadcast types—Immediate with no retries or Scheduled with up to 5 retries, GMT time zone selection, days to call, start and end time selections based on selected time zone
- Three Questions types: Confirmation (Yes/No), Single Numeric—0 through 9, and groups of single word Custom Answers
- Text-To-Speech prompts—Text To Speech (TTS) phrases stored in the database which can be read and spoken by the computer as a message during a broadcast.
- Sequence logic—branch to different messages based on question response or skip from one message to another
- Answers: groups of lists of nine or less single words or short phrases which can be recognized as a spoken response to a question.
- Custom Voice Recognition/DTMF Answers—nine custom answers per answer group are supported. Answers are stored in alphabetical order and DTMF numbers one up to nine is assigned to each answer. The number zero is reserved for future use (unsupervised transfer to live operator).

The disclosed system may be broken down into ten categories of functionalities. A common control used in many categories is the ASP Gridview which is used to handle data operations such as paging, sorting, and editing. The categories and their associated options, per a preferred embodiment, are as follows: Profile (add credit, change password, update profile; for enabling user account management functions), Contacts (select, unselect, delete, upload, view country codes, add a contact; for enabling management of contacts information which may include name, country code, phone number data), Groups (select, unselect, delete, manage group contacts, add group; also for management of contacts information), Prompts (select, unselect, delete, add; for management of events to be used in sequence-building), Audios (select, unselect, delete, upload, play audios via the Audio Player), Answers (select, unselect, delete, manage answer groups, add answer group), Sequences (select, unselect, delete, manage, add), Broadcasts (select, unselect, delete, manage, add), Reports (view transactions report (comprising the data fields: timestamp, amount, transaction ID, Payer ID, Comments, Name, Phone, Duration), view call details report (comprising data fields: job submitted date and time, broadcast name, sequence name, contact name, phone number, call status, call duration, call timestamp, event type, message, value, and summary), Recordings (select, unselect, delete, download recorded audio files, use recorded audio files for broadcasts).

UI for Management of Sequences

Management of sequences is an important feature of the disclosed do-it-yourself system for automated outbound call messaging and response capture. A sequence refers to a program created by the user for instructing the system to control events in any given call session. A sequence comprises a collection of events. Three types of events are supported: Play Message, Ask Question, or Record Audio-based response. Three types of questions are available: Confirmation (Yes/No), Numeric (0 to 9), or Custom Answer-type. The preferred embodiment of the disclosed apparatus provides for the following functionalities for management of sequences: select all sequences (that have been created and saved by the user), unselect all sequences, delete (removes sequences and events within the sequences from the database), and manage sequences. The Manage Sequences functionality presents many controls to the user and it is recommended that the user work through panel in a top to bottom fashion. The first control is a drop-down list used to select the Sequence for which to manipulate. The next control is a list of Events which have been previously created (with a new Sequence this list will be empty). Below the Events listbox is a row of buttons labeled: Delete, Up, and Down. When an item in the Events listbox is selected this buttons provide the ability to'remove the Event by depressing the Delete button or realign the order of the Event with regards to other Events by depressing the Up or Down buttons respectfully. The next row of buttons includes the following functions: Add Message Events, Add Questions Events, and Add Recording Events.

The Add Message Events Wizard consists of three steps: Start, More, and Finish. The Start step displays a radio button group with two choices: Audio or (text) Prompt; and a listbox containing available messages. If the Audio radio button is selected then the listbox is populated with all available Audios and if the Prompt radio button is selected then the listbox is filled with all available Text-To-Speech (TTS) phrases. The user should now select a message to be played. The More step first displays all prior messages which have been added during the use of the Wizard, because the Wizard is recursive there may be multiple messages displayed in the top most listbox. A delete button is available to remove selected messages if the user desires. Beneath the delete button is a radio button group consisting of Yes or No options to determine whether the user would like to add more Messages; if Yes is selected the user is directed back to the Start step or if the user selects No they move to the Finish step. During the Finish step if the user depresses the Finish button all new Messages are created and committed to the database and the user is returned to the Manage Sequences panel.

The Add Sequence Event Questions Wizard is comprised of three steps: Start, More, and Finish. The Start step contain many controls and should be completed beginning at the top and work towards the bottom. The first controls at the top are a group of radio buttons used to select the question type. There are three Question types which are supported: Confirmation (Yes/No), Single Numeric (0 through 9), and Custom. When the Custom Answer radio button is selected a listbox will appear to the right of the control with a list of available Custom Answer Groups to select from. Below the question type control group is the question Message to be played, this is a required selection. The user will have the choice of using an Audio or a Prompt, depending on which radio button the user selects the list control to the right will populate with the available choices. There are four remaining optional groups of controls: Silence, Extended Silence, No Recognition, and Extended No Recognition. These controls provided the selection of Audio or Prompt messages to be played when the question is not answered or the response to the question is not understood. The step Next asks the user if they want to add more questions; if yes the user is returned to the Start step of the Wizard otherwise they are moved to the Finish step. The Finish step will close the Wizard and return the user to the Manage Sequences panel.

The Add Sequence Event Recordings Wizard contains three steps. The Start step asks the user to select a Message or Prompt to play which is usually in the form of a question requesting an open ended response from the user which will be recorded are stored in an audio file for future playback, download, or use in a new Broadcast. The More step first displays all prior messages which have been added during the use of the Wizard, because the Wizard is recursive there may be multiple messages displayed in the top most listbox. A delete button is available to remove selected messages if the user desires. Beneath the delete button is a radio button group consisting of Yes or No options to determine whether the user would like to add more Messages; if Yes is selected the user is directed back to the Start step or if the user selects No they move to the Finish step. During the Finish step if the user depresses the Finish button all new Messages are created and committed to the database and the user is returned to the Manage Sequences panel.

Beneath the row of Add Events buttons is the Logics listbox which contains logic operatives which control the flow of the Sequence Events. Two forms of logic operations are available: Question Branches and Skips (other forms of logic may be incorporated as appropriate for any given application and as known in the logic programming arts). The row of buttons below the Logics listbox allows the user to delete existing logic operatives or to add new logics. To delete existing logic select an item within the Logics listbox and depress the Delete button.

The Add Sequence Question Event Logic Branches Wizard is comprised of three steps: Start, More, and Finish. At the top of the Start step is a listbox containing all Questions within the Sequence, the user will select an item from the list to add Branching logic. Beneath the Sequence Questions listbox is a row of controls containing Operator and Value drop-down listboxes. The Operators available which the user will select one of are: Equal To, Not Equal To, Less Than, and Greater Than. The items populated within the Values drop-down listbox will vary depending on the question type. If the selected question type is a confirmation then the items available will be Yes or No. If the selected question type is a numeric then the numbers 0 through 0 will be displayed. Finally, if the question type is Custom, then all Answers available for the Custom Answers Group will be listed. The bottom listbox contains all Events for the selected Sequence. The user should apply logic from selecting a question to branch from based on operator and value and then select an Event item to Branch to if the Operator and Value criteria is met. The More step first displays all prior Logic Branches which have been added during the use of the Wizard, because the Wizard is recursive there may be multiple items displayed in the top most listbox. A delete button is available to remove selected items if the user desires. Beneath the delete button is a radio button group consisting of Yes or No options to determine whether the user would like to add more Logic Branches; if Yes is selected the user is directed back to the Start step or if the user selects No they move to the Finish step. During the Finish step if the user depresses the Finish button all new Logic Branches are created and committed to the database and the user is returned to the Manage Sequences panel.

The Add Sequence Event Logic Skips Wizard contains three steps: Start, More, and Finish. The Start step contains From Event and To Event listboxes. The user will select an item from each of the two listboxes. The purpose of the selection is to allow the user to enable logic to skip from one event to another without executing events which lay between the two selected items. The More step first displays all prior Logic Skips which have been added during the use of the Wizard, because the Wizard is recursive there may be multiple items displayed in the top most listbox. A delete button is available to remove selected items if the user desires. Beneath the delete button is a radio button group consisting of Yes or No options to determine whether the user would like to add more Logic Skips; if Yes is selected the user is directed back to the Start step or if the user selects No they move to the Finish step. During the Finish step if the user depresses the Finish button all new Logic Skips are created and committed to the database and the user is returned to the Manage Sequences panel.

UI for Management of Broadcasts

The term broadcast refers to the combination of (1) contacts and a sequence(s) for a given automated outbound call. The preferred embodiment assigns a single sequence to a broadcast, however it is possible to embed more than one sequence in a broadcast and such capability is deemed to be within the scope of this invention. The disclosed apparatus provides for the following functionalities for management of broadcasts: select broadcast, unselect, delete, and manage broadcasts. The Manage Broadcasts functionality invokes a wizard used to assist the user with initiating a Broadcast. The Broadcast Wizard consists of six steps: Start, Contacts, Sequence, Type, Schedule, and Finish. During the Start step the user selects a Broadcast. The Contacts step allows the user to select which Contacts the Broadcast should use. The Sequence step provides the user with a list of available Sequences to select from which the user has previously created and stored. The Type step asks the user if they want to Broadcast now or Schedule the Broadcast. The Broadcast now option begins the Broadcast immediately; it does not provide Retries as it will attempt to call the Contact a single time. If the user chooses to Schedule a Broadcast then the Schedule Broadcast step is presented. During the Schedule step the user is presented with the following options:

Time zone to base the Broadcast on; the default is based on time zone in the user profile Days to Call: Everyday, Weekdays, or Weekends Number of Retries: None, 1, 2, 3, 4, 5; the default is 3

Retry Interval (in Minutes): 1, 2, 5, 10, 15, 30, 60; the default is 5 minutes

Start Time: 0 through 23 hour intervals

End Time: 0 through 23 hour intervals

Start Date

The last step is Finish. When the Finish button is depressed the Broadcast begins if the Broadcast Now option was selected, or the Broadcast is placed into a Schedule queue and will be triggered when the scheduled day and time are reached. If the Cancel button is depressed then the Broadcast will not occur.

Optional Do Not Call Feature

The National Do Not Call Registry applies to any plan, program, or campaign to sell goods or services through interstate phone calls. This includes telemarketers who solicit consumers, often on behalf of third party sellers. It also includes sellers who provide, offer to provide, or arrange to provide goods or services to consumers in exchange for payment. The National Do Not Call Registry gives consumers an opportunity to limit the telemarketing calls you receive. The National Do Not Call Registry is managed by the Federal Trade Commission (FTC), the nation's consumer protection agency. It is enforced by the FTC, the Federal Communications Commission (FCC), and state law enforcement officials. Organizations can acquire yearly subscriptions to access the National Do Not Call Registry. A Full List Download is a download that contains all the registered telephone numbers within the area codes that are part of your organization's subscription. Downloads of multiple area codes or states have to be done by file. Each area code or state list is a discrete file. A download of the entire National Registry is one discrete file. The format of the download file is comma-delimited text files containing one area code and telephone number per line, separated by a comma.

The embodiment of the disclosed system which incorporates the Do Not Call Feature comprises a SQL database table which contains all phone numbers in the National Registry. Before a call is broadcasted the contact phone number should be compared to entries stored in the Do Not Call table; if a match occurs the call is not broadcasted (even if the contact is included in the group that is to broadcast) and the associated Call Detail Record (CDR) will contain an appropriate error description. The website for the disclosed system may optionally provide users with an interface to add their phone number to the internal database table. Additionally an extra description field may be incorporated into the Contacts table denoting whether each contact is exempt from the Do Not Call list, i.e. the contact is personal and not business/sales oriented.

Optional Telephony Feature's

System architecture required to practice the disclosed system and method is described in the section on detailed description of the drawings. This paragraph highlights some of the optional additional telephony features that may be incorporated. A back-to-back user agent (B2BUA) is a logical Session Initiation Protocol (SIP) network element. It resides between both end points of a phone call or communications session and divides the communication session into two call legs and mediates all SIP signaling between both ends of the call, from call establishment to termination. Each call is tracked from beginning to end, allowing the operators of the B2BUA to offer value-added features to the call. In the originating call leg the B2BUA acts as a user agent server (UAS) and processes the request as a user agent client (UAC) to the destination end, handling the signaling between end points back-to-back. A B2BUA maintains complete state for the calls it handles. Each side of a B2BUA operates as a standard SIP network element as specified in RFC 3261, the official SIP specification.

For the disclosed system, a B2BUA may provide the following functions:
  Call management (billing, automatic call disconnection, call transfer, etc.)
  Network interworking (perhaps with protocol adaptation)
  Hiding of network internals (private addresses, network topology, etc.)
  Often, B2BUAs are implemented in media gateways to also bridge the media streams for full control over the session.

Integrating a B2BUA into the system architecture for another embodiment of the disclosed system can provide the following additional features and functionalities:
  Ability to interact with most voice-oriented communication devices such as the PSTN, SIP, Skype, or Google-Talk.
  Sending voicemail via SMTP (Email) from Windows
  Callback support from inside Voicemail
  Adjust Volume, Gain and Energy lever per call
  Provides Call Transfer and Call Conferencing (including Wideband)
  Nano Second Call Detail Records (CDR) granularity
  Record or Monitor Calls Sample Message Events Relating to No Recognition Events Because call recipient's responses sometimes may not be immediately recognized by the system, optional message control groups as follows may be created and utilized as events in any given sequence:

1. Extended Silence Message Control group: If the Contact called continues to not respond either verbally or by depressing a numeric key on the telephone keypad after another two seconds this message will be played. This message group selection is optional but recommended. An example of a message which could be played in this control group is: "I am sorry but I could not hear you. Please press one for yes or two for no."

2. No Recognition Message Control group: if the verbal response from the Contact cannot be understood this message will be played. This message group selection is optional but recommended. An example of a message which could be played in this control group is: "I am sorry but I could not understand what you said".

3. Extended No Recognition Message Control group: if the verbal response from the Contact still cannot be understood this message will be played. This message group selection is optional but recommended. An example of a message which could be played in this control group is: "I am sorry but I could not understand what you said. Please press one for yes or two for no."

Additionally, there is a feature whereby a recorded question event may by default automatically serve as an escalation (one or more of the silence, extended silence, no recognition, extended no recognition, or all of these). This is a time-saving feature as the user does not need to script and record unique audio recordings for each of the escalation events.

Add Sequence Question Event Logic Branches Wizard

Per the Add Sequence Question Event Logic Branches Wizard step I, the user has the ability to alter the flow of events within a sequence during the call based on the response to a particular Event Question asked. The Wizard will use the currently selected Sequence in the Manage Sequences panel to add new Event Logic Branches to. The Start step includes a listbox which contains a list of just Event Questions associated with the selected Sequence. The Step provides Operator and Value drop-down list controls to create a logical operative. And the Step will provide a listbox of Events associated with the selected which can be branched to base on the question response. A Question Event can have as many Logic Branches associated with it as there are answers to the question being asked; for example a Confirmation Question can only have two responses: yes or no therefore the maximum number of Logic Branches which could be associated with that question type is two (2). Numeric Questions are limited to ten (10) Logic Branches depending on the numeric range of the Event Question and Custom Answers Question would be limited to the number of Answers contained within the Answer Group.

To paraphrase a possible scenario from FIG. 48; if Question 1 is equal to Black then Branch to Event 2, else if Question 1 is not equal to Black then Branch to Event 3.

1. Sequence Question Event From: listbox contains all Event Questions associated with the selected Sequence; in this example the Sequence contains just one (1) Question. An item must be selected from this listbox to be able to progress to the "More" step.

2. Operator: drop-down listbox contains four (4) items which are comparison operations. The items contained in the listbox are:
=Equal To (i.e. Is Equal To)
! Equal To (i.e. Is Not Equal To)
< Less Than
> Greater Than
Confirmation Questions return a value of one (I) for Yes and any other returned value is considered to be a No response. Numeric Questions return the corresponding value of the response. Custom Answers will return the zero-based Item position of the Answer list row in the associated Answer Group. For display purposes Custom Answer will query the database and return the associated Answer Text rather than its numeric equivalent: an example of this is that the Custom Answer Group which contains colors may have Black listed first, if so, the numeric value of Black as an Answer response would be zero (0).
3. Value: drop-down listbox contains a static amount of items and is dependent on the Event Question type. If the Event Question type is a Confirmation (Yes/No) the listbox will contain two (2) items, for display purposes and to facilitate ease of use the items listed would be: Yes and No. If the Event Question type is a Numeric Question the listbox would contain ten (10) items: digits 0 through 9. If the Event Question type is Custom Answers then all Answer Texts from the Custom Answers Group would be listed in alphabetical order.
4. Sequence Event To: is a listbox containing all Events associated with the selected Sequence. Based on the response to the Question Event selected in item 1 the Sequence Question Event From: listbox, the selected Operator and Value—items 2 & 3 will determine which Sequence Event To: the user will select. All controls contained within this panel require selections before the user will be allowed to proceed to the next step "More".

Add Sequence Event Logic Skips Wizard

The Add Sequence Event Logic Skips functionality enable the user to add Event Logic Skips; the Skips simply jump from one event to another without executing any of the Sequence in between. For example; if the response from the Contact to Sequence Question Event 1 was "Black" and an existing Sequence Branch Logic caused the next Event in the Sequence Flow to be Message Event 2 then the user would probably want to bypass Message Event 3 "Say: Bad Color" and go directly to Sequence Message Event 4 "Say: Goodbye"—the Sequence Event Logic Skip manipulates the Sequence Flow to do so. The panel requires the user to make two (2) selection; one within each listbox: From and To Events. Both listboxes within the panel contain a list of all Events currently associated with the selected Sequence.

IV. DESCRIPTION OF THE DRAWINGS

FIG. 1 Computer-assisted telephone interviewing (CATI) per prior art

FIG. 2 ACTI per the preferred embodiment of the disclosed invention

FIG. 3 System architecture per the preferred embodiment of the disclosed invention and including optional IP telephony features FIG. 4 is a process flowchart giving an overview of the logic of the disclosed apparatus FIGS. 5-6 is a flowchart of the broadcast scheduler application FIG. 7-8 is a flowchart showing an overview of process steps in using the disclosed tool FIGS. 9-10 show the flowchart for broadcasts FIGS. 11-12 show the flowchart for contacts inputting FIGS. 13-14 show the flowchart for groups inputting FIG. 15 is a flowchart of steps for uploading audio files FIG. 16 is flowchart showing creating answers FIGS. 17-18 show steps in sequence building FIG. 19 shows steps in adding message events FIG. 20 shows steps in adding question-type message events FIG. 21-23 shows steps in creating events to be included in a sequence when there are problems with recognition of responses from a contact FIG. 24 shows steps in adding recording events FIG. 25 shows steps in adding branching logic for sequences FIG. 26 shows steps in adding event skipping logic for sequences FIGS. 27-28 shows steps in creating a broadcast FIG. 29 is a flowchart for the reports functionality FIG. 30 shows steps in handling audio recordings captured in reports FIG. 31 is a flowchart of the Convert Audio Feature FIG. 32 is a UI screenshot (per the preferred embodiment) highlighting the building a user Profile FIG. 33 is a UI screenshot highlighting the contacts inputting step FIG. 34 is a UI screenshot highlighting the prompts inputting step FIGS. 35-36 are UI screenshots for the audios inputting step FIG. 37 is a UI screenshot for the answers inputting step FIGS. 38-40 show UI screenshots for the sequence building step FIGS. 41-42 show the UI screenshots for the broadcast creation step FIGS. 43-44 show the UI screenshots for the reports specification step FIG. 45 shows the UI screenshot for handling of recordings in broadcasts FIG. 46 is a UI screenshot comprising prompts per a sample sequence for a meeting reminder-type call FIG. 47 is a UI screenshot showing events per a sample sequence for a meeting reminder-type call FIG. 48 is a UI screenshot comprising prompts per a sample sequence for a call for getting product feedback from a customer/call recipient FIGS. 49-50 are UI screenshots showing events per a sample sequence for a call for getting product feedback from a customer/call recipient FIG. 51 is a UI screenshot showing an authentication sequence FIG. 52 is a UI screenshot showing uploading of audio file for a sequence FIGS. 53-54 show UI screenshots comprising prompts per a sample sequence for pitching a song to a music supervisor/contact FIG. 55-56 show UI screenshots comprising events per a sample sequence for pitching a song to a music supervisor/contact FIG. 57 shows a business model incorporating the disclosed innovative web-based contact center in the music industry FIG. 58 shows an optional public tenant-based cloud hosted virtual machine (VM) Role of the disclosed contact center comprising a software-based IP PBX in place of the SIP Proxy server per the disclosed architecture.

The above-referenced figures are self-explanatory. Several figures are further explained below.

FIG. 3 shows an overview of the system architecture per the preferred embodiment of the disclosed web-based system and showing the optional telephony features (inclusion of the back-to-back user agent).

For the web-hosted embodiment of the disclosed automated interactive call broadcasting and response capture service, a user needs a computer with a web browser to connect to the Internet to access the URL of the service. The service has an architecture that comprises three servers: Frontend reverse proxy server, Backend web hosting, Email and SQL database server, and a perimeter based media server which runs the Speech and Telephony applications.

A reverse proxy server is run in front of a web server hence the name Frontend. All connections coming from the Internet addressed to the web server are routed through the proxy server. The reverse proxy server provides security by preventing direct access to the backend server database and increases system performance by caching and compressing web content greatly reducing the load on the web server and speeds up the client load time because of low latency.

The Backend server hosts the web server and website, SQL database, and message queue delivery component. The primary function of a web server is to deliver web pages and associated content to clients. A web browser client makes a request for a specific resource using Hypertext Transfer Protocol (HTTP) and the web server responds with the content of that resource. A database is an integrated collection of logically related records or files consolidated into a common pool that provides data for one or more uses. Structured Query Language (SQL) is a programming language designed for managing data in a Relational Database Management System (RDBMS). A relational database is a collection of data tables which consist of data laid out in a rows and columns structure. The message queue delivery component allows the passing messages between different computer systems using an asynchronous communications protocol which means that the sender and receiver of the message do not need to interact with the message queue at the same time. Messages placed onto the queue are stored until the recipient retrieves them.

The Media server hosts the Speech and Telephony application, message queue repository, and a SIP proxy server which converts TCP and UDP traffic when necessary. The application is written in C# using the Microsoft Windows Workflow Foundation (WF) and deployed on the Microsoft Office Communications Server 2007 Speech Server (MSS). The application polls its associated local message queue and when a message arrives it begins a session. Multiple concurrent sessions are support and limited by server or communication capacities, the MSS provides throttling capabilities to limit the number of sessions in order to maintain an acceptable Quality of Server (QoS) sometimes referred to as Grade of Service (GoS). Session Initiation Protocol (SIP) is used to connect the Speech application to a VoIP provider which provides termination within the Public Switched Telephone Network (PSTN). The SIP Proxy Server (SPS) provides call processing tasks on the behalf of another device; in this case the Microsoft Speech Server (MSS) only supports SIP over TCP but many VoIP termination providers only support SIP over UDP and when required the SPS converts TCP and UDP packets for full compatibility. The disclosed system architecture may also incorporate FreeSwitch to bridge SIP Signaling Protocols UDP/TCP between the Microsoft Speech server and VoIP PSTN Provider. So, the communication requirements include an ISP (Internet service provider; using DSL, Cable Modem, or dedicated high-speed interconnects) and two fixed/static IP addresses. The applications include a website, telephony and voice recognition workflow, scheduler service, and transaction manager executable.

The items shown in the architecture diagram are further explained as follows:
1. Web Browser: the user accesses the website server from a browser of the user computer. Microsoft Internet Explorer version 6.0 or greater is recommended and the Microsoft
2. Internet
3. RPS: Reverse Proxy Server, is a PC Server referred to as PC1 Frontend and has Microsoft ISA Server 2006 installed. The purpose of ISA is to provide security to the Internal Network, acts as a reverse proxy server to deliver web content to the Internet from the internal network web server and to accelerate webpage rendering by caching static content.
4. Collection of software servers and applications residing on PC2 Backend.
5. Backend: hosts the web server and has Microsoft Exchange 2007 for Email support installed. The Applications and services running on the Backend machine are:
   ASP.NET Website
   Scheduler Windows service (SWS)
   Transaction Manager (TM) Windows executable
6. MQ-S: Microsoft Message Queue (MQ) Send is used to transfer data through the internal network to PC3 Media Server.
7. SQL Server 2005 relational database system for persistence and retrieval of data required by the system. Multiple applications and services require access to the SQL server; TCP/IP Named Pipes are used for secured external access by the Speech/Telephony application that resides on the PC3 Media server.
8. Collection of software servers and applications residing on PC3 Media. Microsoft OCS Speech Server is hosted here. Primary service, Application, and server also run on the Media machine.
9. MQ-R: Microsoft Message Queue (MQ) Received. Used to store messages received from the Backend server.
10. S/APP: is the Workflow-based Speech and Telephony application which controls the Microsoft OCS Speech Server telephony and voice recognition engine. The application will periodically poll the message queue and when messages arrive in the queue the application is triggered and a call to the Contact is conducted.
11. SPS: Sip Proxy Server is used when nailing up and tearing down call connections. The purpose of the SPS is to convert UDP and TCP data packets between the Microsoft OCS Speech Server (MSS) and a VoIP provider. Currently the dominate protocol supported by VoIP providers is UDP but the MSS only provides support for TCP so data traffic conversion is required. SIP is used to connect and disconnect end-points; in this case it is the MSS and VoIP provider. Once a call is successful nailed up between the VoIP end-point and the targeted Contact the Real-time Transport Protocol (RTP) is used for audio streaming purposes.
12. VoIP/PSTN Bridge: is the VoIP provider that converts IP traffic to and from the Public Switched Telephone Network (PSTN). It is understood that PSTN as used herein includes both landline networks and mobile phone networks.

FIG. 3 includes the enhanced telephony capabilities per a preferred embodiment of the disclosed service/tool. A user accesses the Website (Item 3) of the disclosed service using a Browser (Item 1) of the user computer; between the user and website is a Reverse Proxy Server (Item 2) which provides security for the internal network and caches the website for faster rendering to the browser. The website provides the user interface (UI) for configuring and operating the service. The website, Scheduler Windows Service (Item 4), Transaction Manager Application (Item 5), and Outbound Speech Application (Item 9) all have (relational) SQL Database (Item 7) access to persisted data. The scheduler windows service provides a timing mechanism for broadcasted calls which are intended to be called at a future date and time. The transaction manager application allows system administrators to add manual monetary adjustments to each user account. For each call broadcasted the website or scheduler Windows service will write a predefined message to the Message Send Queue (Item 6) containing contact details; the Message Queue Receive (Item 8) stores and then forwards messages to the outbound speech application when it polls the message queue receive. Based on the information contained within the contact details of a message queue item, the outbound speech application will determine how to route the call; for landline or mobile hard phones (Item 13) the call is made through the Sip Proxy Server (Item 10) and VoIP provider/PSTN Bridge (Item 12). If the outbound call does not terminate into the PSTN the outbound speech application will route the call to the Back-To-Back User Agent B2BUA (Item 11) which connects to a software-based phone (Item 14); some of the supported soft phone protocols are SIP, GoogleTalk, and Skype. FIG. 4 depicts the logic used in the Workflow-based Speech & Telephony Application that runs on the PC3 media server of the disclosed system. When a broadcast is triggered, the program dials (step 201) one of the numbers in the queue of numbers for the triggered broadcast, and if call is answered (Step 202), the system starts to run the sequence specified for that broadcast beginning with Step 203 where the logic looks for the event to launch which could be one or more of a play message (Step 204), ask a confirmation type question (Step 205), ask a numeric question (Step 206), ask a Customer Answer-type question (Step 207), and record an audio response (Step 208) until the end (Step 209) of the sequence is reached.

FIGS. 5-6 together depict the logic used in the Windows Scheduler Service installed and running on PC2 Backend. The Scheduler manages retries and call timing. When a call meets the scheduled requirements, using MQ-S a message is sent to MQ-R on PC3 Media server to immediately begin a call to the Contact.

Sample Sequences for Three Different Types of Calls

For illustration purposes only, and not by way of limitation, shown are three sample sequences for three different types of calls, namely call to confirm an appointment, a call to solicit and capture feedback on a product purchased, and call made to present a recorded musical composition for consideration by a music supervisor for licensing in an audiovisual work such as a film. Sequences vary in length (where length refers to the number of events programmed) depending upon the type of call (i.e., complexity of the call, quantity of information to be messaged to a contact and quantity of responses desired to be captured from a contact). As an example, a sequence for a market research-type call likely will comprise more logic branching events and more message events than a sequence for an appointment reminder.

FIGS. 46 and 47 illustrate one way to program a sequence (herein called Meeting) when the user wants to broadcast a meeting confirmation type message. Shown per FIG. 46 is a UI screenshot listing sample textual (TTS) prompts which the user may create, name, and save for use in the broadcast. FIG. 47 shows a UI screenshot of a sample sequence the user might create using the saved prompts to create the desired broadcast.

FIGS. 48-50 illustrate how a user might use the disclosed invention to program a broadcast call relating to seeking customer feedback on a purchased product from the Macintosh Apple Store.

FIGS. 51-56 illustrate a sample program where the user (in this case a music publishing entity) wants to broadcast a musical composition/music recording of a song for review by music supervisor/contacts. The sequence created in the example is called WYNI.

Figure 1:
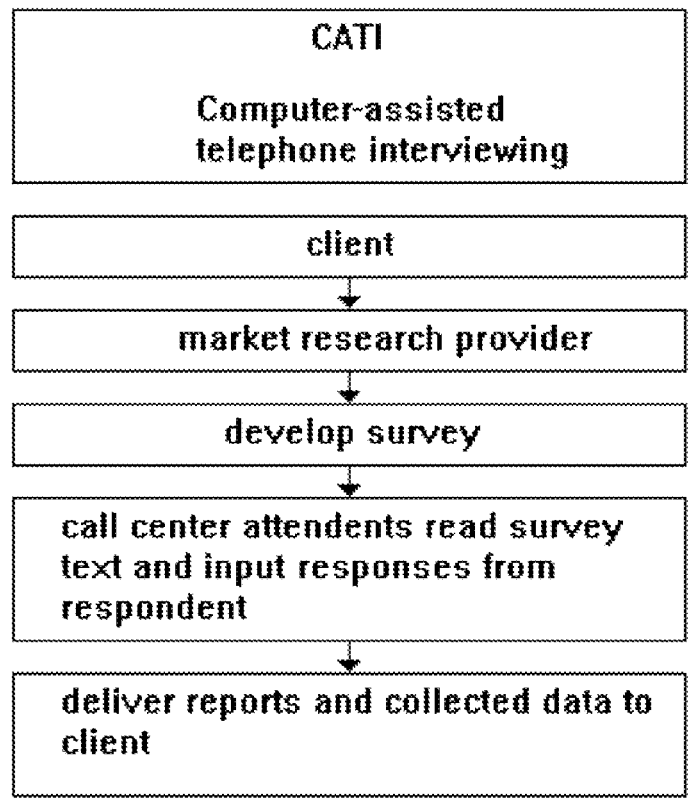
Figure 2:
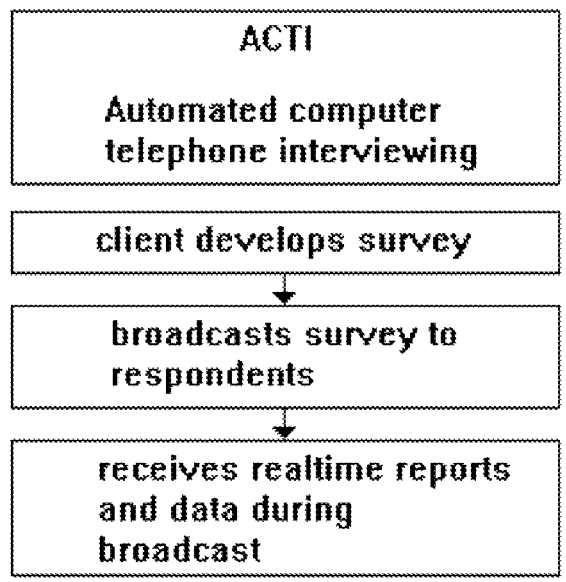
Figure 3:
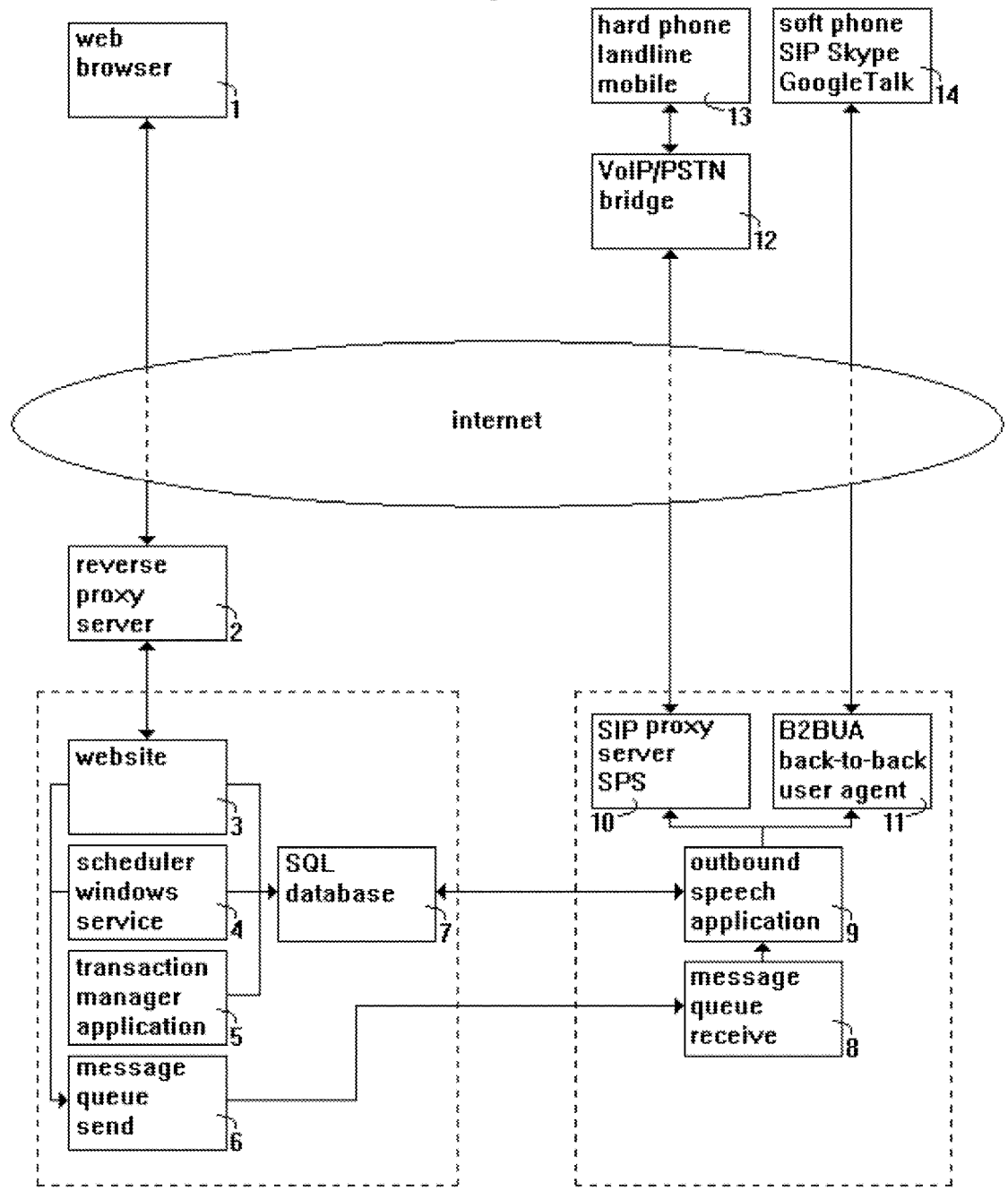
Figure 4:
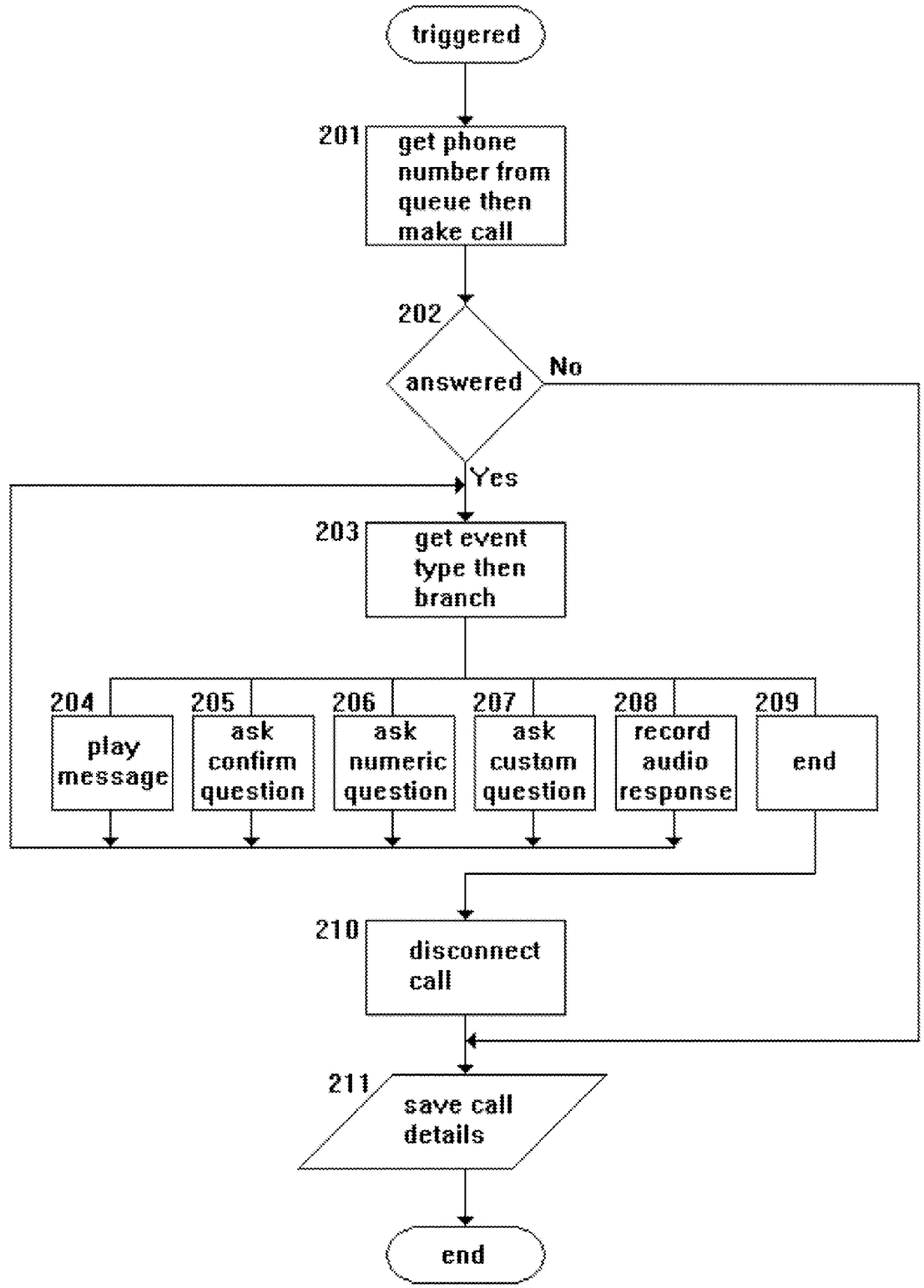
Figure 5:
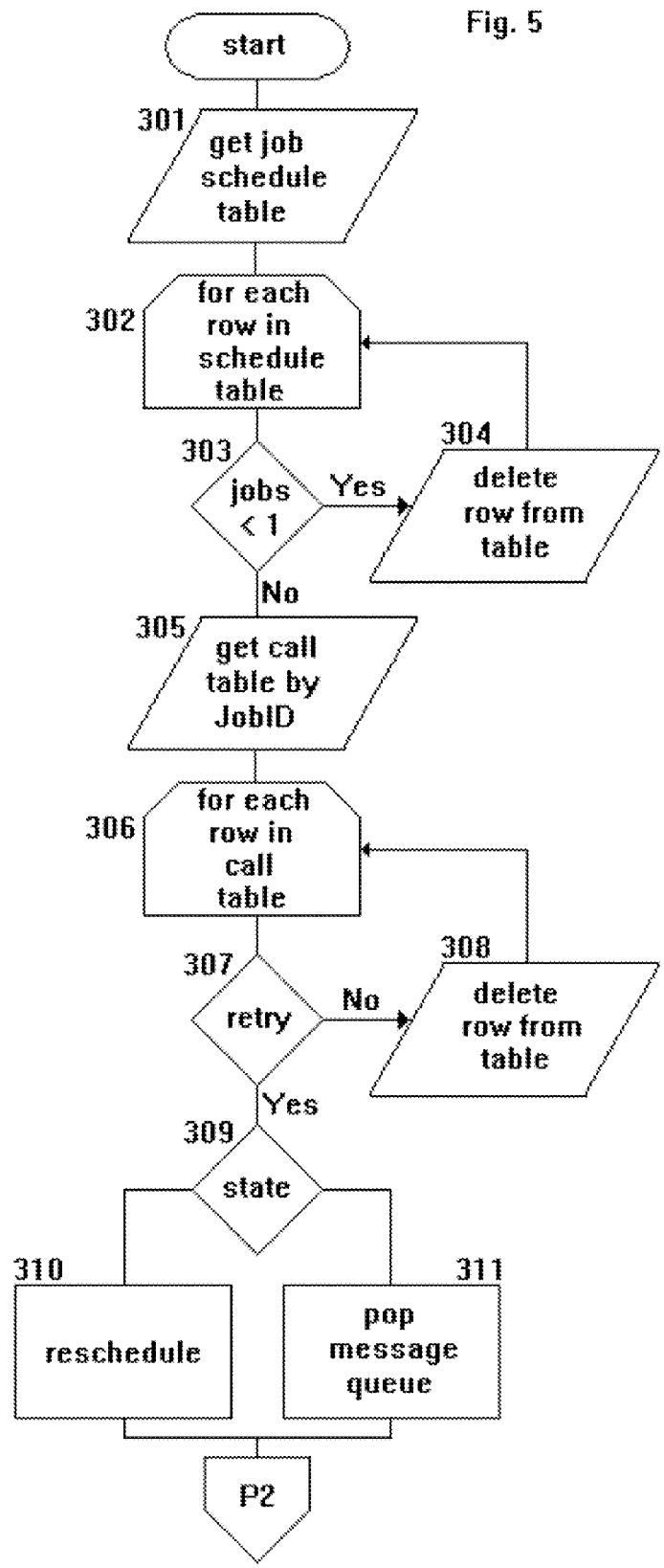
Figure 6:
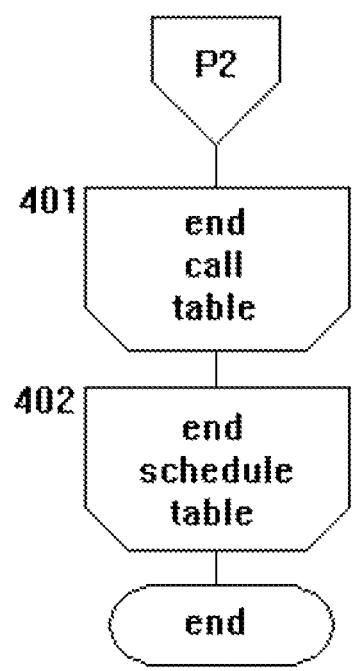
Figure 7:
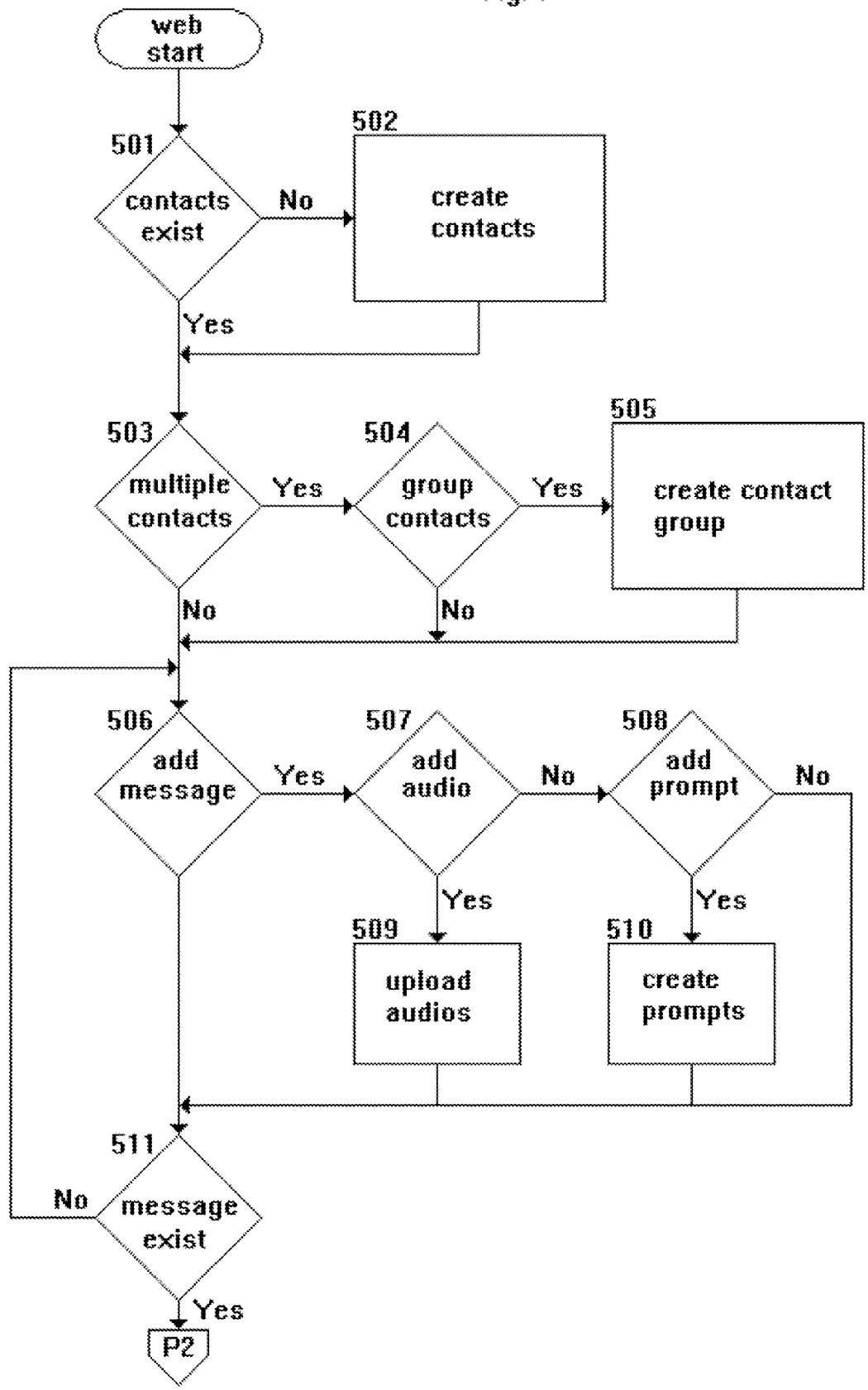
Figure 8:
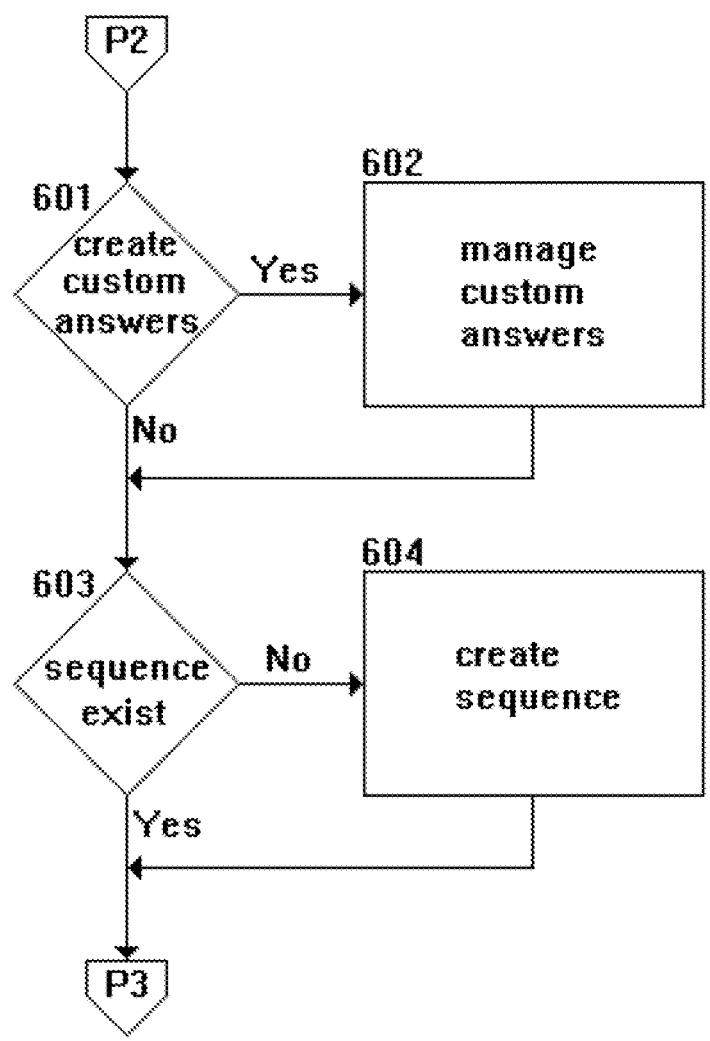
Figure 9:
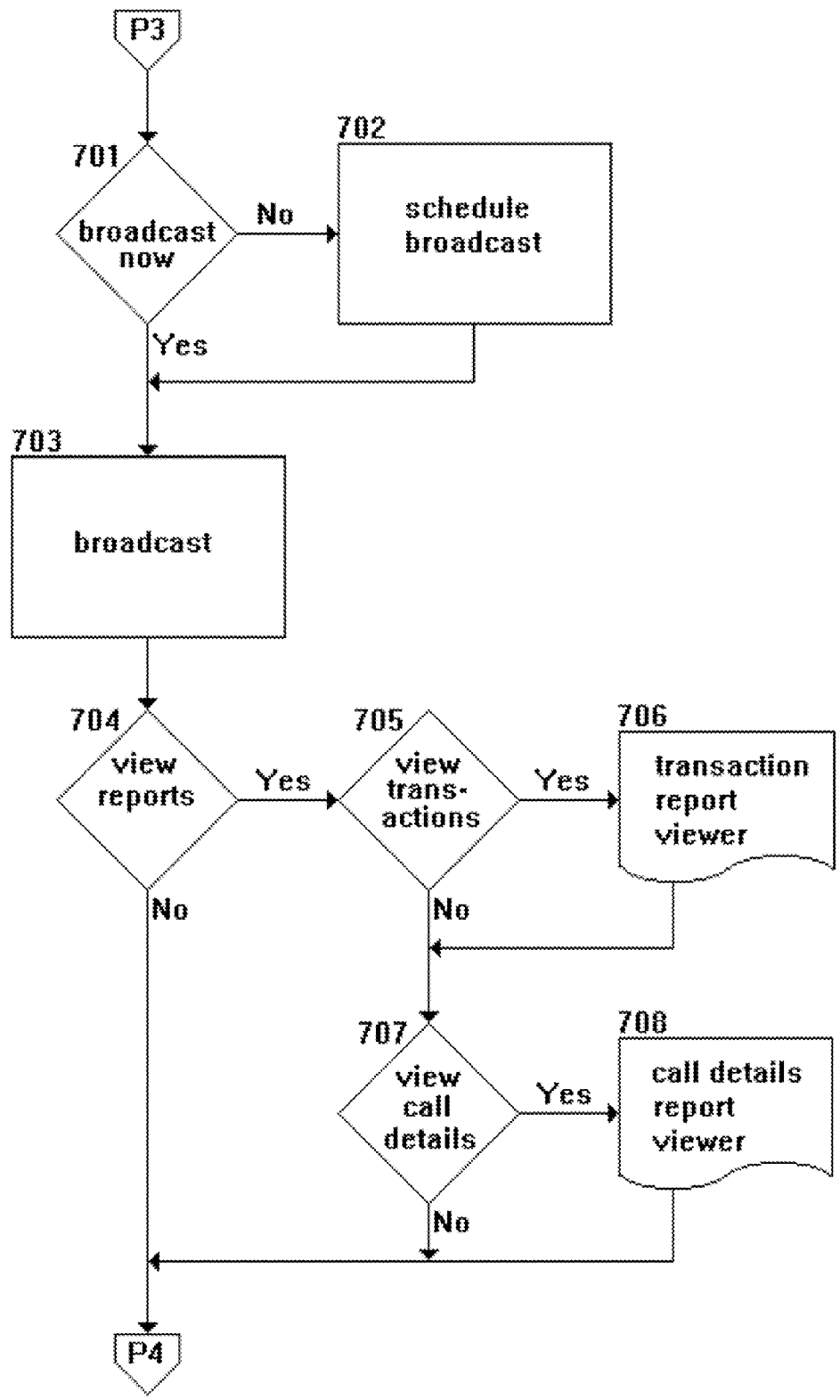
Figure 10:
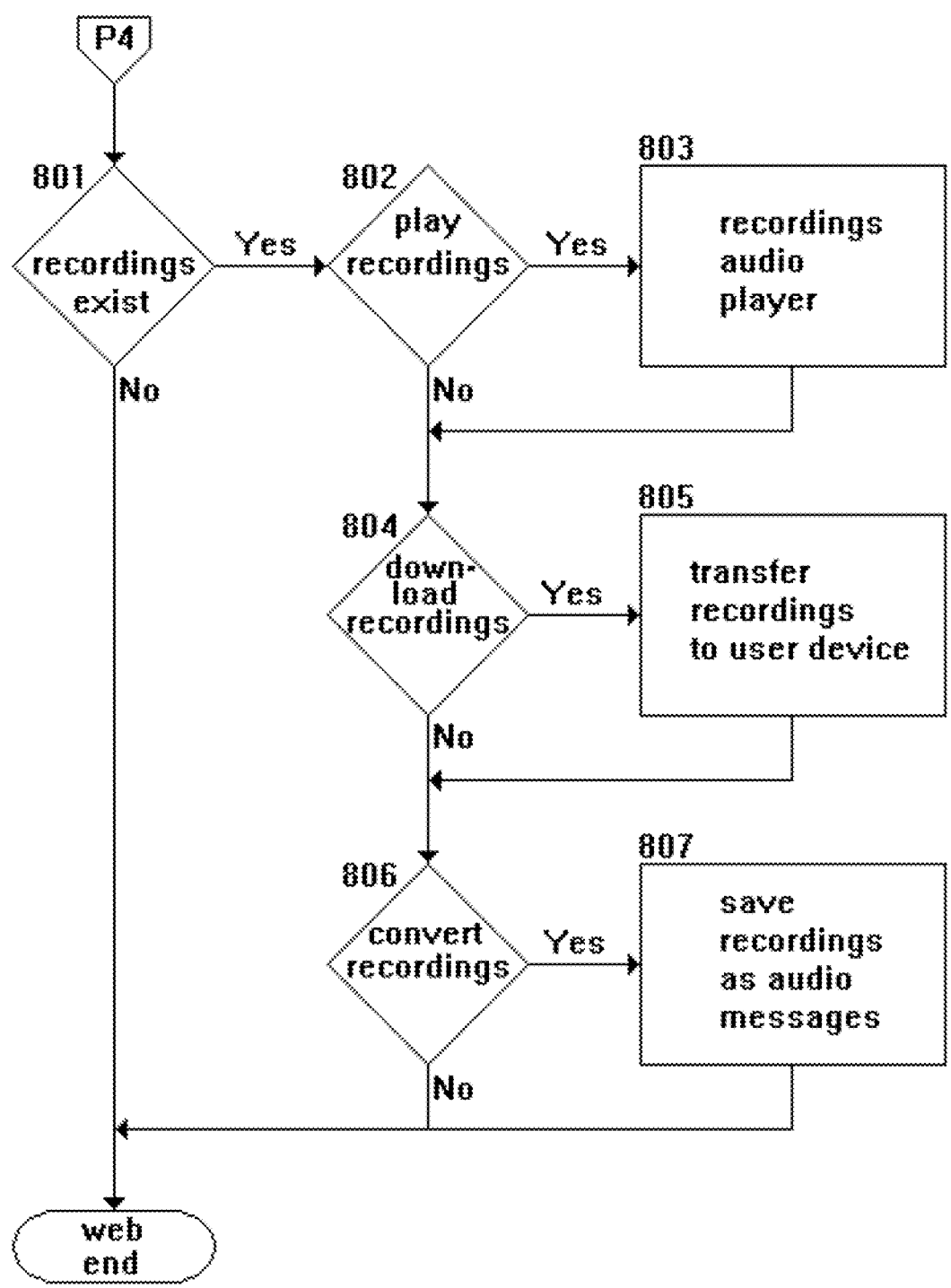
Figure 11:
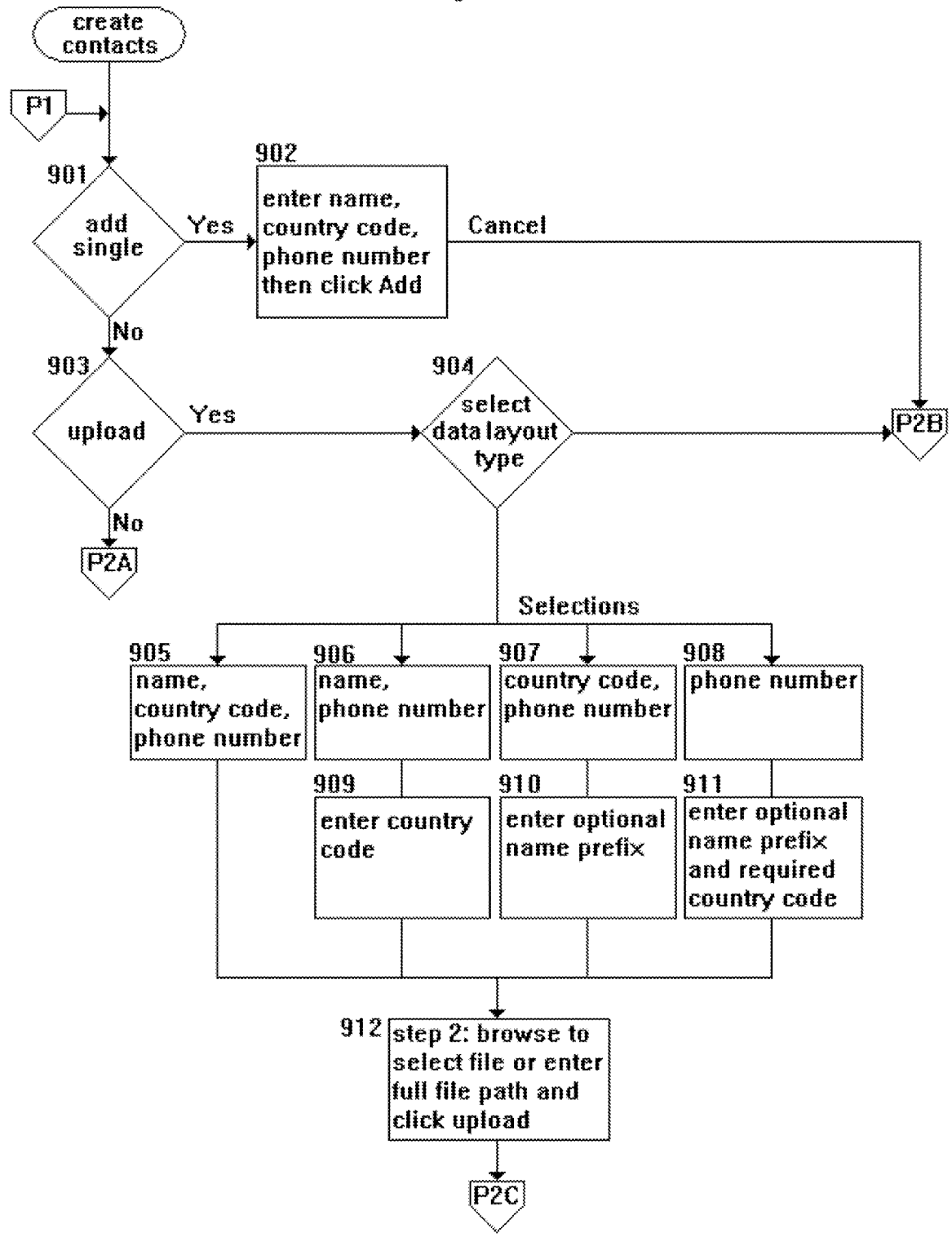
Figure 12:
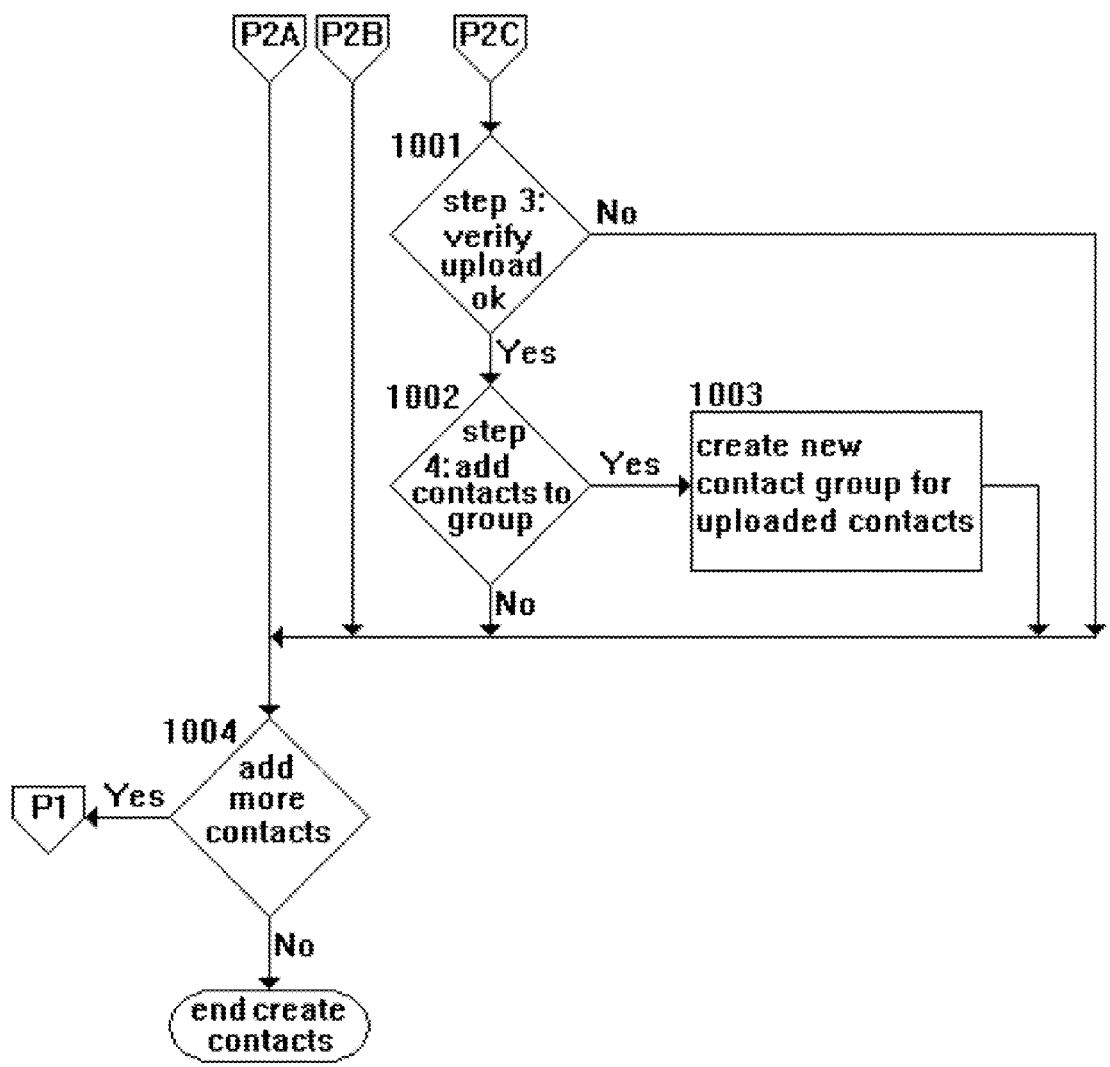
Figure 13:
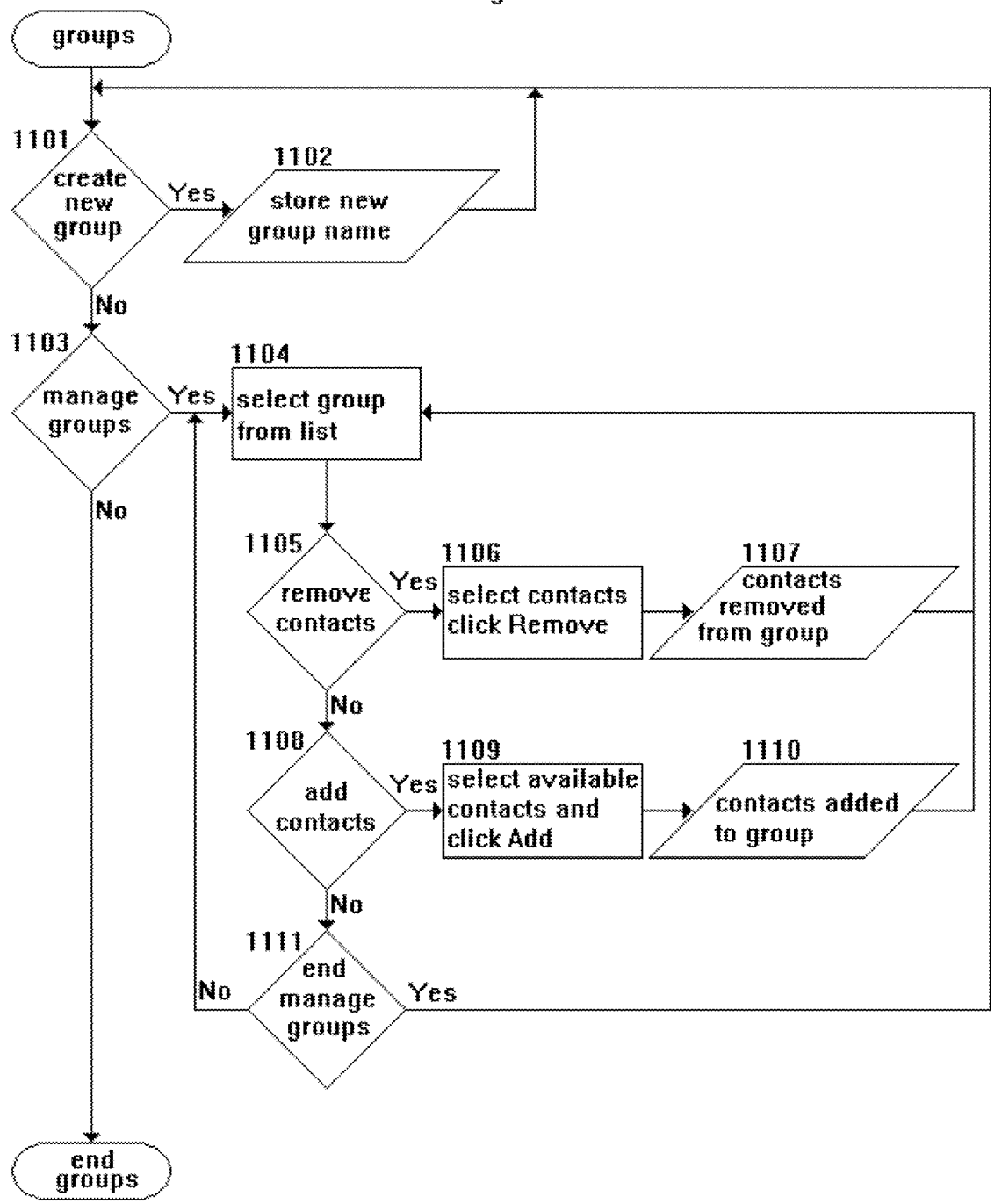
Figure 14:
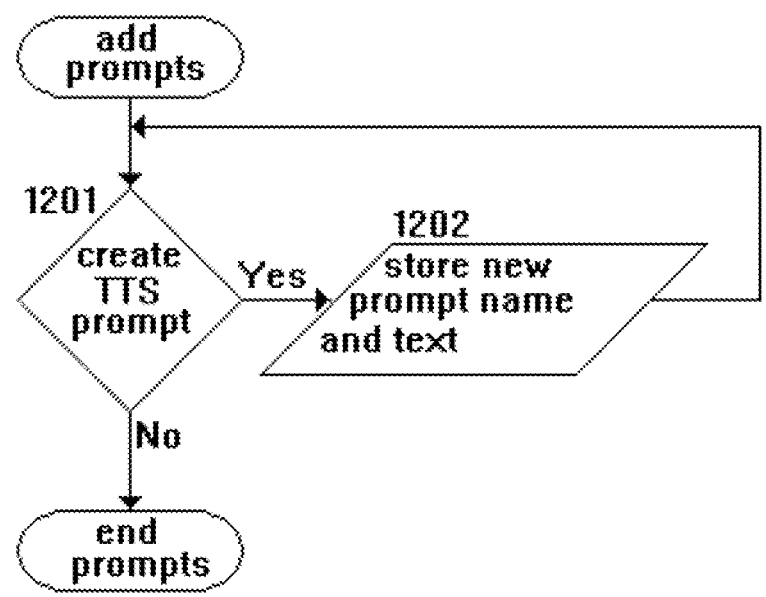
Figure 15:
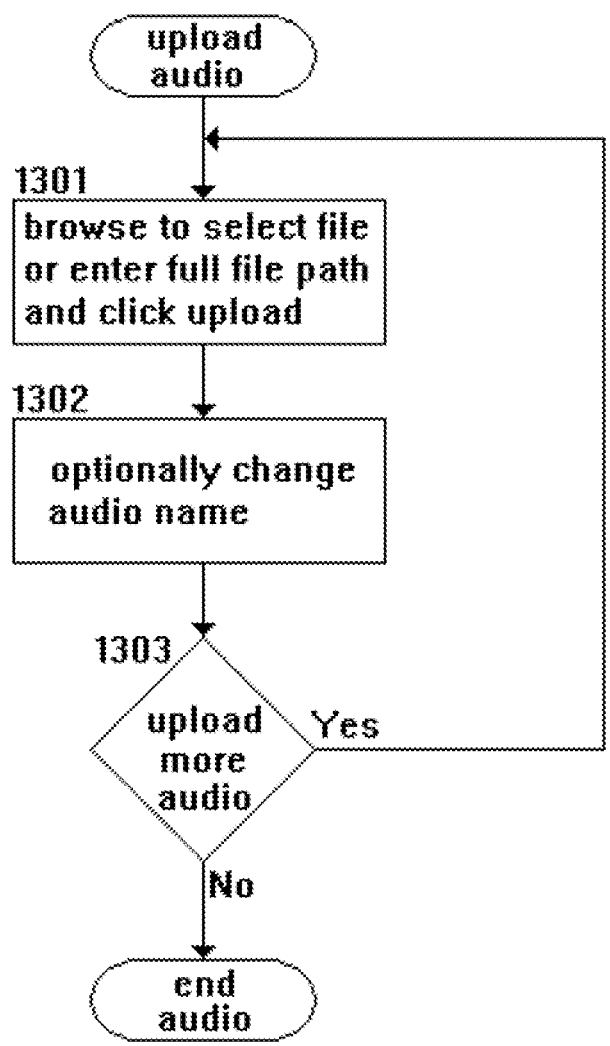
Figure 16:
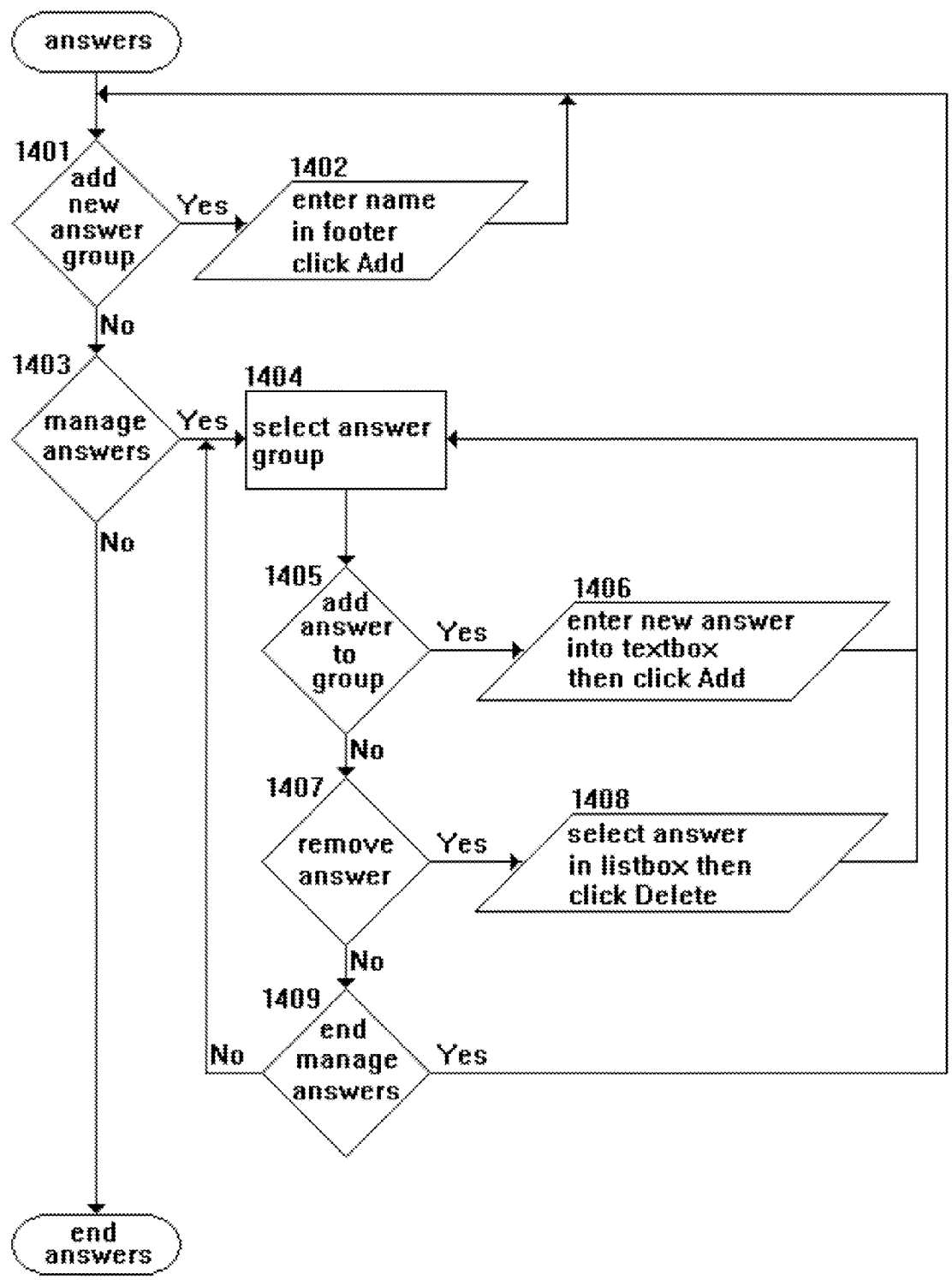
Figure 17:
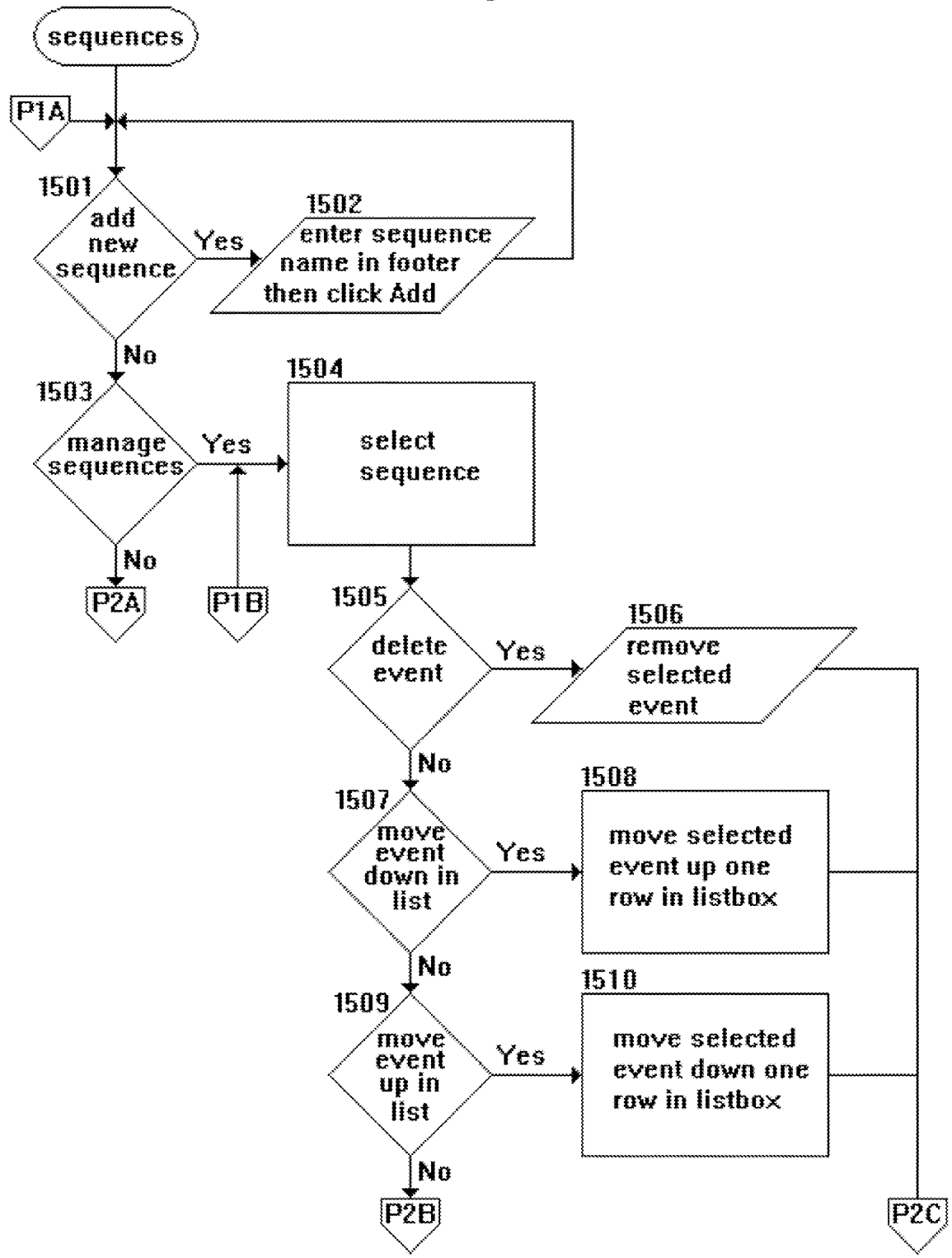
Figure 18:
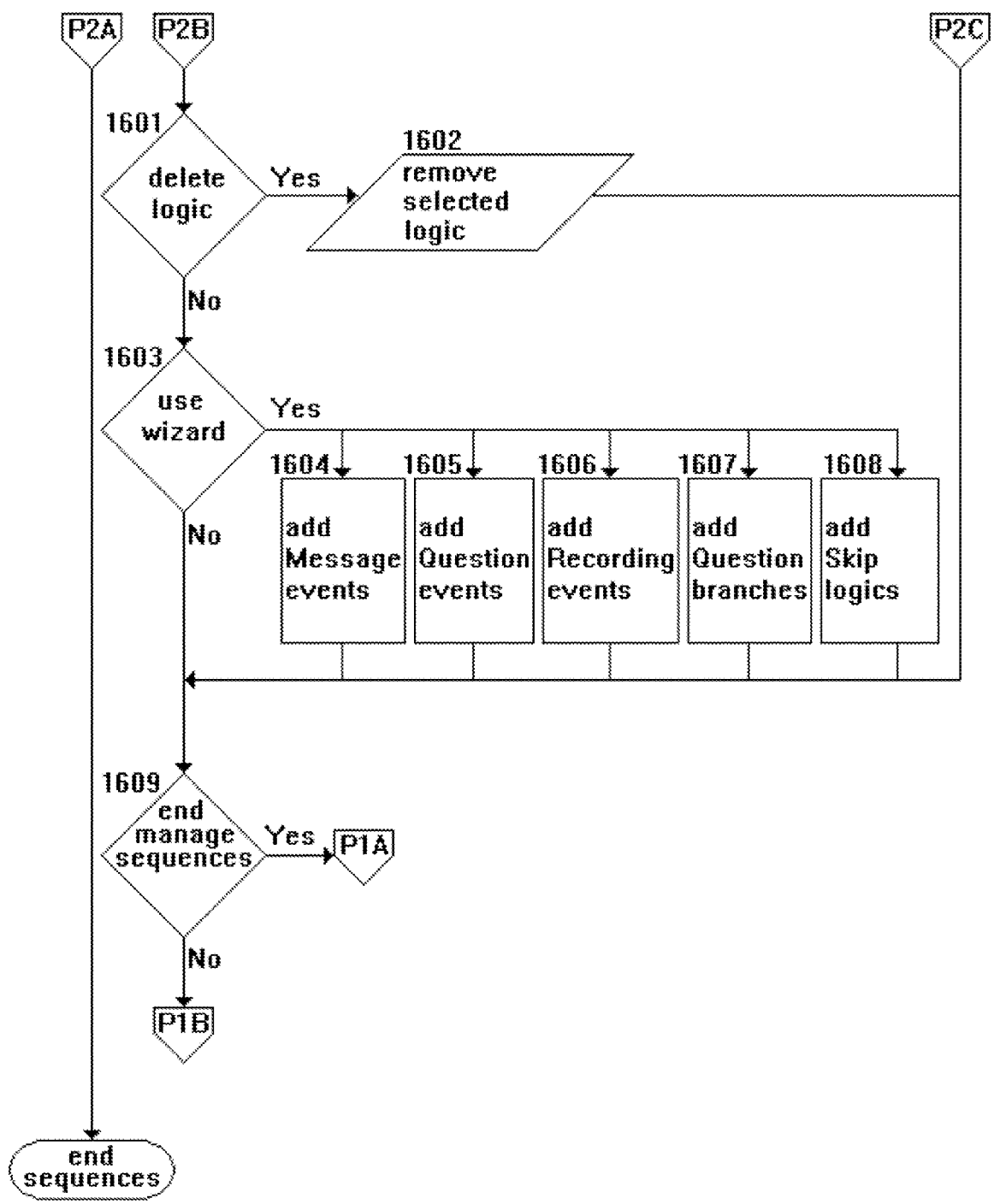
Figure 19:
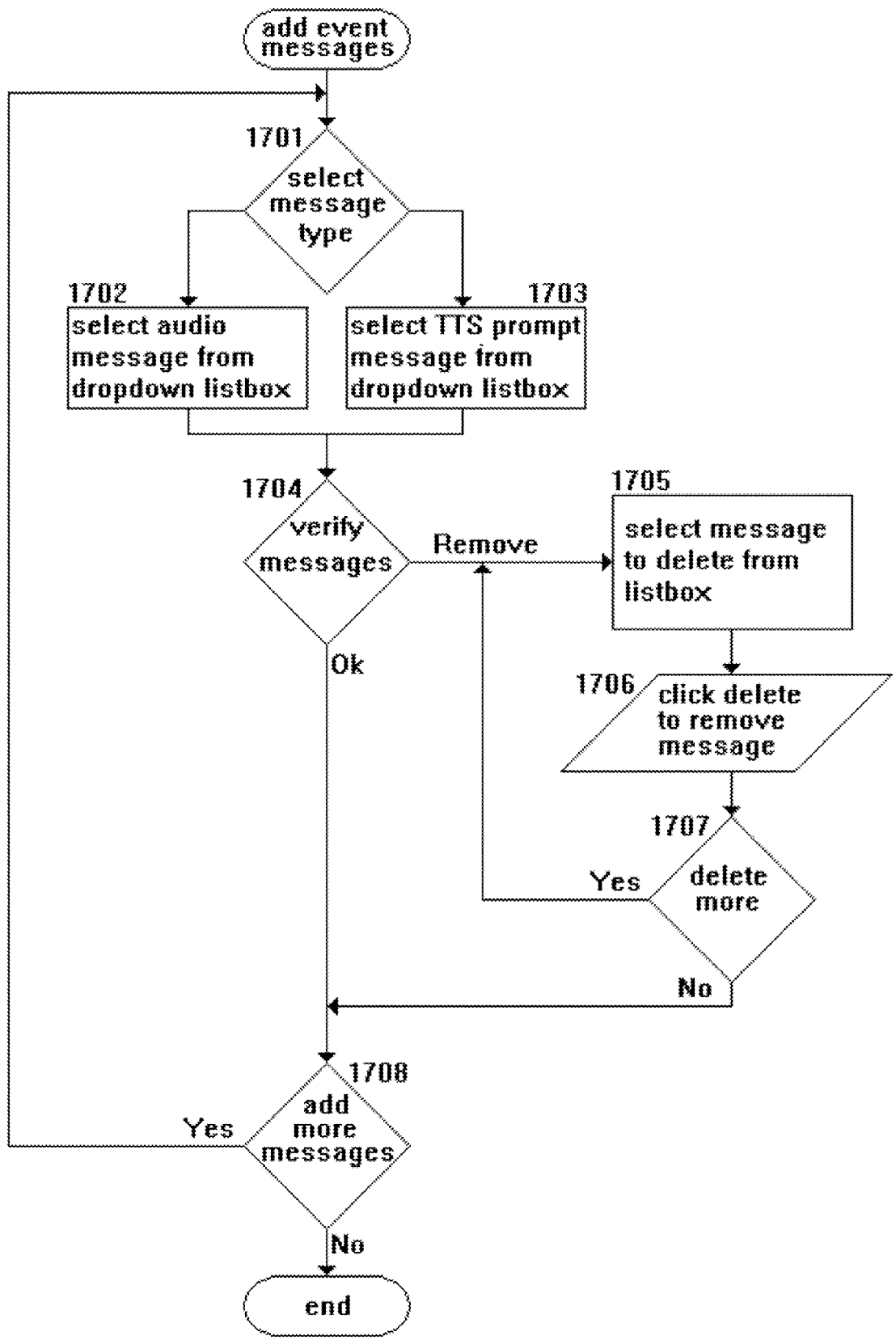
Figure 20:
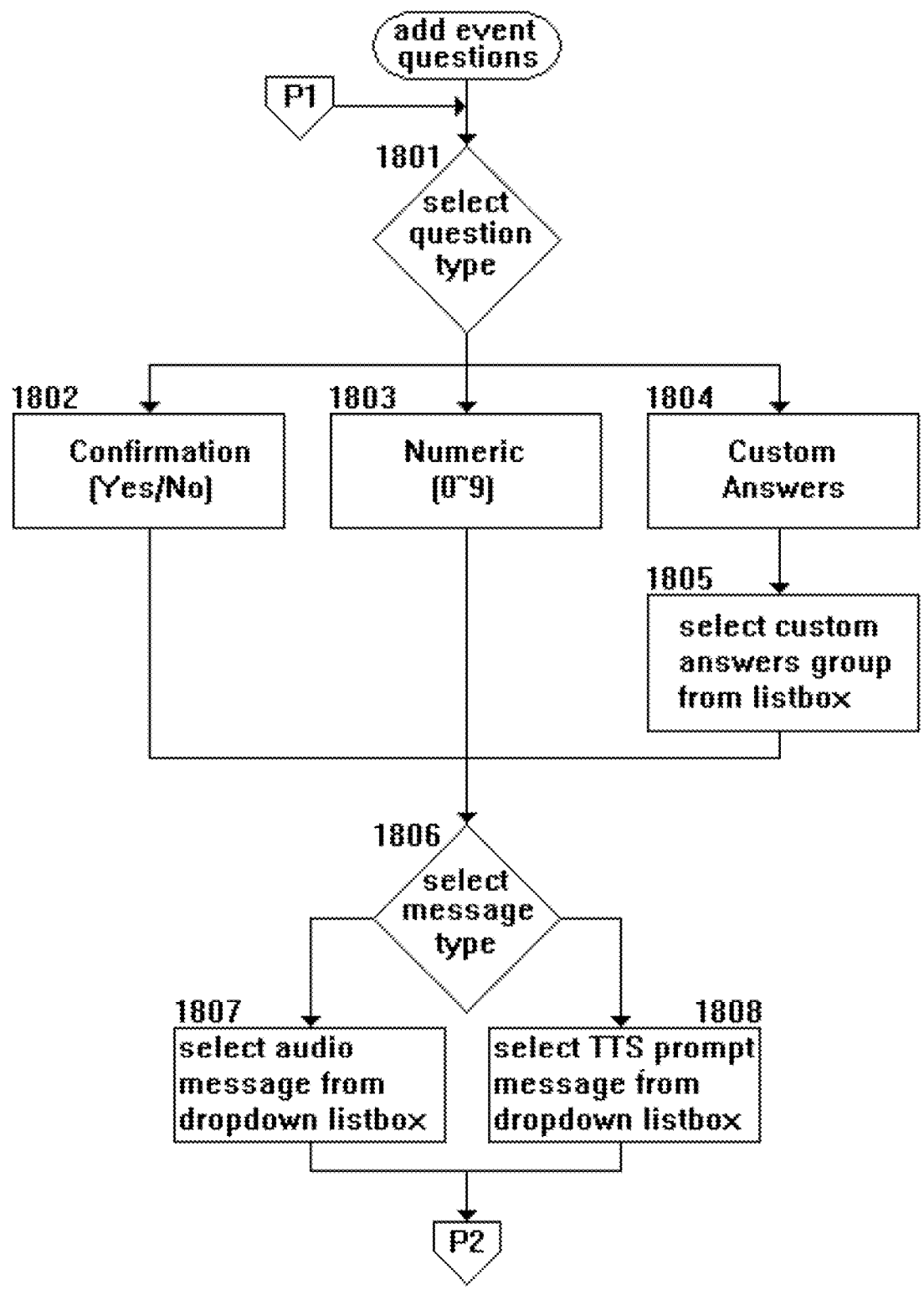
Figure 21:
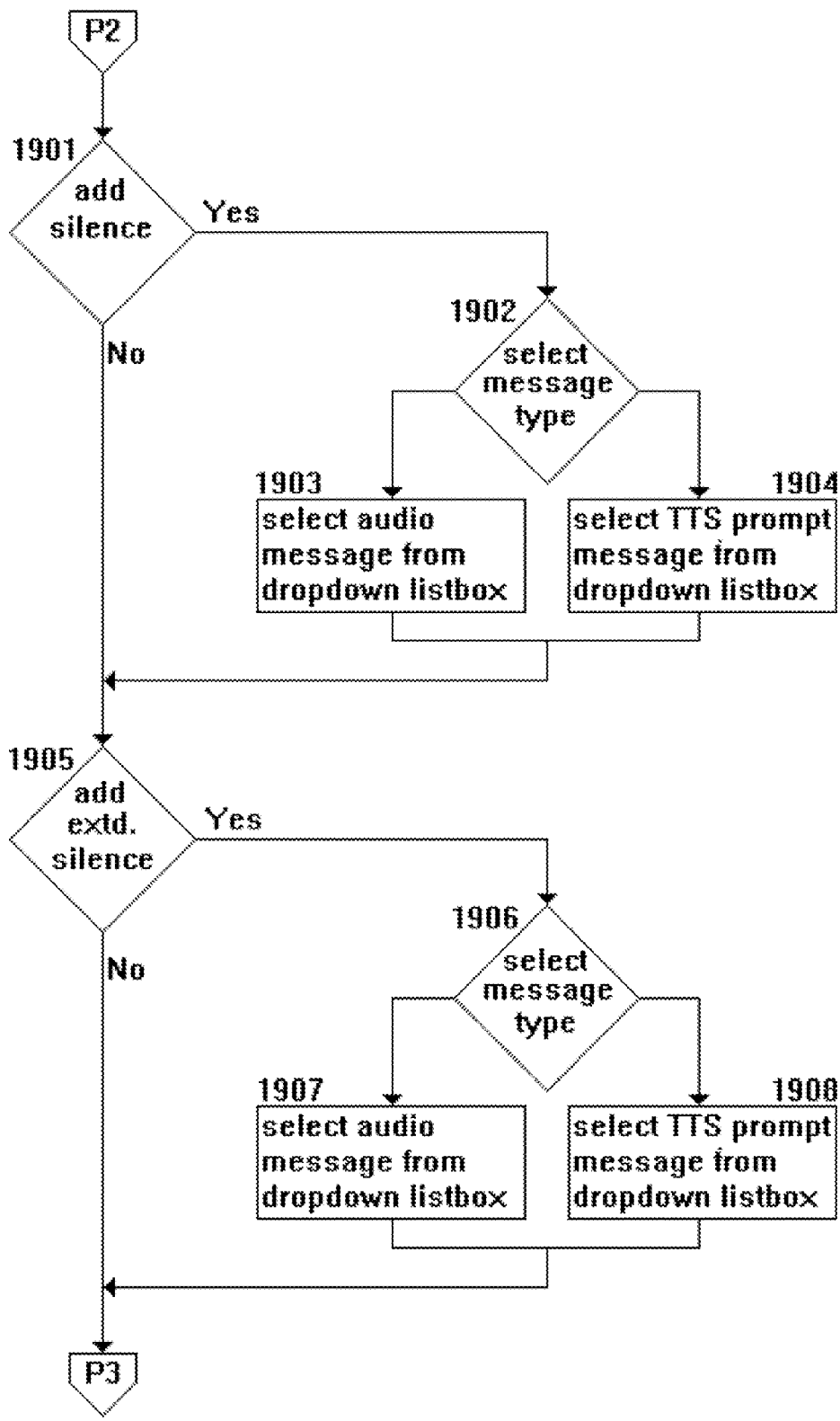
Figure 22:
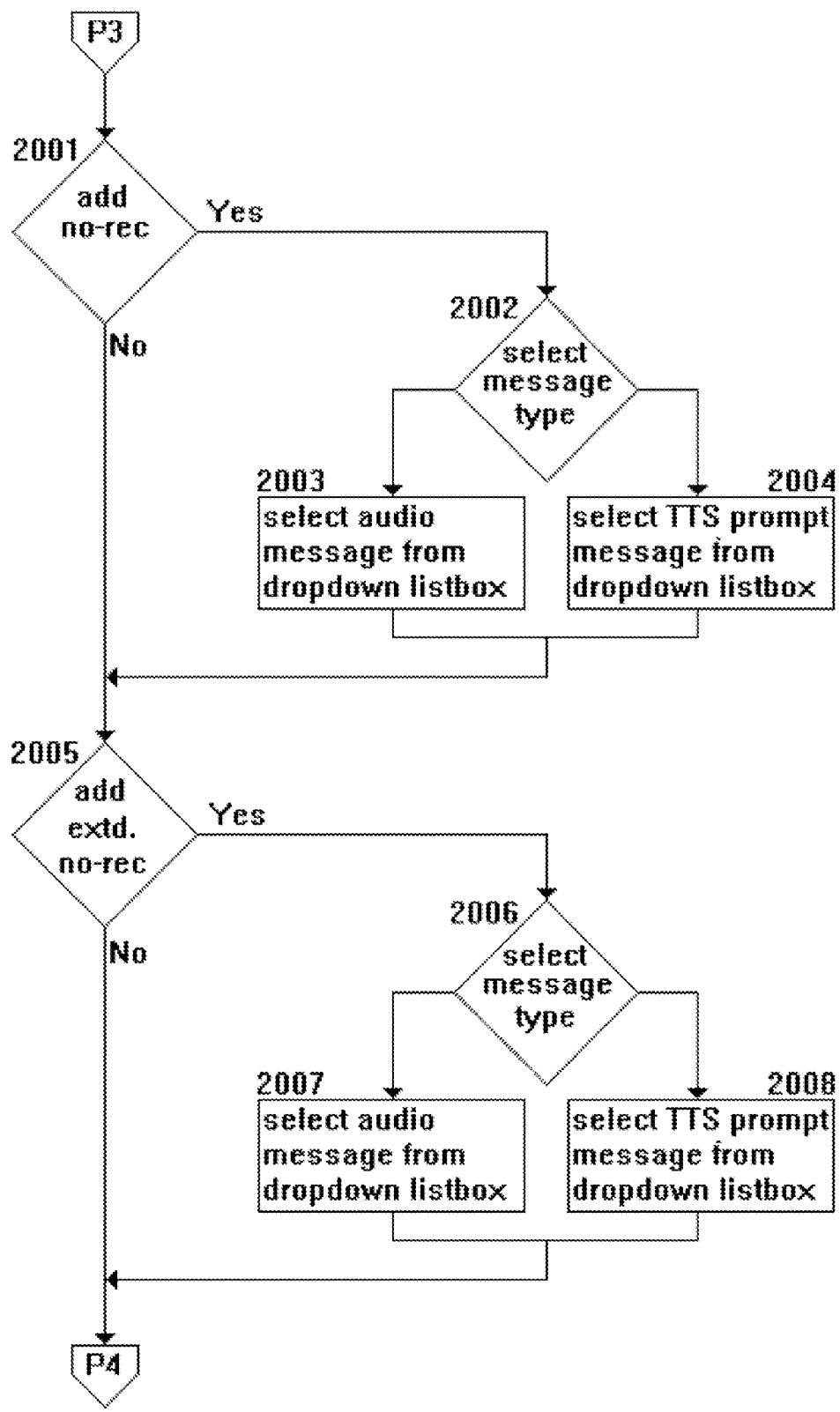
Figure 23:
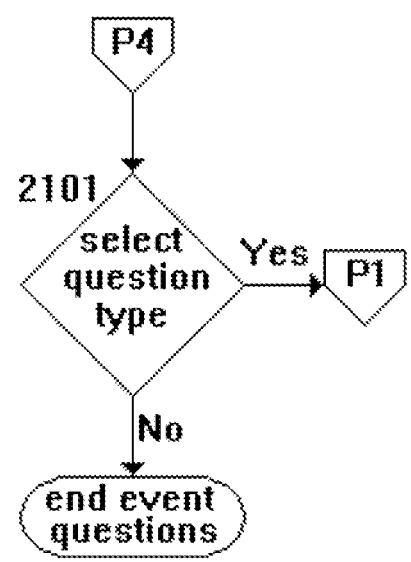
Figure 24:
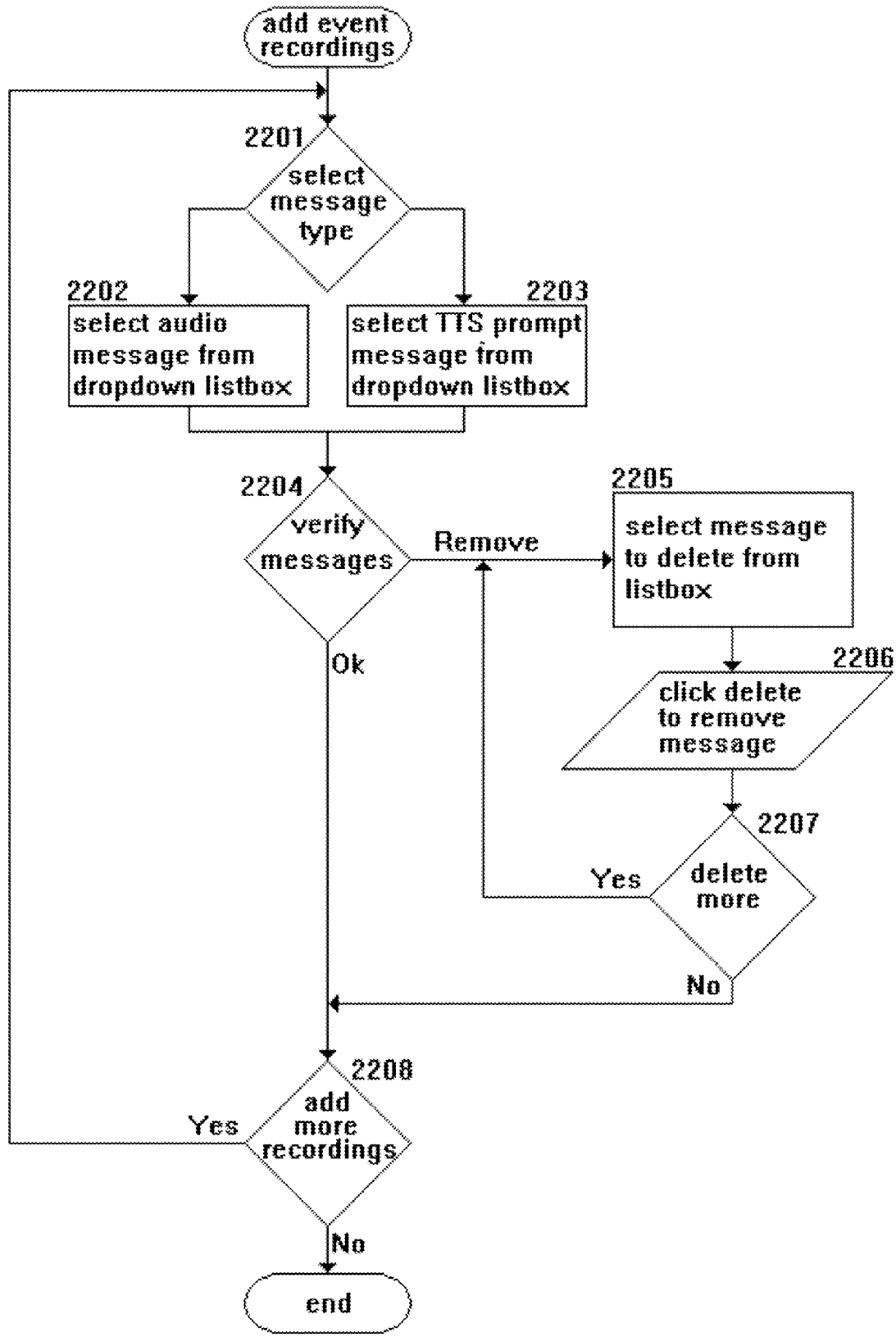
Figure 25:
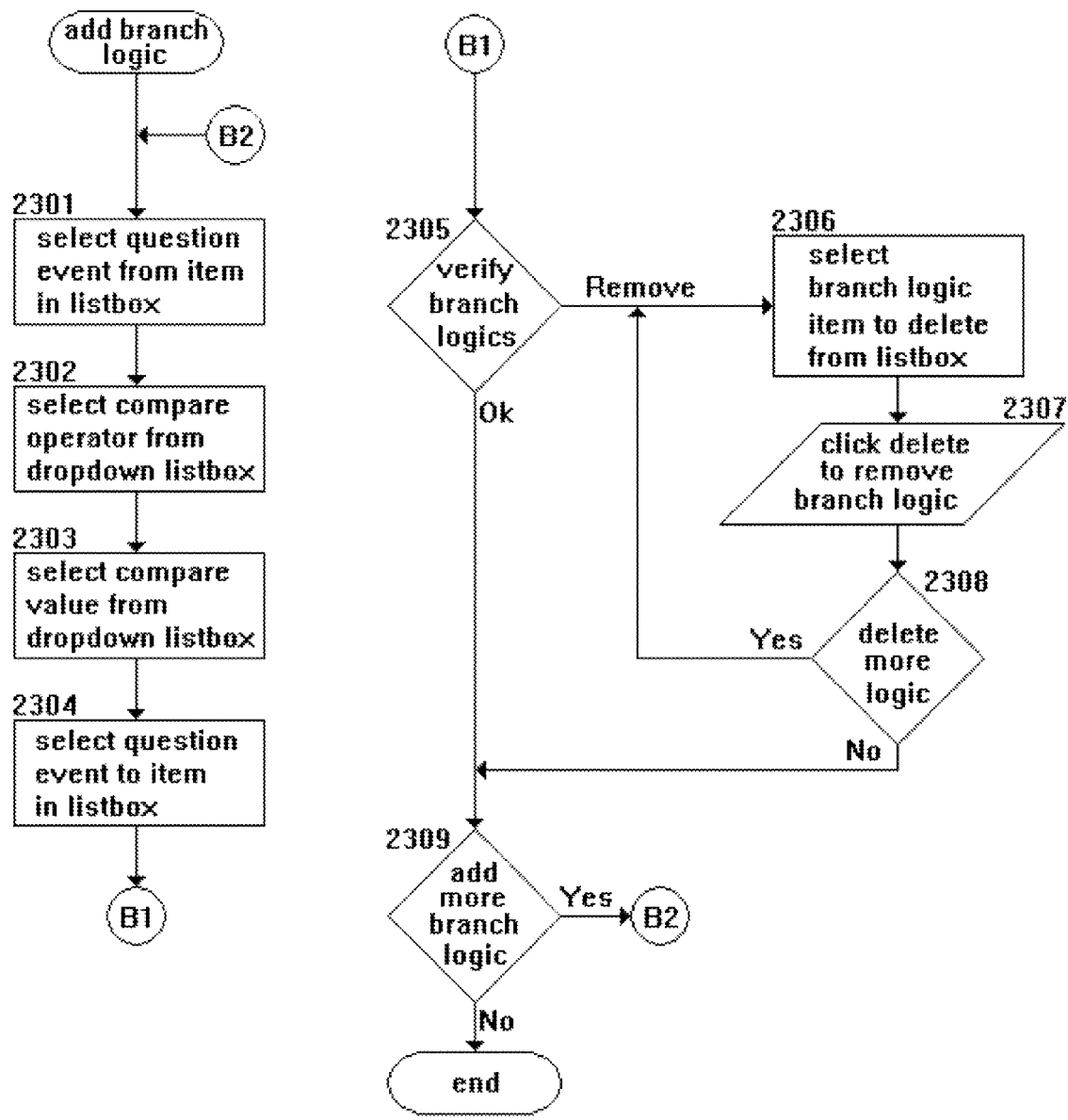
Figure 26:
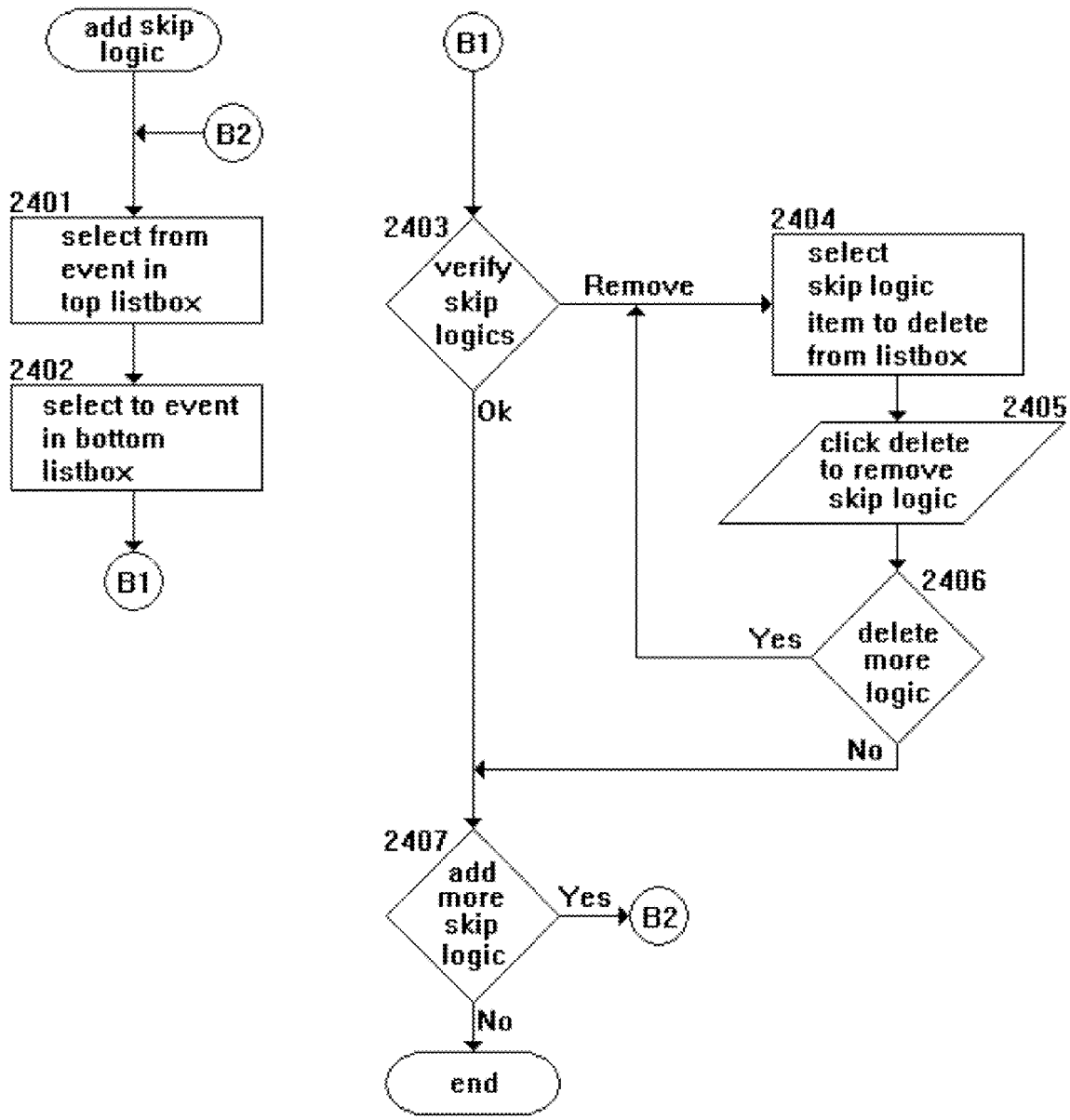
Figure 27:
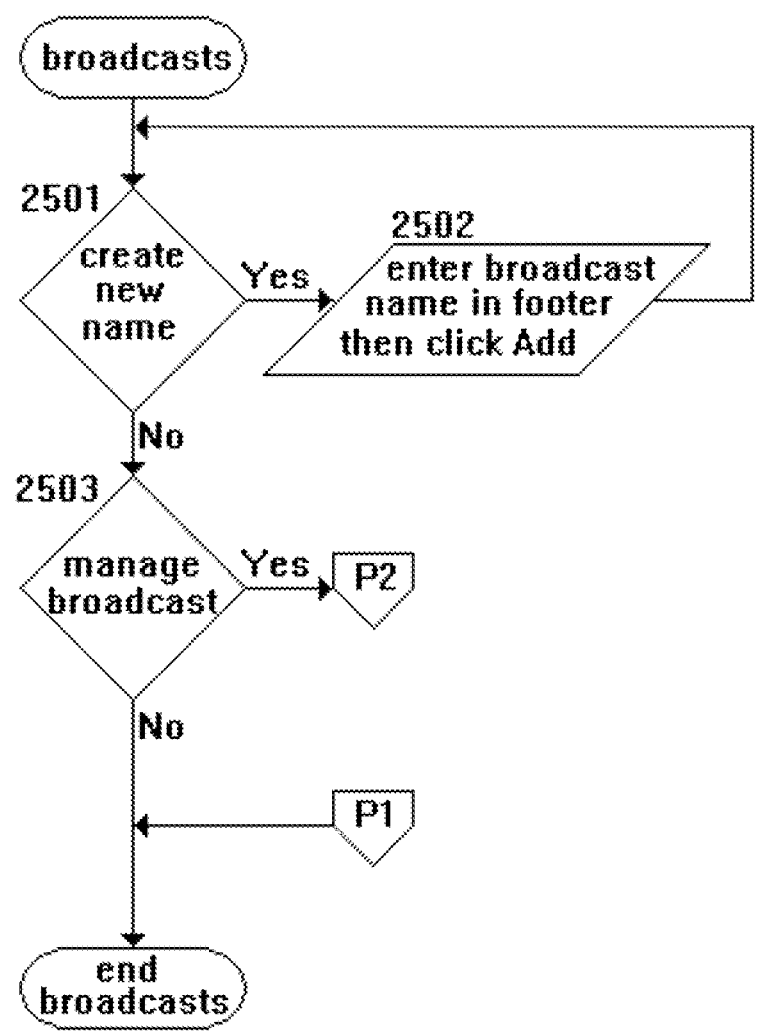
Figure 28:
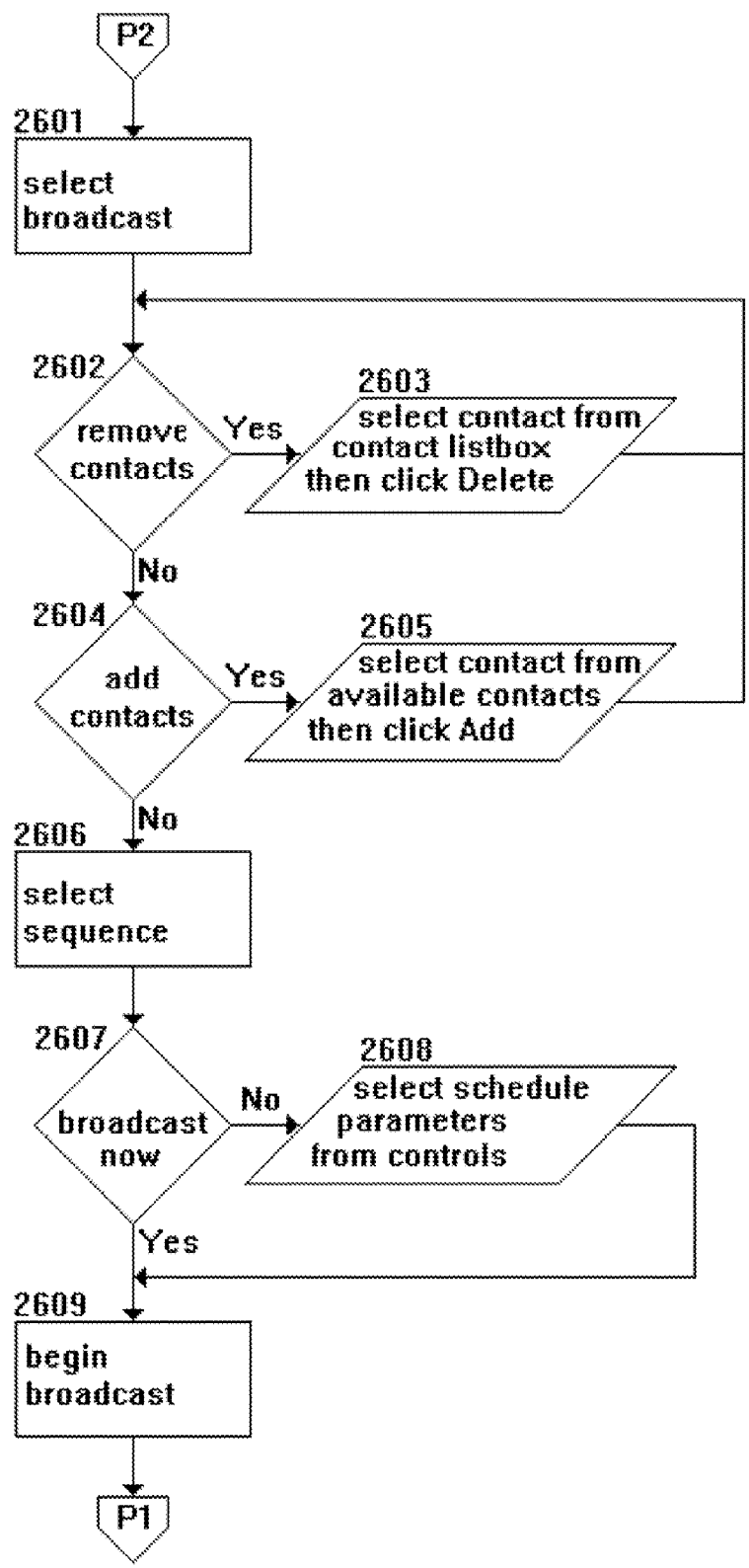
Figure 29:
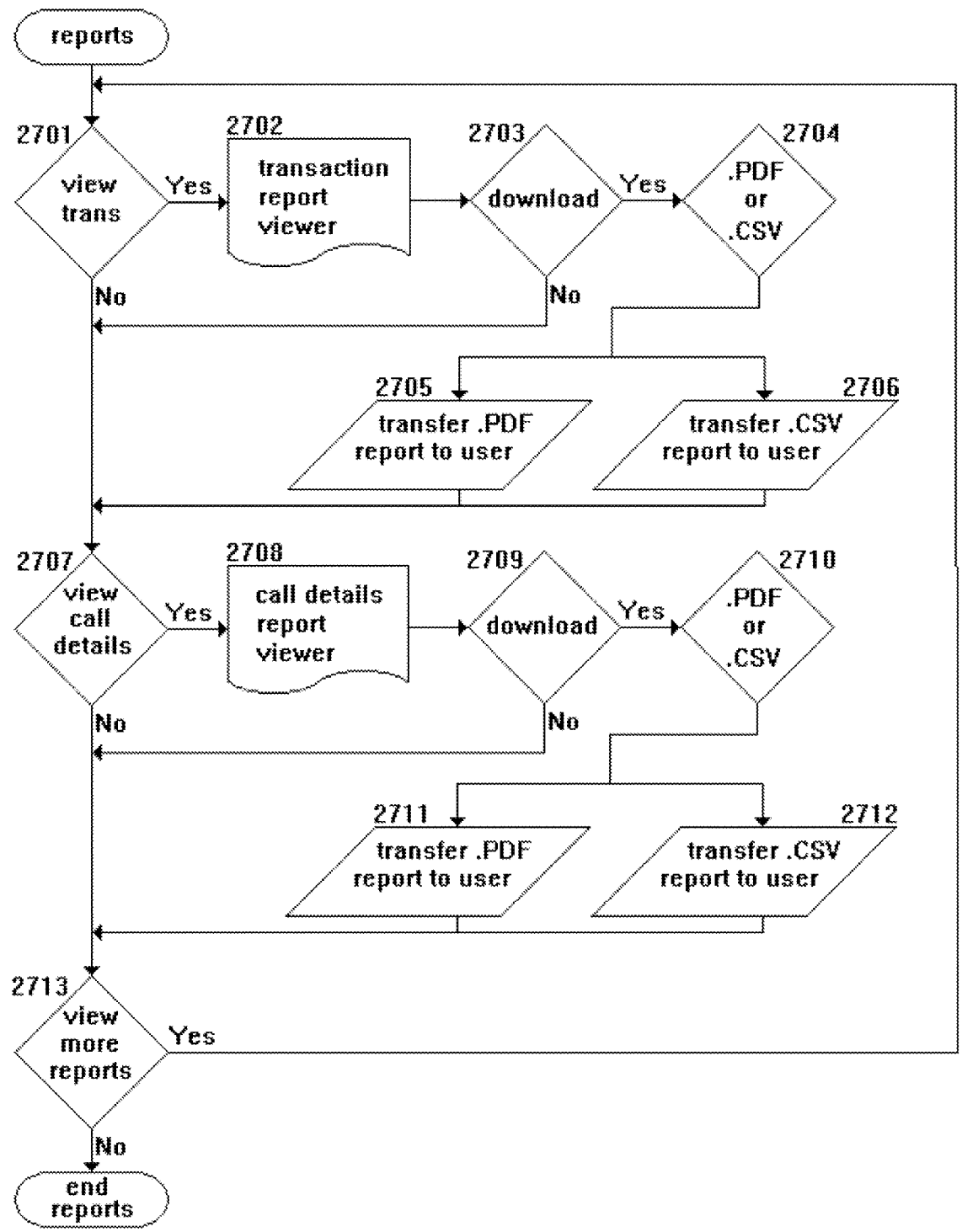
Figure 30:
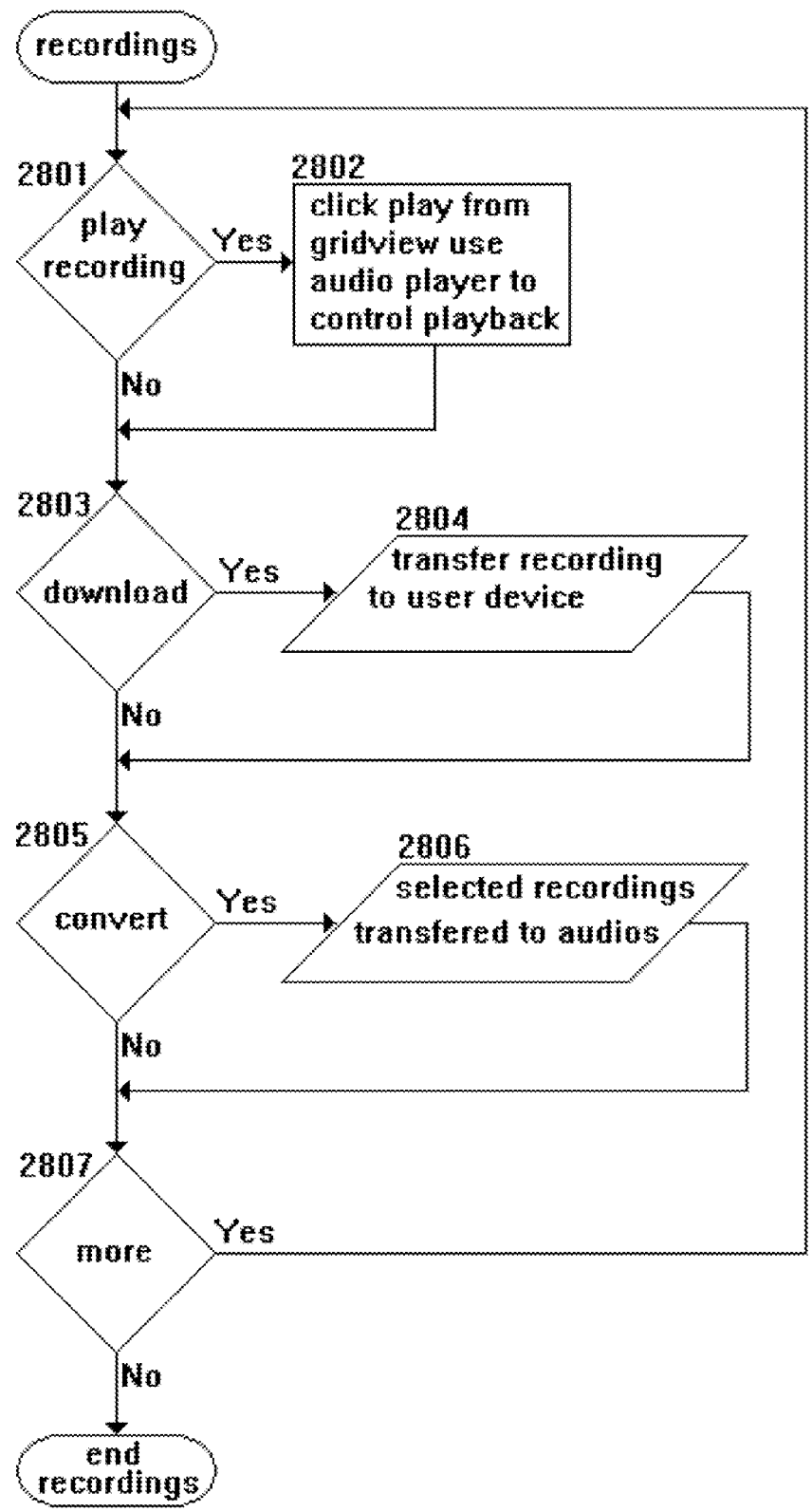
Figure 31:
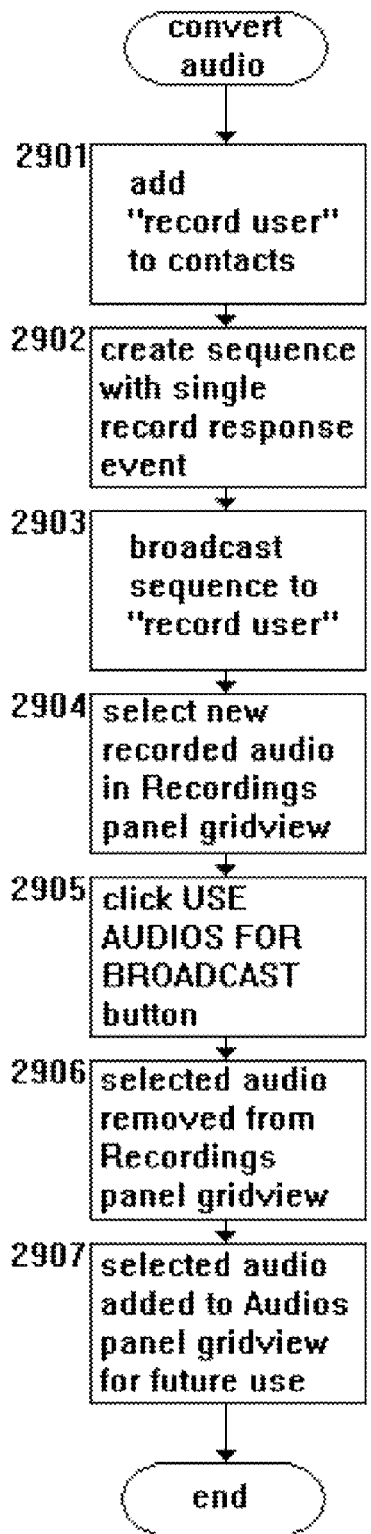
Figure 34:
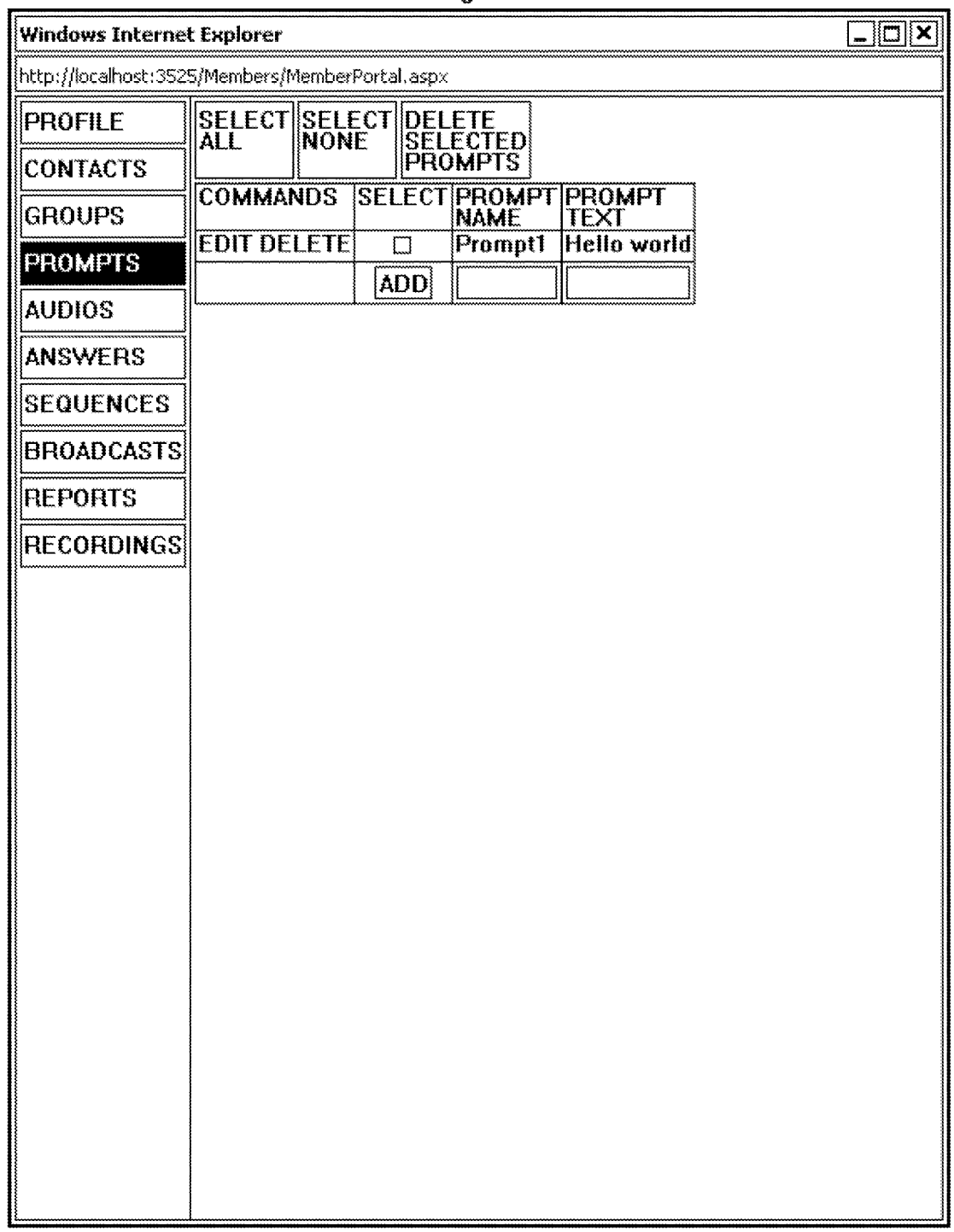
Figure 35:
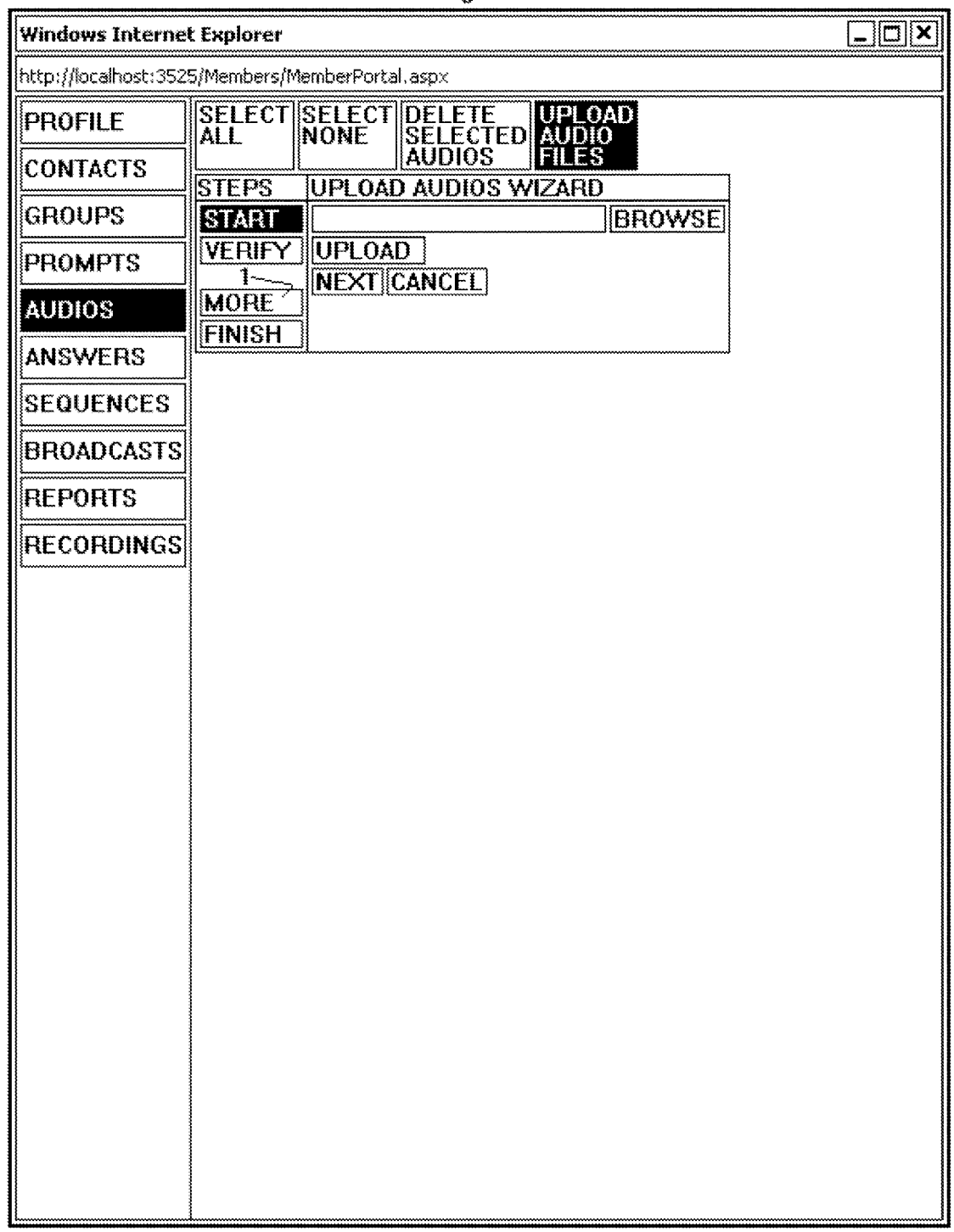
Figure 36:
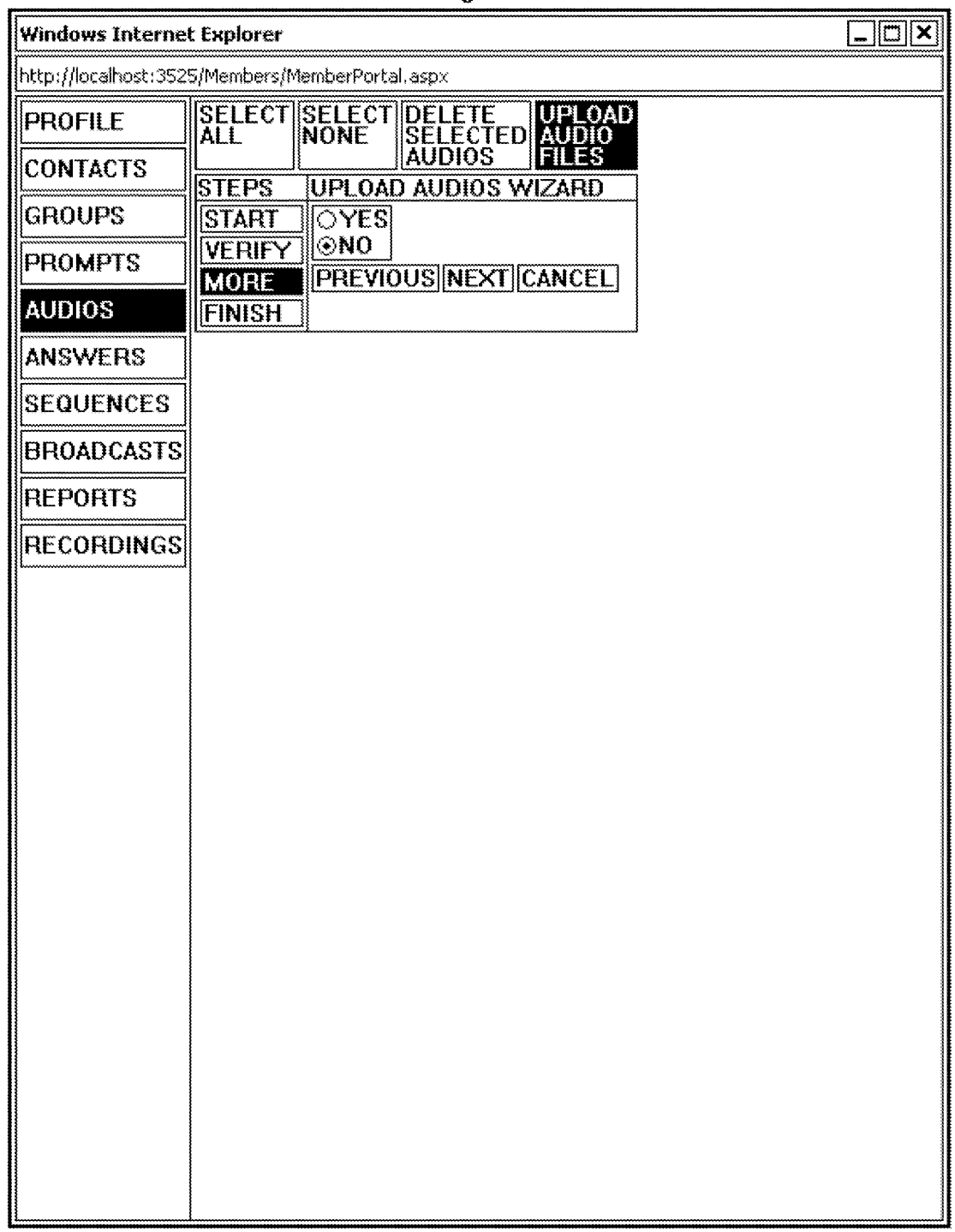
Figure 38:
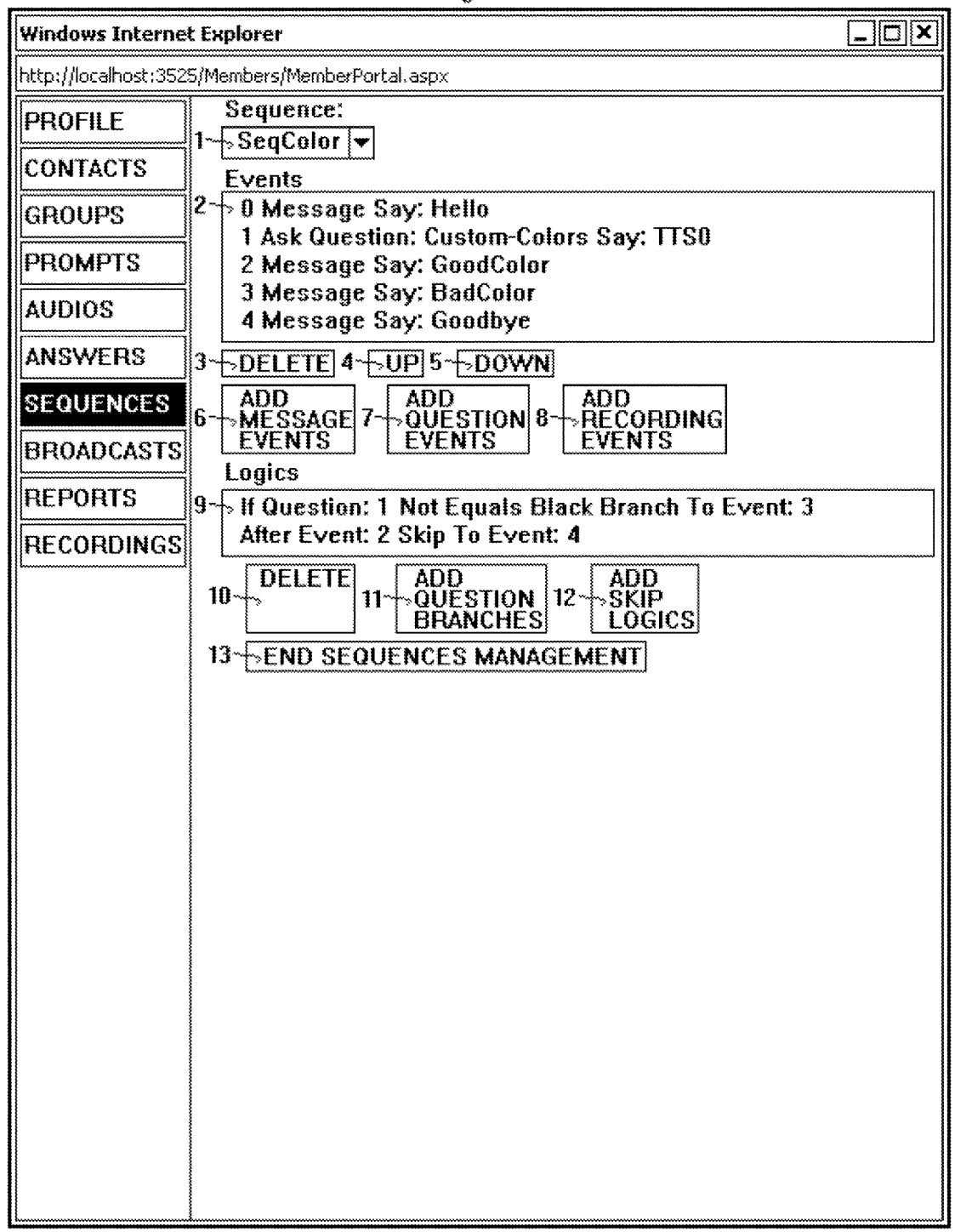
Figure 40:
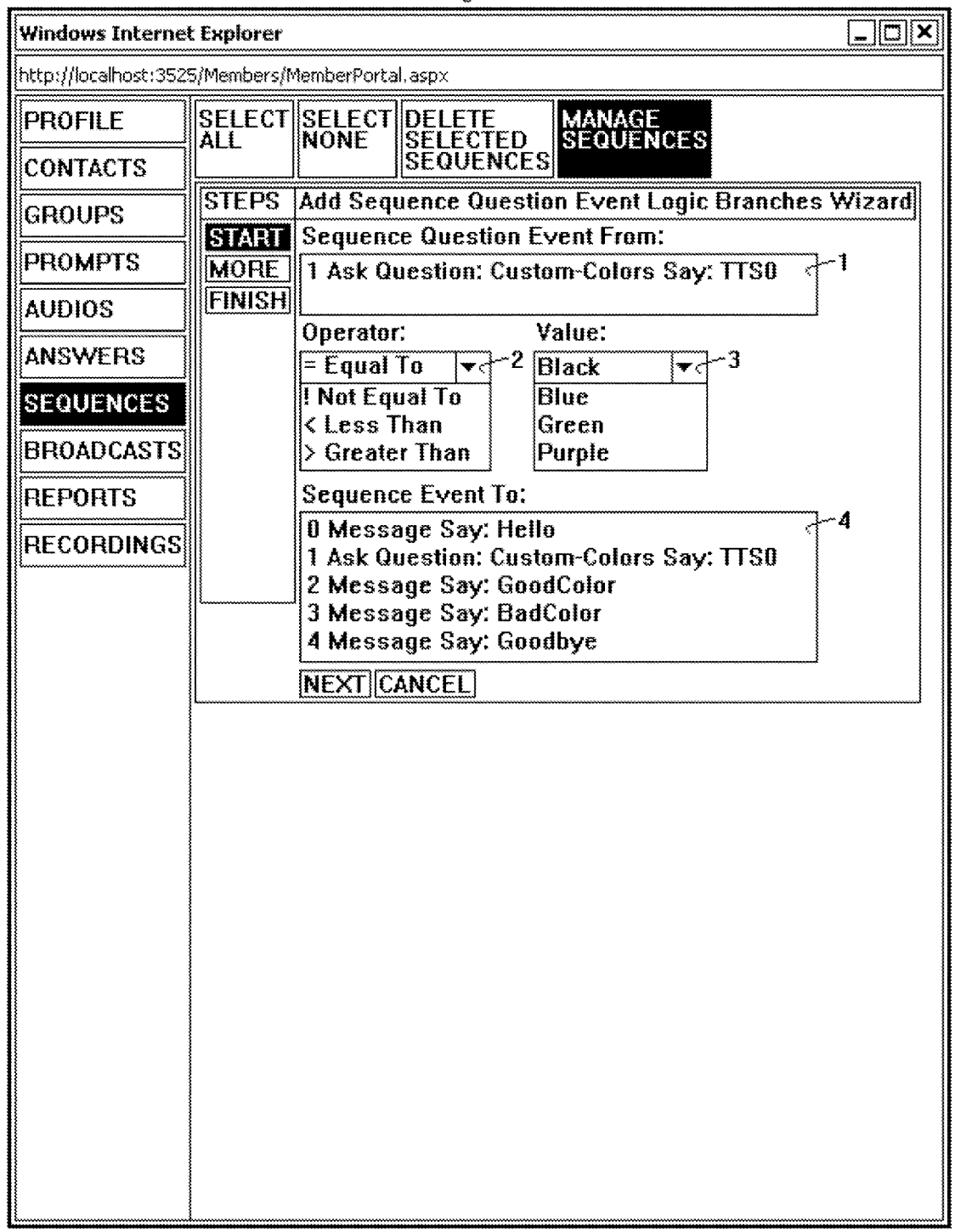
Figure 41:
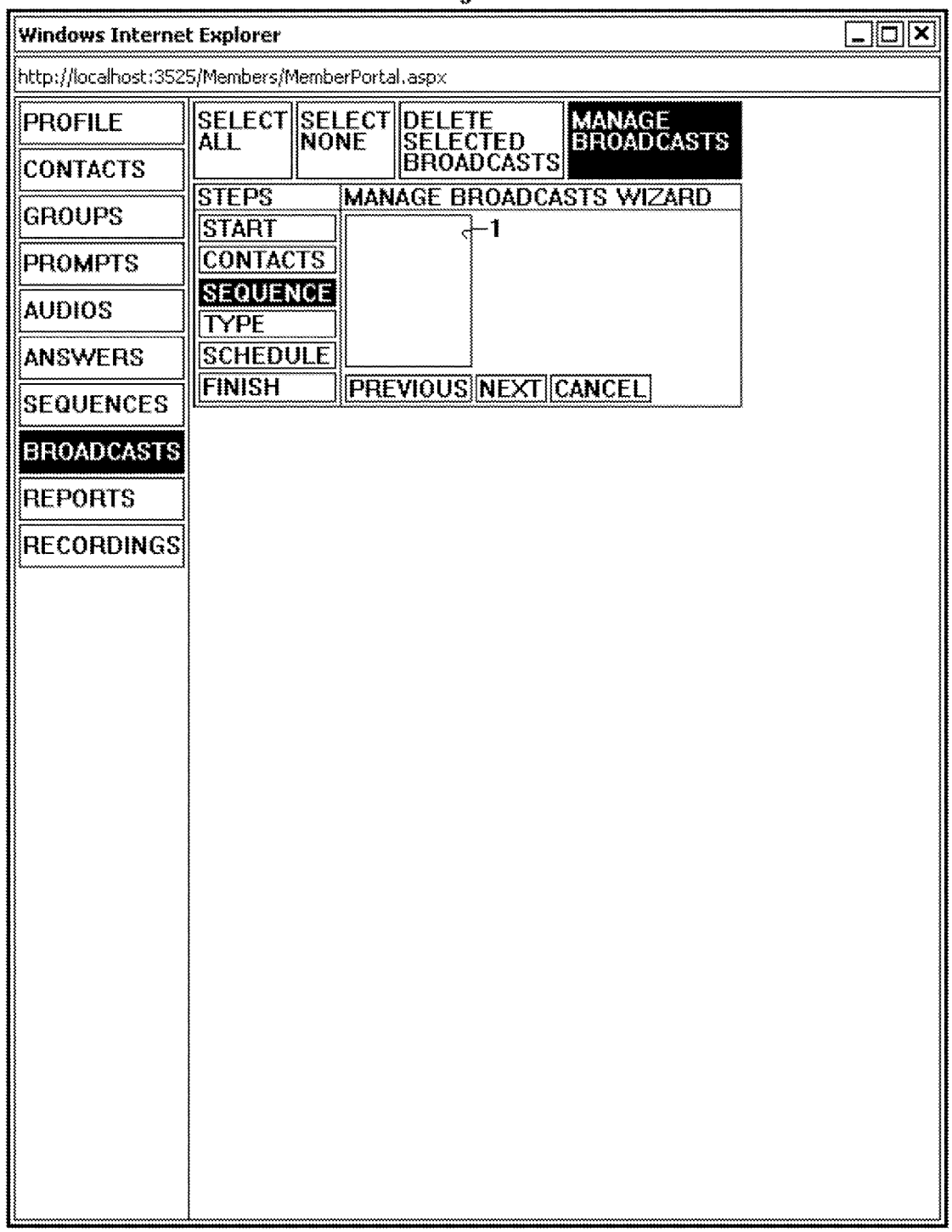
Figure 42:
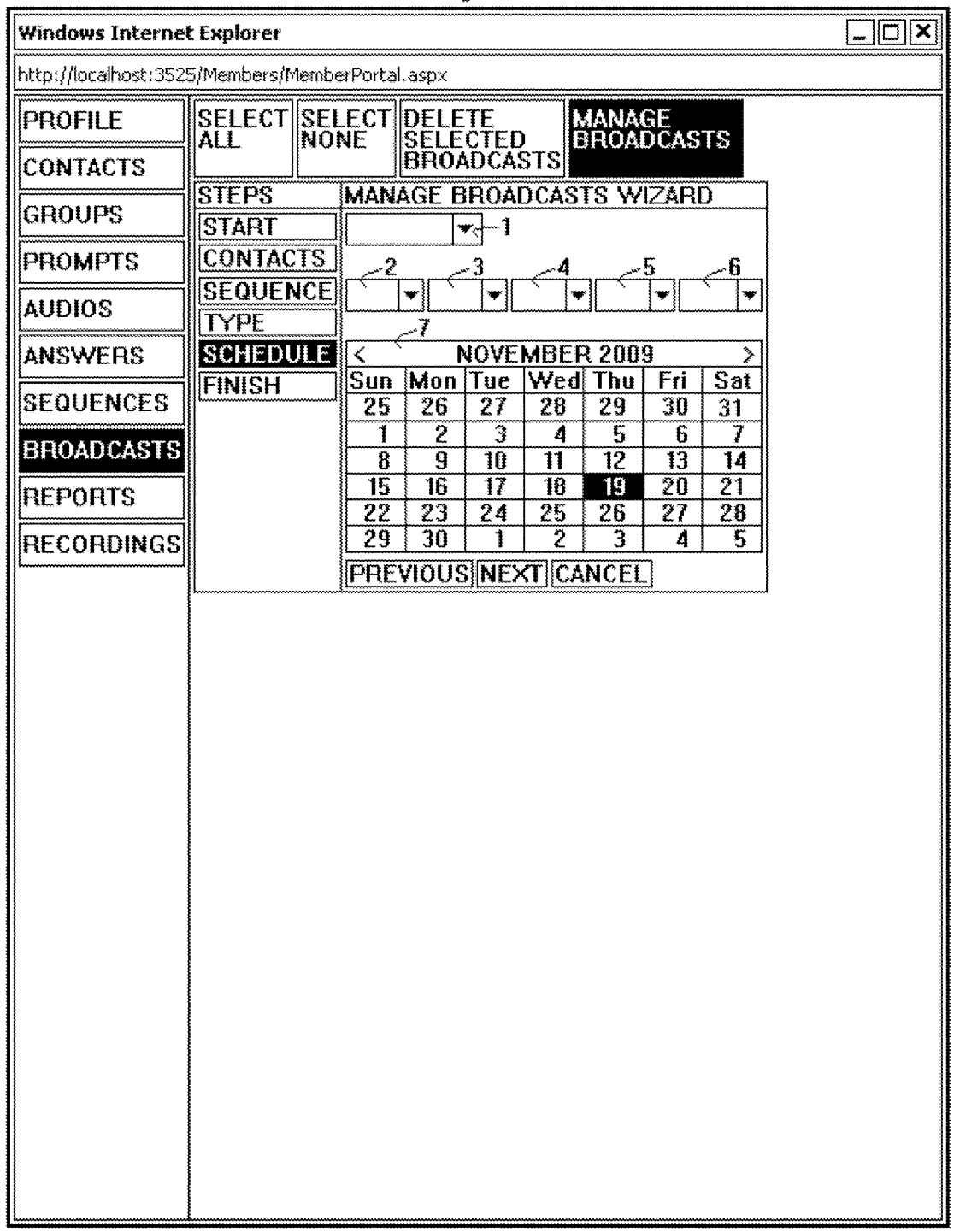
Figure 43:
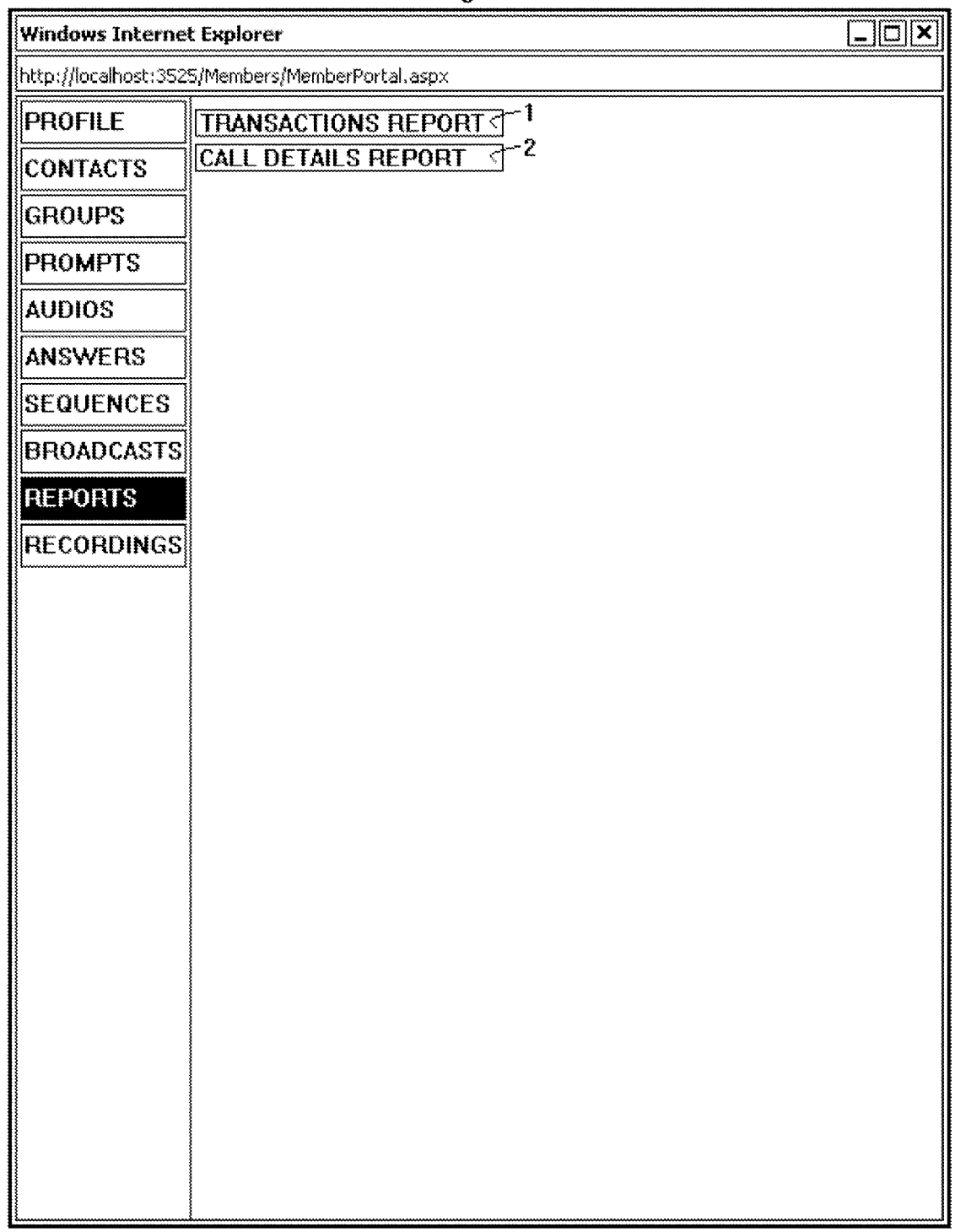
Figure 44:
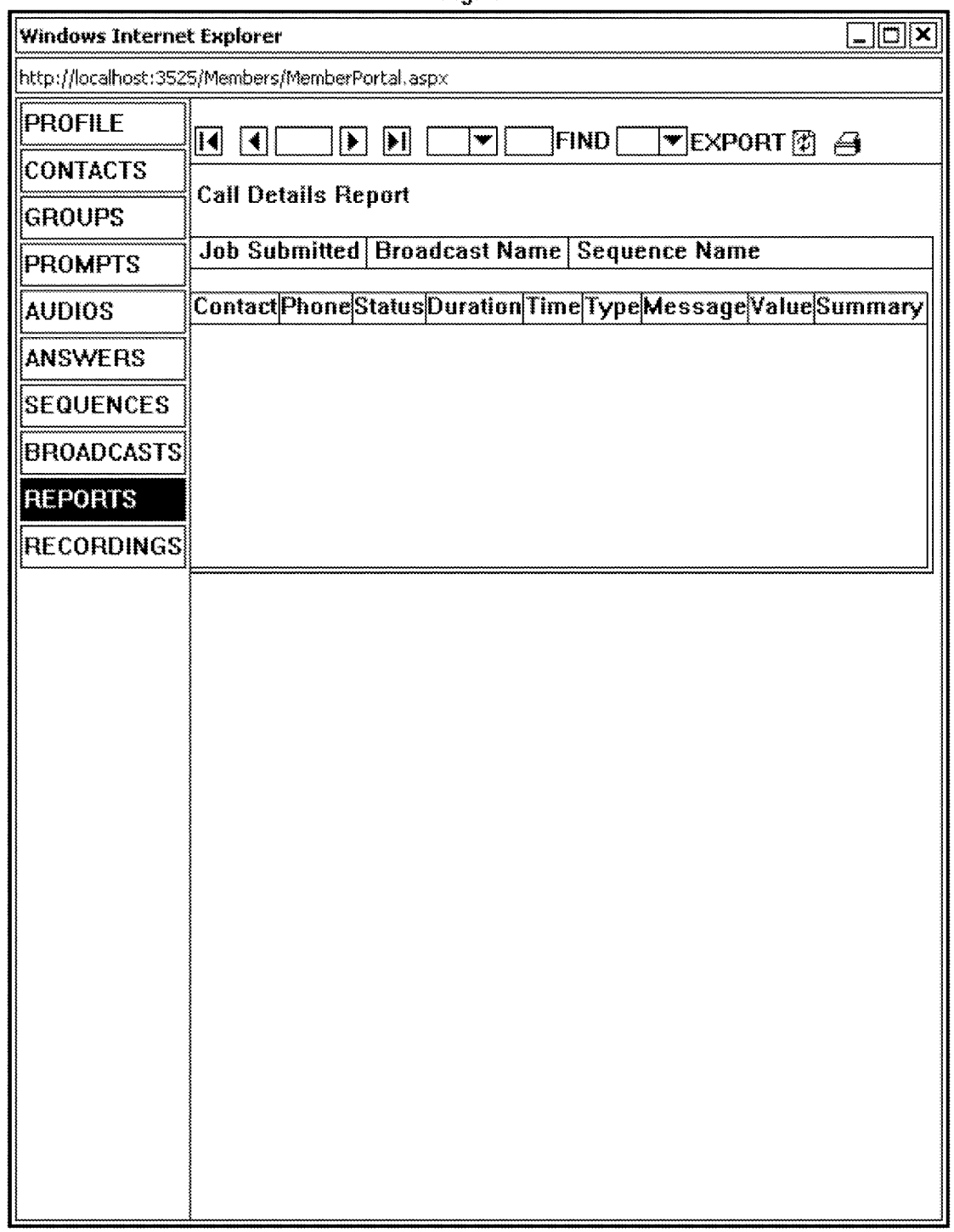
Figure 45:
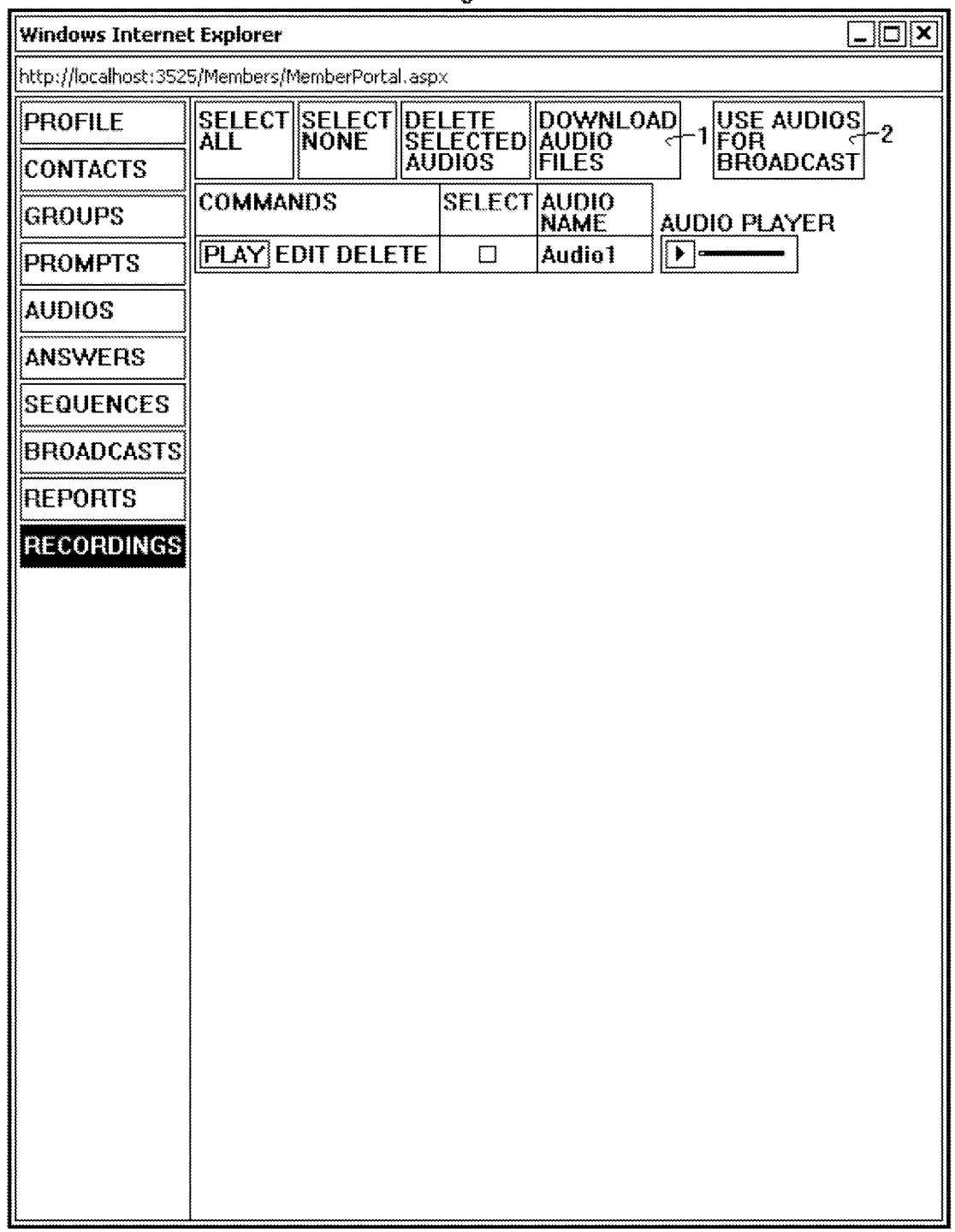
Figure 49:
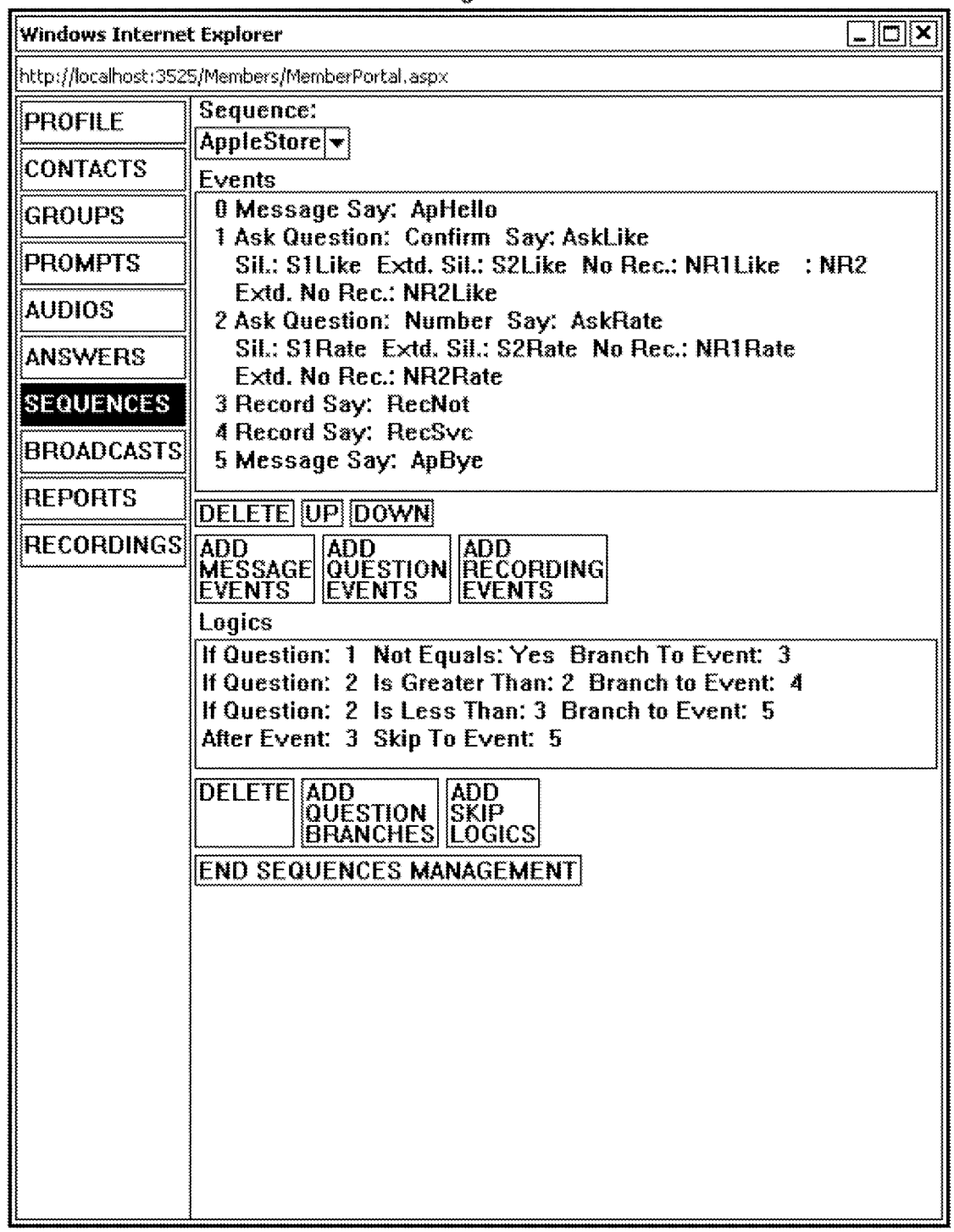
Figure 51:
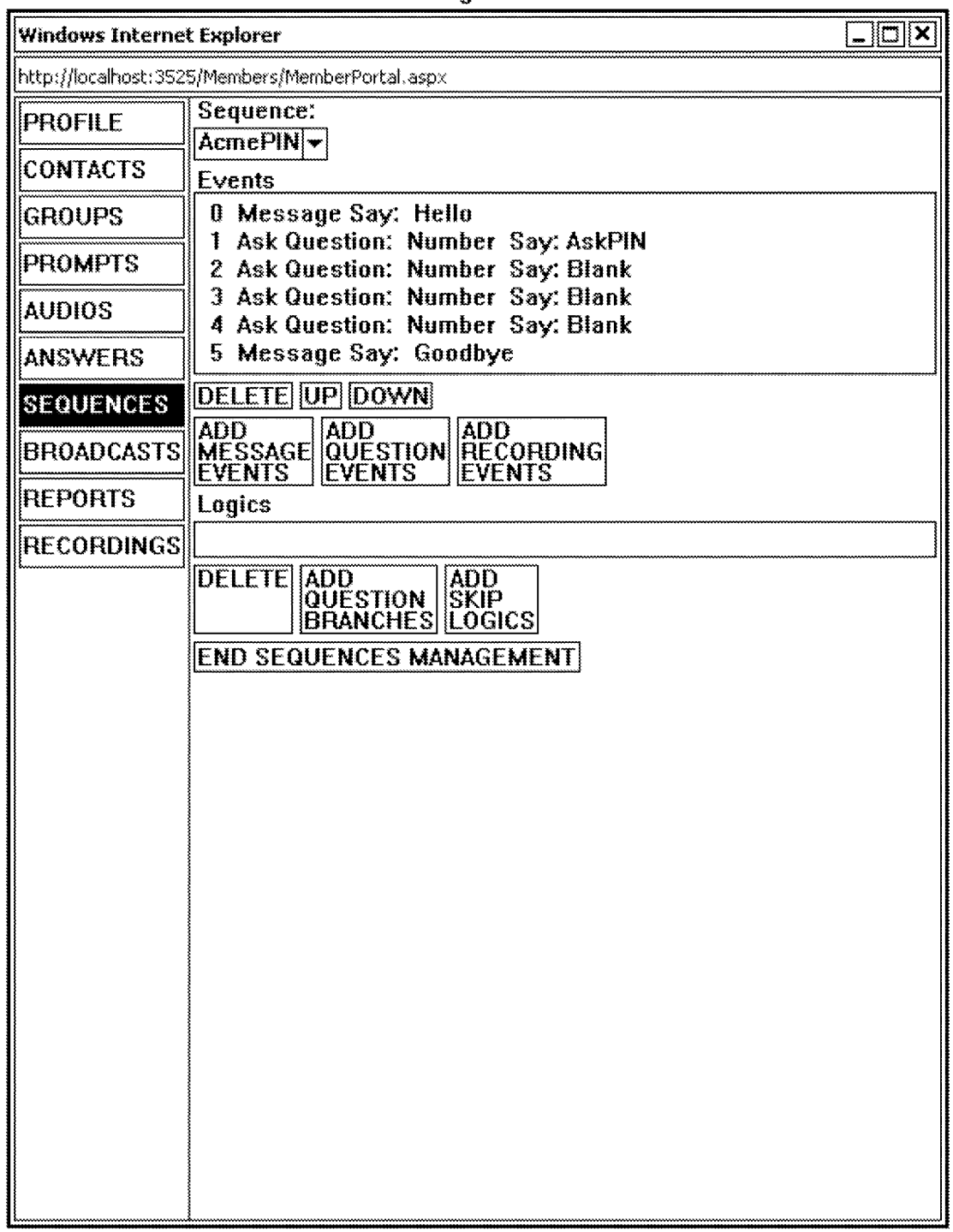
Figure 52:
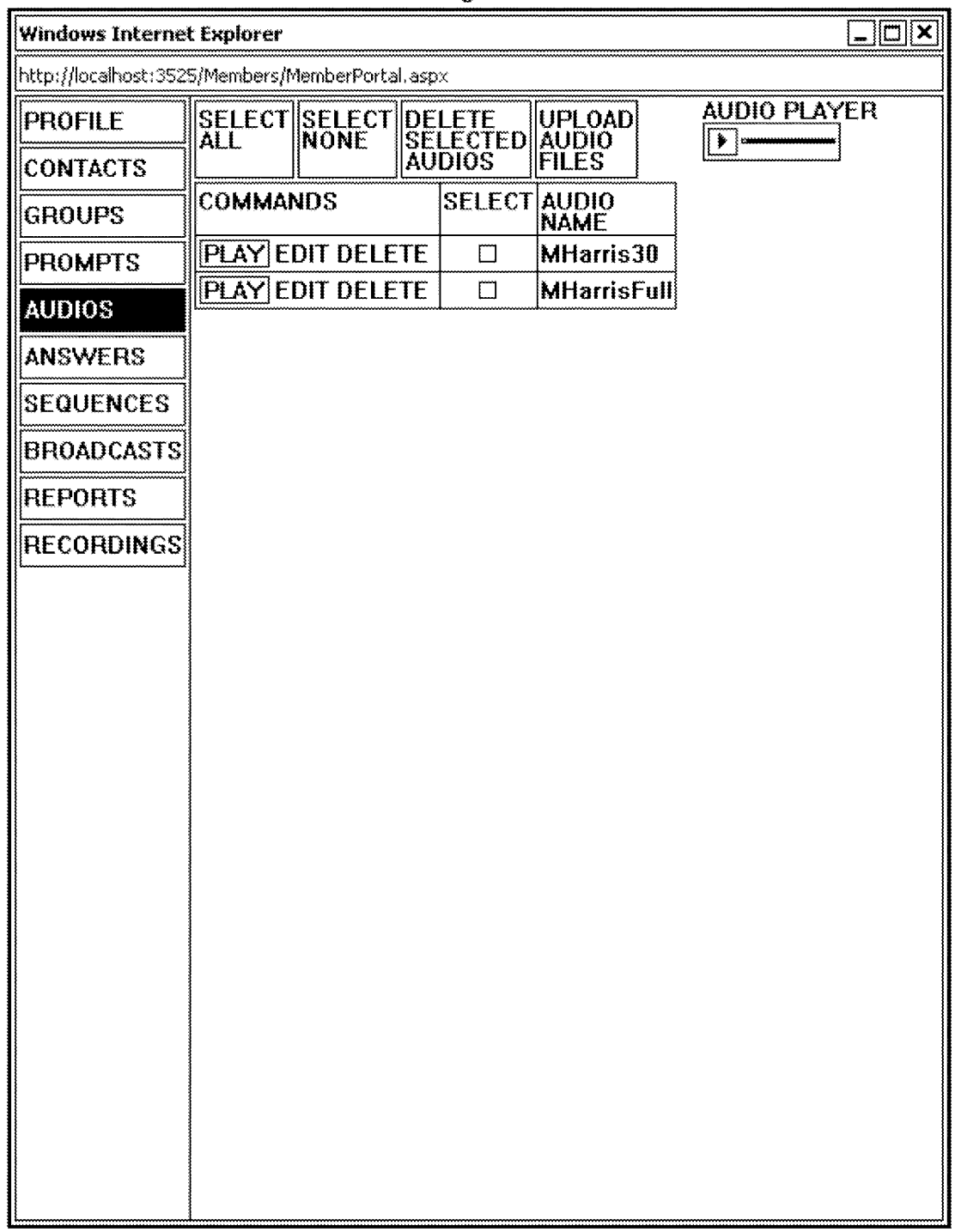
Figure 57:
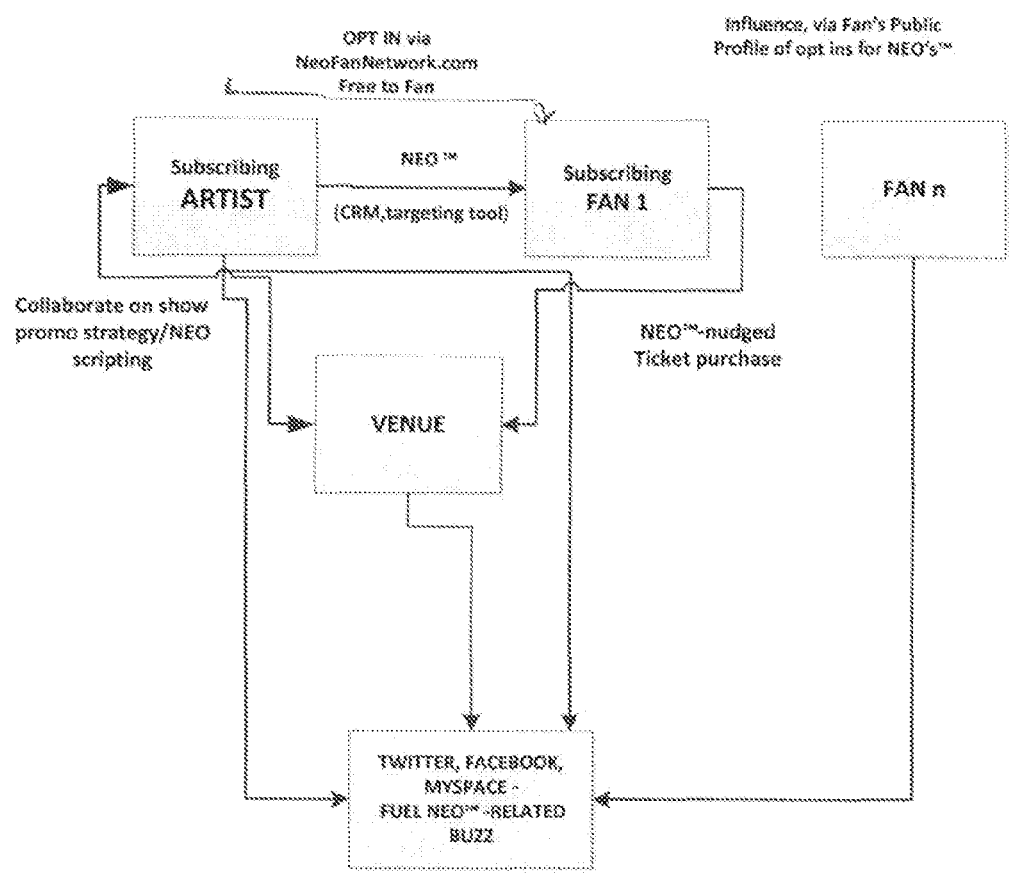
Figure 58:
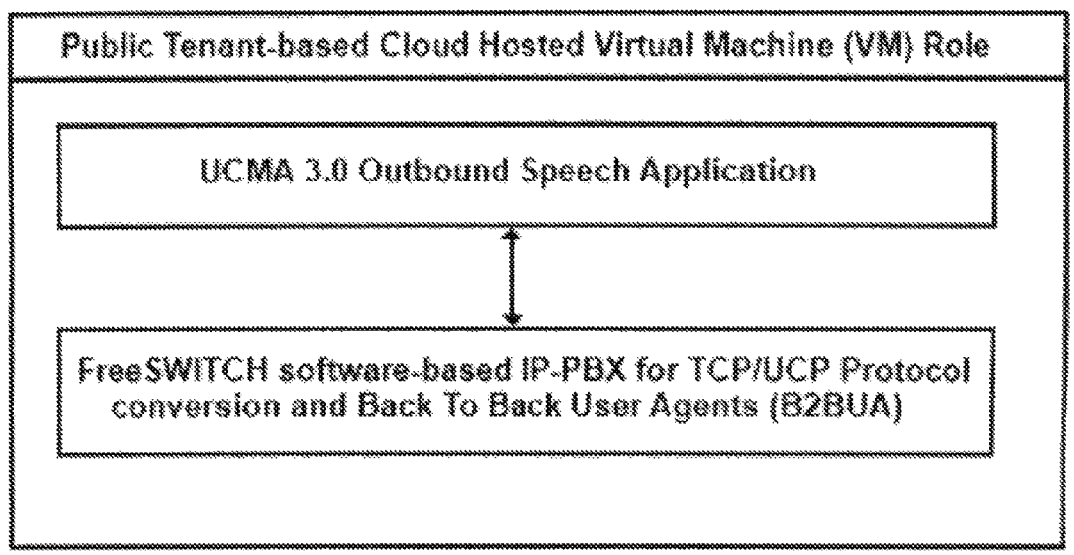

We claim:
1. In a computer-implemented contact center enabling a user to create and launch on demand, automated outbound interactive voice calls to contacts based on a user-provided call script, a non-transitory computer-readable medium having program code embodied therein configured to cause the execution of the following steps:
   a. Providing a website application accessible by the user via a user computer equipped with a web browser, the website application comprising a visual user interface for a contact center,
   b. Prompting the user to create a user account for accessing and using the contact center by providing user information comprising a user password,
   c. Providing contact information comprising contact phone numbers, the contact information stored in a contact information database on a data server of the service provider of the contact center and accessible to the user via the user's account,
   d. Prompting the user to optionally input custom answers per a user-generated call script where the call script comprises at least one question anticipating a custom answer from a contact, the custom answers to be recognized b a speech application,
   e. Providing a built-in audio recording capability enabling the user to record and save voice recordings for each event of the call script,
   f. Via an Event Add Wizard and Logic Add Wizard, enabling the user to build and save a call sequence based on the call script by pointing and clicking to successively add previously saved prompts of each message event and each question event of the call script and a logic for controlling the sequencing of events dependent upon the contact's response to a question event,
   g. Providing a Transfer to Live Attendant functionality whereby the user optionally adds a Transfer to Live Attendant Event into a call sequence during the call sequence creation step f, the transfer to Live Attendant Event causing the call to be automatically transferred to a user-provided phone number upon a specified contact response to a question event in the call sequence,
   h. Creating a broadcast, the broadcast defined by a saved call sequence and a plurality of contacts who are the intended recipients of a call based on the call sequence,
   i. Launching the broadcast,
   j. Automatically capturing and saving exportable audio recordings of contact voice responses to open-ended questions in the call sequence, where the call script comprises at least one open-ended question, and
   k. Providing one or more reports comprising information from contact responses to question events in the call sequence of the broadcast.
2. The non-transitory computer-readable medium per claim 1 wherein providing information per Step c is accomplished via an upload of a file comprising contact information.

3. The non-transitory computer-readable medium per claim 1 wherein providing contact information per Step c is accomplished via an interface to a random phone number generator application.

4. The non-transitory computer-readable medium per claim 1 wherein the one or more reports per Step k are available in near real-time.

5. The non-transitory computer-readable medium per claim 1 further comprising program code for prompting the user to optionally create a contact group, the contact group comprising a subset of all of the contacts in the contact database, the contacts filtered based on one or more filters in the filter group comprising the filters of age, gender, occupation, city, medical diagnosis code, appointment date, purchase transaction history, account balance, and zip code, the user able to specify a contact group in generating a broadcast.

6. The non-transitory computer-readable medium per claim 1 wherein the reports per Step k further comprise automatically calculated metrics comprising one or more metrics in the group comprising completion rate, user cost per completion, and speech recognition rate, where completion rate is calculated by dividing the total number of calls of a broadcast wherein the contact responded and each event of the call sequence executed by the total number of calls comprising the broadcast, the cost per completion rate is calculated by dividing the user's total cost of accessing and using the contact center per a defined period divided by the user's total number of completed calls in that period, and the speech recognition rate is calculated by dividing the total number of calls in a broadcast wherein at least one question escalation event executed by the total number of calls completed in said broadcast.

7. The non-transitory computer-readable medium per claim 1 further comprising program code configured to provide a call scripting visual tool whereby a visual diagram of event flow in a call sequence is automatically created and displayed to aid the user in correctly building a call sequence based on the script.

8. The non-transitory computer-readable medium per claim 1 further comprising program code configured to prompt contacts to opt in online into receiving pre-recorded interactive calls from contact-specified users, the opt in accomplished by accessing the URL of a website of the provider of the hosted contact center, inputting the contact's direct phone number and other contact identifying information, and specifying authorized user identifying-information, the information stored on a data server of the provider of the hosted contact center.

9. The non-transitory computer-readable medium per claim 1 further comprising program code configured to provide for an online opt out feature whereby contacts may opt out from receiving pre-recorded interactive calls, the opt out comprising the steps of accessing the URL of the website of the provider of the hosted contact center and inputting the contact's direct phone number, the opt out information in communication with a SQL database of the contact center.

10. The non-transitory computer-readable medium per claim 1 further providing for an automated broadcast test feature whereby upon the generation of a broadcast, at least one test broadcast is automatically launched to the user's direct phone number before the broadcast may be launched to the user-specified contacts for the broadcast.

11. The non-transitory computer-readable medium per claim 1 further comprising program code wherein each question event is automatically replayed as a question escalation event when a contact response to the said question event is not detected or understood by a speech application of the contact center.

12. The non-transitory computer-readable medium per claim 1 further comprising program code configured to execute the step of prompting, the user to specify a caller ID which is displayed on a Caller ID-enabled contact communication device receiving the call.

13. The on-transitory computer-readable medium per claim 1 further comprising program code configured to execute a contact authentication step whereby the contact's response to an authentication question of a call sequence in a broadcast is automatically verified against an expected response, the expected response pre-defined in the contact information database for the contact.

14. The non-transitory computer-readable medium per claim 1 further comprising program code that optionally automatically populates or depopulates contact information based on a contact's express opt in or express opt out online.

15. The non-transitory computer-readable medium per claim 1 further comprising program code configured to cause the automatic sending of an alert to the user when a contact has responded to a pre-defined maximum number of calls within a specified period.

16. The non-transitory computer-readable medium per claim 1 further comprising program code for providing a text-to-speech prompting functionality whereby a user may input textual information for one or more events of the call script when the user does not want to make voice recordings for the one or more events of the call script, the user specifying the gender of the automated speaker of the text-to-speech prompt.

17. The on-transitory computer-readable medium per claim 1 further comprising a speech-to-text translator functionality for enabling the user to translate from voice to text the captured voice recordings of contact responses to open-ended question events in the call sequence of the broadcast.

18. The non-transitory computer-readable medium per claim 1 further comprising program code configured to terminate an active broadcast upon the attainment of a user-specified termination event.

19. The non-transitory computer-readable medium per claim 1 further comprising program code for making the one or more reports per Step k exportable.

20. A method of creating and launching on demand a pre-recorded voice interaction with a contact utilizing an outbound web-based contact center comprising a speech application having interactive voice response comprising the following, steps:
 a. Accessing a website comprising a URL address of a service provider of the contact center accessible by a user via a user computer equipped with a web browser,
 b. Creating a user account by providing user information comprising a user password,
 c. Creating a script comprising one or more events from the group comprising message events and questions events,
 d. Providing contact information, the contact information comprising a contact's direct phone number,
 e. Optionally inputting custom answers per a call script where the call script comprises at least one question anticipating a custom answer from a contact, the custom answers to be recognized by a speech application of a hosted contact center,
 f. Producing voice recordings of each event of the call script;
 g. Creating a call sequence based on the call script, the call sequence comprising a prompt for each event of the call script, the prompts from the group comprising voice recordings and text-to-speech prompts, the call sequence created via an event adding wizard and logic adding wizard, the user pointing and clicking to successively add a prompt for each event and a logic for controlling the sequencing of the prompts dependent upon the contact's response to a question event when the script comprises a question event, the call sequence optionally comprising a Transfer to Live Attendant Event whereby the call is automatically transferred to a user-specified phone number when the contact elicits a specified response to a question event in the call sequence, h. Generating a broadcast, the broadcast comprising a saved call sequence and contacts or contact groups, i. Launching the broadcast, j. Reviewing one or more reports comprising, information from contact responses to question events in the call sequence of the broadcast.

21. The method per claim 20 where the script is an appointment reminder.

22. The method per claim 20 wherein the script comprises a focus group recruitment questionnaire.

23. The method per claim 20 wherein the user is a polling entity and contacts are registered voters who have granted express consent for receiving the pre-recorded interactive voice calls.

24. The method per claim 20 wherein the script comprises a questionnaire for a clinical research trial.

25. The method per claim 20 wherein the user is a financial advisor and the contacts are clients of the advisor.

26. The method per claim 20 wherein the user-generated script comprises a message event comprising information that an insurance policy of the contact is expiring, a question event prompting the contact to renew the policy, and a branching logic in the call sequence of the script whereby a yes response by the contact to the question event automatically transfers the call to a live attendant.

27. The method per claim 20 wherein the user-generated script comprises a question event prompting the contact to currently provide updated insurance coverage information, and a branching logic in the call sequence whereby upon the contact's expression of willingness to update insurance coverage information, the call is automatically transferred to a live attendant.

28. The method per claim 20 wherein the user-generated script comprises a message event communicating, information about a user live appearance at a venue and inviting, the contact to be present at the venue, and a question event asking the contact whether or not the contact plans to be present at the venue.

29. The method per claim 20 where the user is a medical office representative, the contact is a patient, and the script comprises a patient questionnaire.

30. The method per claim 20 wherein the user is an insurance company, the contacts are insured customers of the insurance company, and the call sequence comprises an event prompting the insured customers to update information and a Transfer to Live Attendant Event when the contact elicits a user-specified response to the said prompting event.

31. The method per claim 20 wherein the user is an insurance company, the contacts are insured customers of the insurance company, and the call script comprises a notification that the insured customers policy is expiring.

32. The method per claim 20 where in the user is a hiring authority and the contacts are job applicants.

33. In a web-based automated outbound contact center utilizing Voice Over IP and comprising interactive voice response, a method for prompting a money transaction between a user and a contact comprising the steps of:

a. Creating a user account for accessing and using the web-based contact center comprising a website application user interface, b. Generating a call script, the script comprising message events and question events, at least one question event inviting the contact to consent to a money transaction, c. Providing contact information, the contact information comprising a contact's direct phone number, d. Recording, and saving audio recordings for each event of the script, e. Creating a call sequence based on the script via an event adding wizard and branching logic adding wizard by pointing and clicking to successively add each message event and question event of the call script and the branching logic when the call script requires branching based upon the contact's response to a question event, the call sequence comprising a Send SMS Event whereby the call automatically triggers the sending of an SMS message to a contact mobile device when the contact elicits a specified response to the question event inviting the contact to consent to a money transaction, f. Launching a broadcast, the broadcast comprising a call sequence and a plurality of contacts, the broadcast capable of being launched immediately or scheduled for a later date and time designated by the user, the user specifying the maximum number of attempts to reach the contact, g. Capturing and saving exportable audio recordings of contact responses to open-ended questions in the call sequence, where the call script comprises at least one open-ended question, h. Reviewing one or more reports comprising, information from contact responses to question events in the call sequence of the broadcast.

34. The method per claim 33 where the user is an artist and the contact is a fan who has expressly opted into receiving a pre-recorded interactive call from the artist.

35. The method per claim 33 where the user is a fundraiser.

36. A method of creating and launching on demand a pre-recorded voice interaction with a contact utilizing an outbound web-based contact center comprising a speech application having speaker-independent interactive voice response se comprising the following steps:

a. Accessing a website comprising URL address of a service provider of the contact center accessible by a user via a user computer equipped with a web browser, b. Creating a user account by providing user information comprising a user password, c. Creating a call script comprising one or more events from the group comprising message events and questions events, d. Inputting contact information, the contact information comprising direct phone numbers of contacts, e. Producing voice recordings for one or more events of the call script;

f. If a voice recording is not produced for each event of the call script, creating a text-to-speech prompt for one or more events of the call script for which a voice recording is not produced, g. Creating a call sequence based on the call script, the call sequence comprising a prompt for each event of the call script, the prompts from the group comprising voice recording and text-to-speech prompts, the call sequence via an event adding wizard and logic adding wizard, the user pointing and clicking to successively add a prompt for each event and a logic for controlling the sequencing of the prompts dependent upon the contact's response to a question event when the call script comprises a question event, h. Generating a broadcast, the broadcast comprising a call sequence and one or more contacts or contact groups, and i. Launching the broadcast.

* * * * *